United States Patent [19]
Fischer et al.

[11] Patent Number: 5,954,178
[45] Date of Patent: Sep. 21, 1999

[54] APPARATUS FOR ACTUATING AN AGGREGATE IN THE POWER TRAIN OF A MOTOR VEHICLE

[75] Inventors: Robert Fischer; Norbert Esly, both of Bühl; Reinhard Berger, Bühlertal; Karl-Ludwig Kimmig, Bühl-Waldmatt, all of Germany

[73] Assignee: LuK Getriebe-Systeme GmbH, Buhl, Germany

[21] Appl. No.: 08/792,512

[22] Filed: Jan. 31, 1997

[30] Foreign Application Priority Data

Jan. 31, 1996 [DE] Germany .......................... 196 03 409
Jun. 12, 1996 [DE] Germany .......................... 196 23 484

[51] Int. Cl.[6] .................................................. B60K 23/00
[52] U.S. Cl. ............................................. 192/90; 192/84.6
[58] Field of Search ......................... 192/84.6, 90, 91 R, 192/91 A

[56] References Cited

U.S. PATENT DOCUMENTS

| | | | |
|---|---|---|---|
| 4,562,908 | 1/1986 | Zouzoulas | 192/48.5 |
| 4,567,969 | 2/1986 | Makita | 192/3.56 |
| 4,651,852 | 3/1987 | Wickham et al. | 192/90 X |
| 4,651,855 | 3/1987 | Grunberg | 192/90 X |
| 4,750,596 | 6/1988 | Grunberg et al. | 192/90 X |
| 4,829,221 | 5/1989 | Grunberg et al. | 192/90 X |
| 4,852,419 | 8/1989 | Kittel et al. | 192/84.6 X |
| 4,878,396 | 11/1989 | Grunberg | 192/90 X |
| 4,890,711 | 1/1990 | Carmillet et al. | 192/90 X |
| 5,010,993 | 4/1991 | Carneiro et al. | 192/84.6 |
| 5,169,365 | 12/1992 | Friedmann . | |
| 5,409,091 | 4/1995 | Reik et al. . | |
| 5,450,934 | 9/1995 | Maucher . | |
| 5,517,876 | 5/1996 | Genise et al. | 192/109 A X |
| 5,678,673 | 10/1997 | Borschert et al. | 192/84.6 |

FOREIGN PATENT DOCUMENTS

| | | |
|---|---|---|
| 42 39 289 A1 | 5/1993 | Germany . |
| 42 39 291 A1 | 5/1993 | Germany . |
| 43 06 505 A1 | 9/1993 | Germany . |
| 43 22 677 A1 | 1/1994 | Germany . |

*Primary Examiner*—Rodney H. Bonck
*Attorney, Agent, or Firm*—Darby & Darby

[57] ABSTRACT

A control unit for a friction clutch or another torque transmitting system and/or for a transmission system in a motor vehicle employs an actor having an electric motor arranged to drive a single-stage or multi-stage transmission which, in turn, transmits motion to one or more mobile parts of the torque transmitting and/or transmission system by way of one or more output elements of the actor. The motor receives signals from one or more sensors and/or from the electronic circuitry in the vehicle and/or from a memory. At least one coil spring and/or another energy storing element is or can be provided to guarantee that the torque transmitting system assumes a predetermined (e.g., disengaged) condition and/or that the transmission system is in a predetermined gear ratio when the actor is not in use to change the magnitude of torque being (or to be) transmitted by the torque transmitting system and/or the ratio of the transmission system.

89 Claims, 42 Drawing Sheets

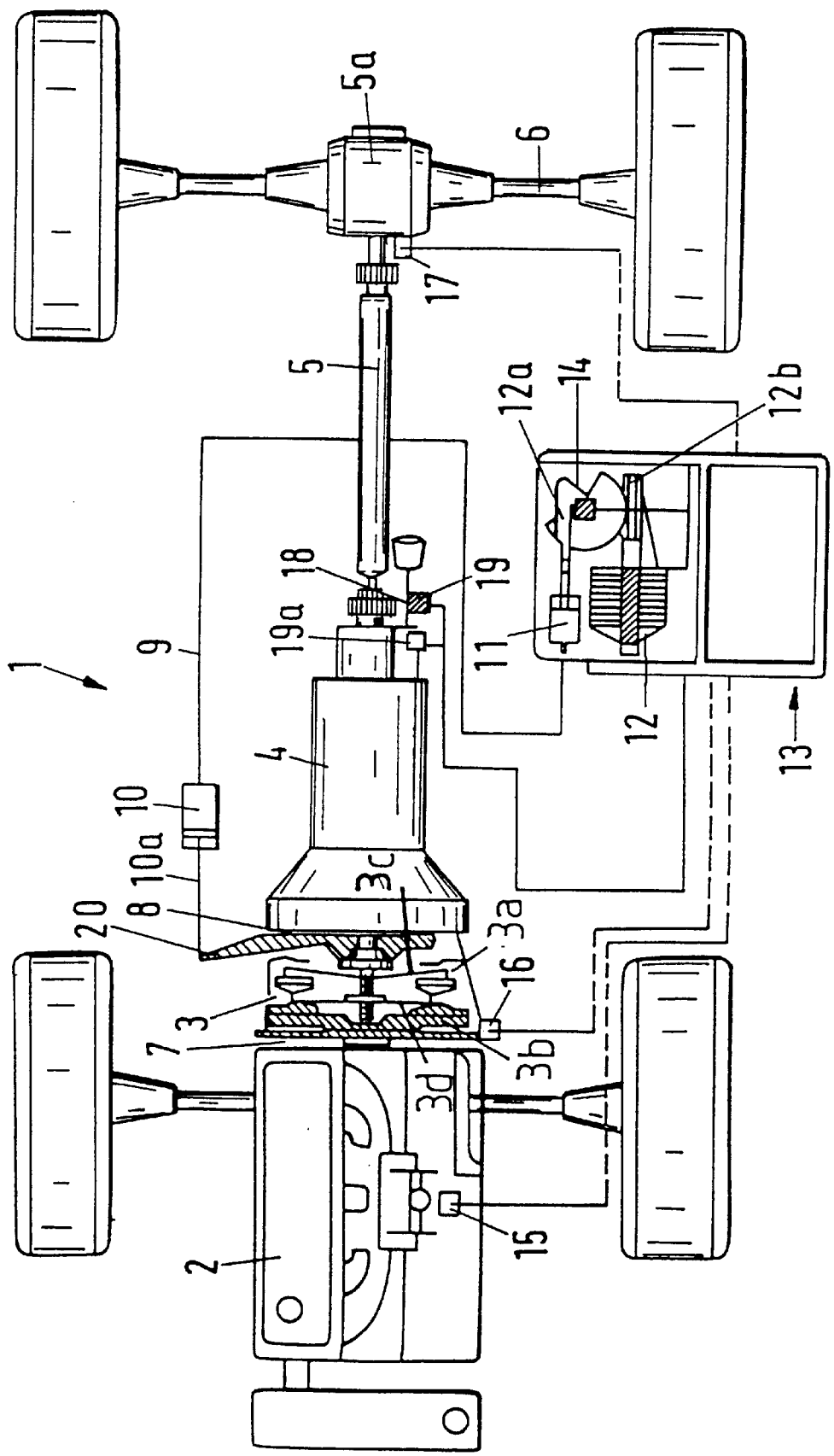

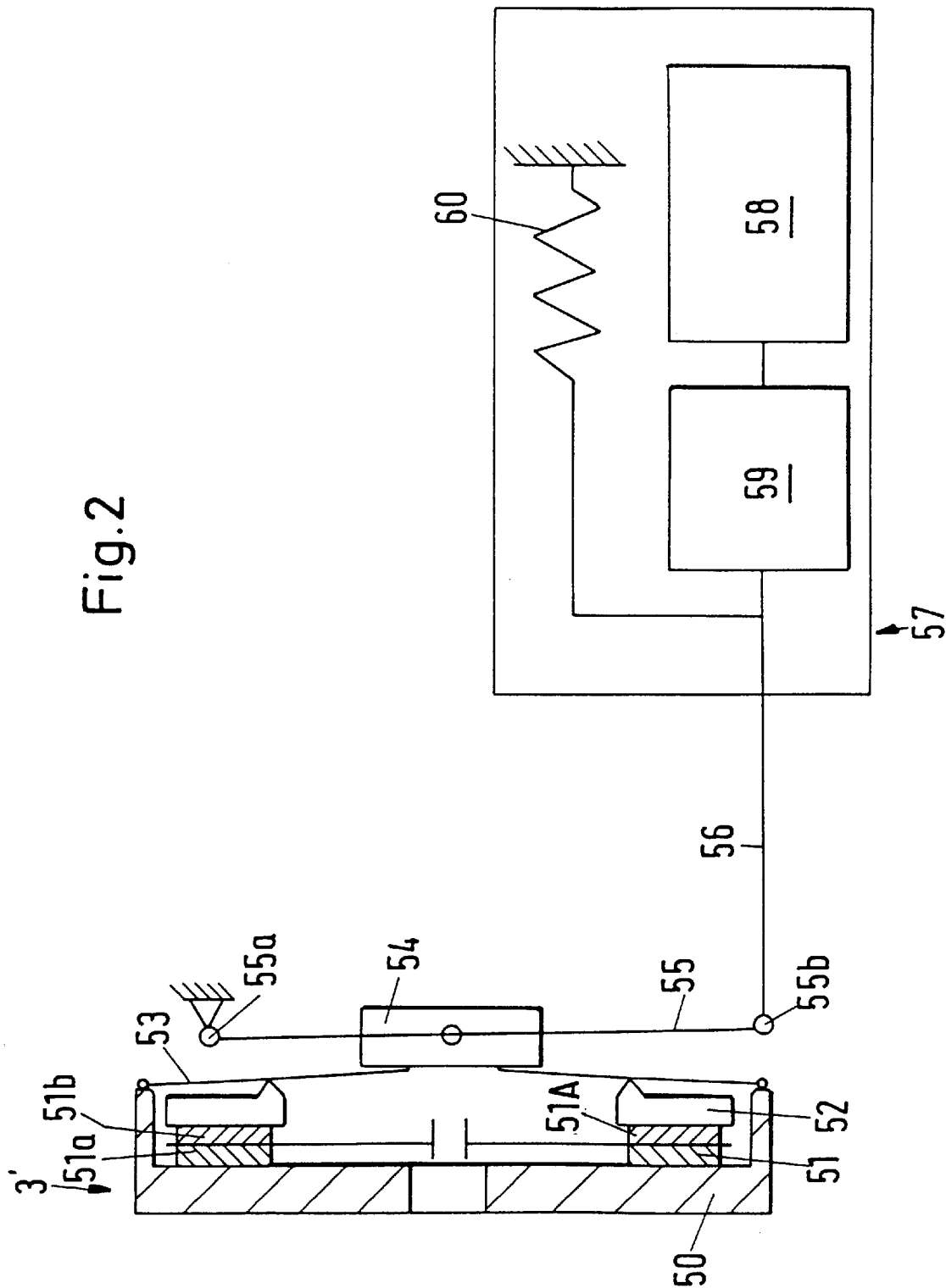

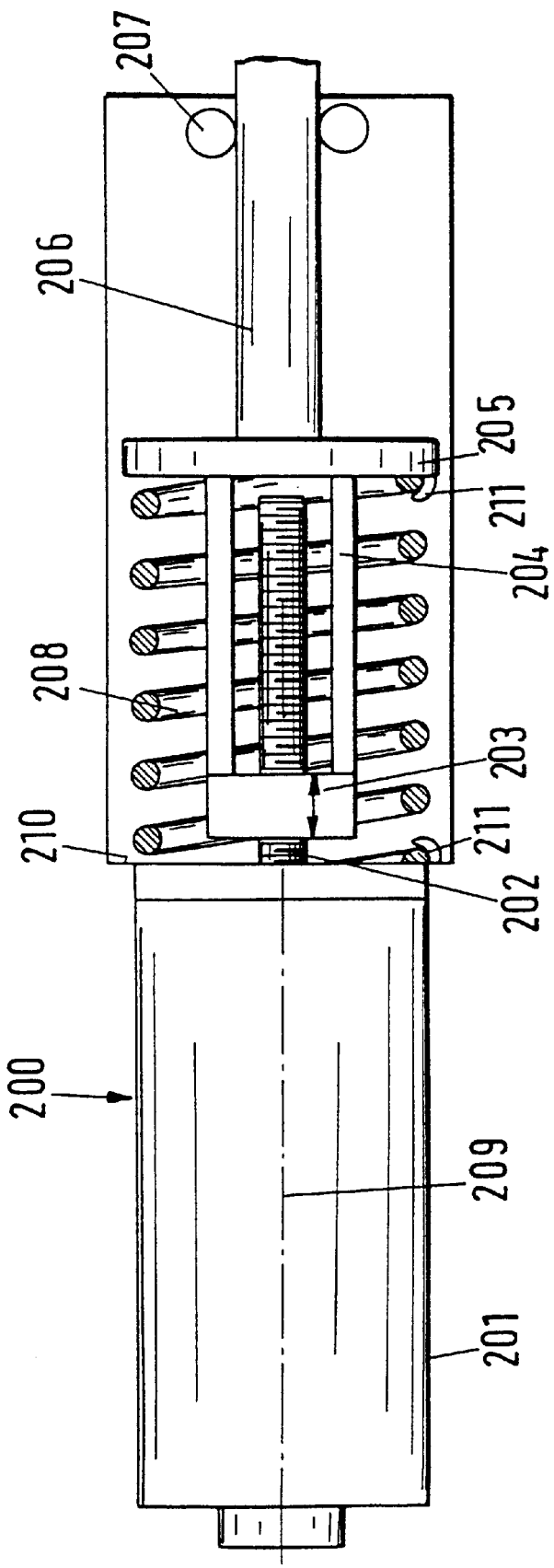

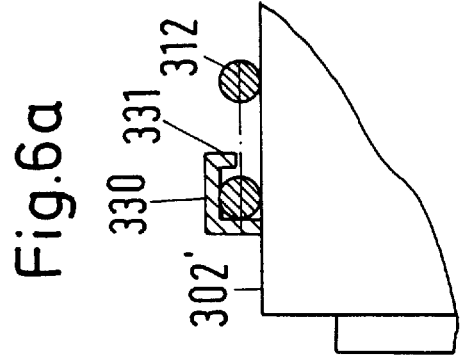
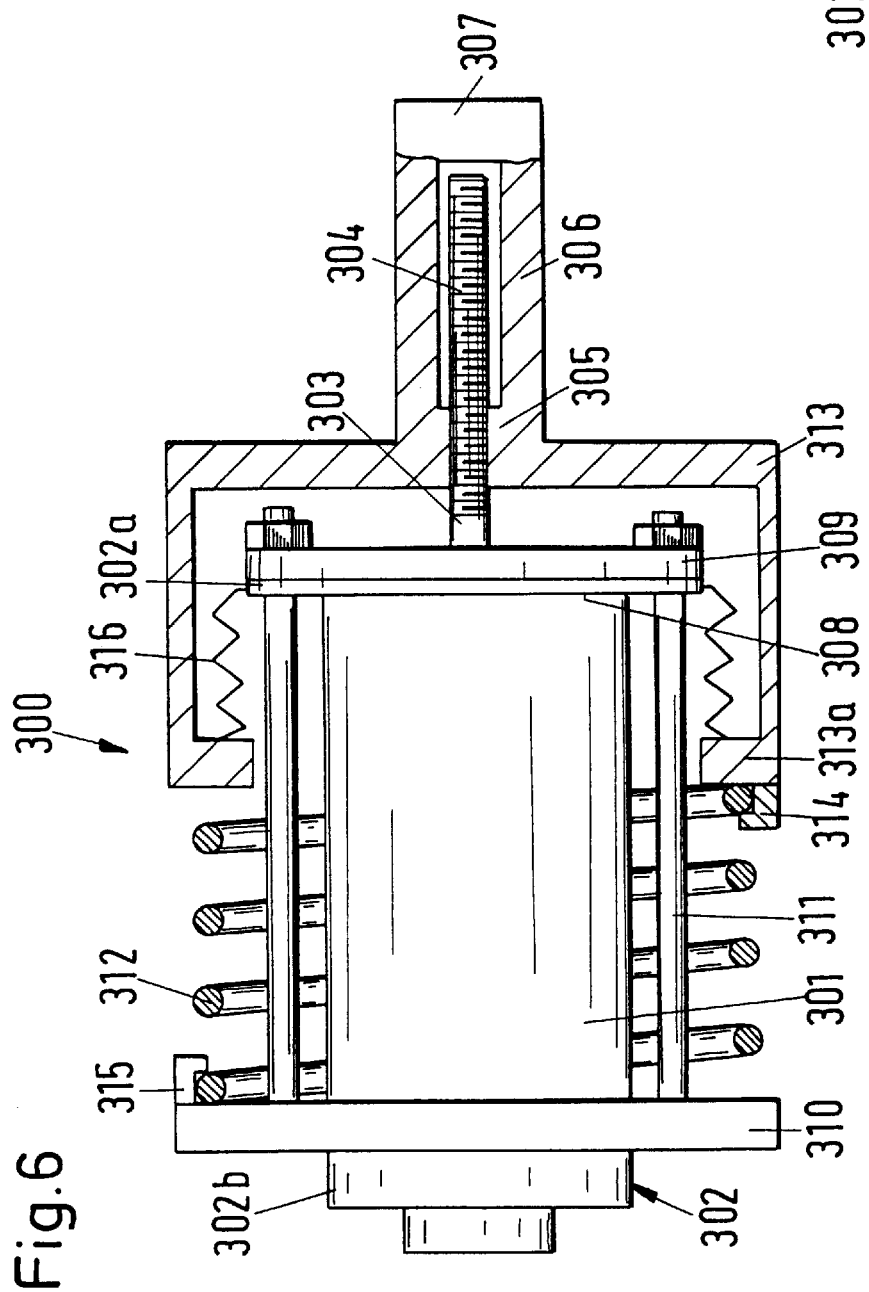

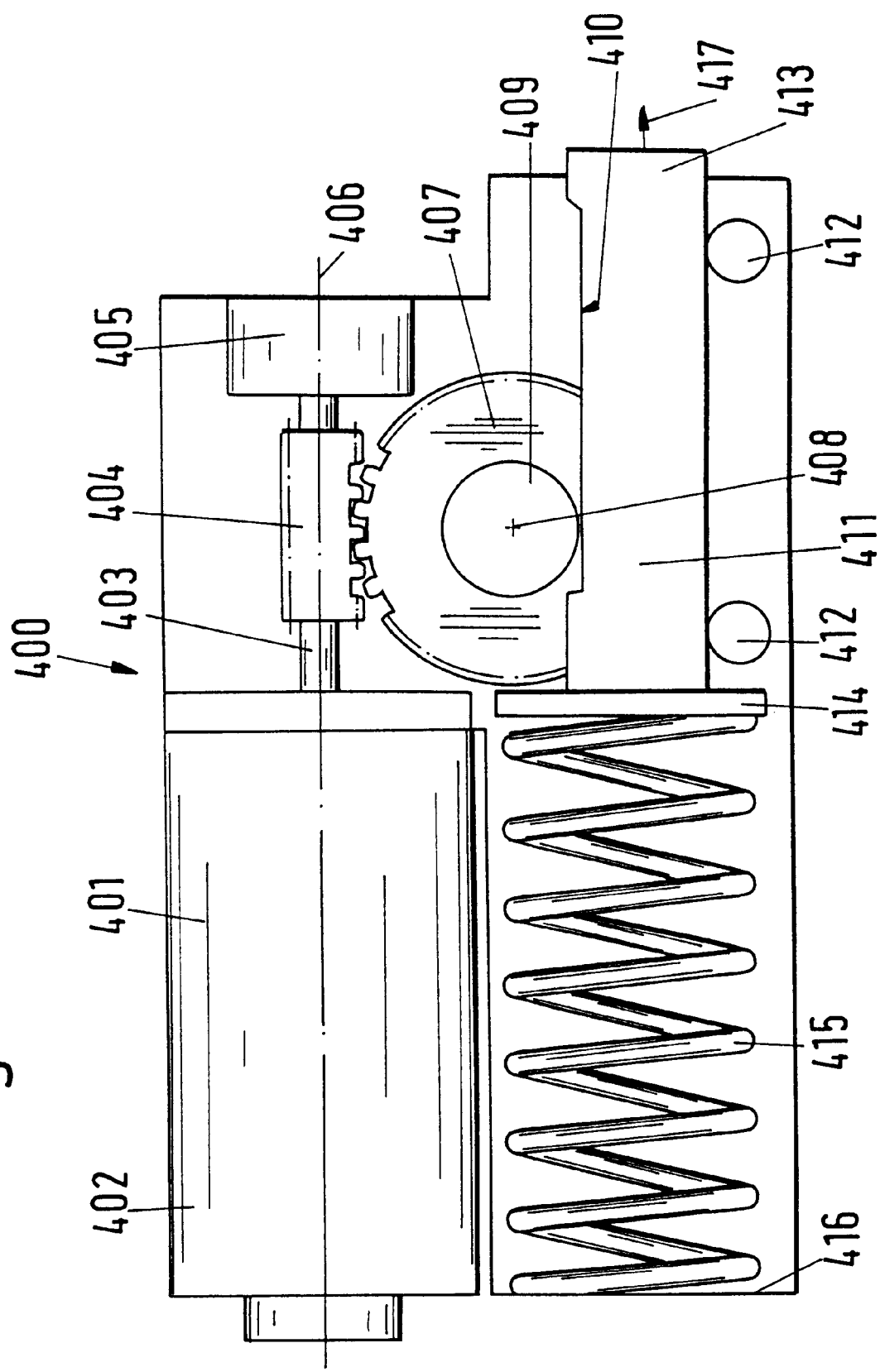

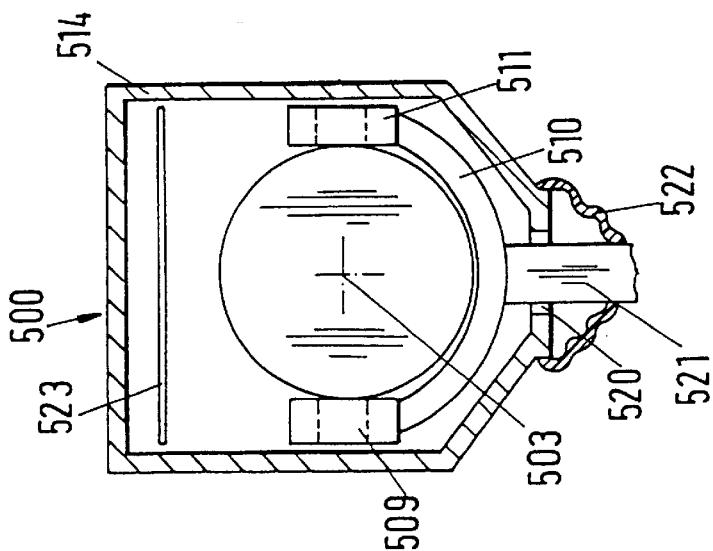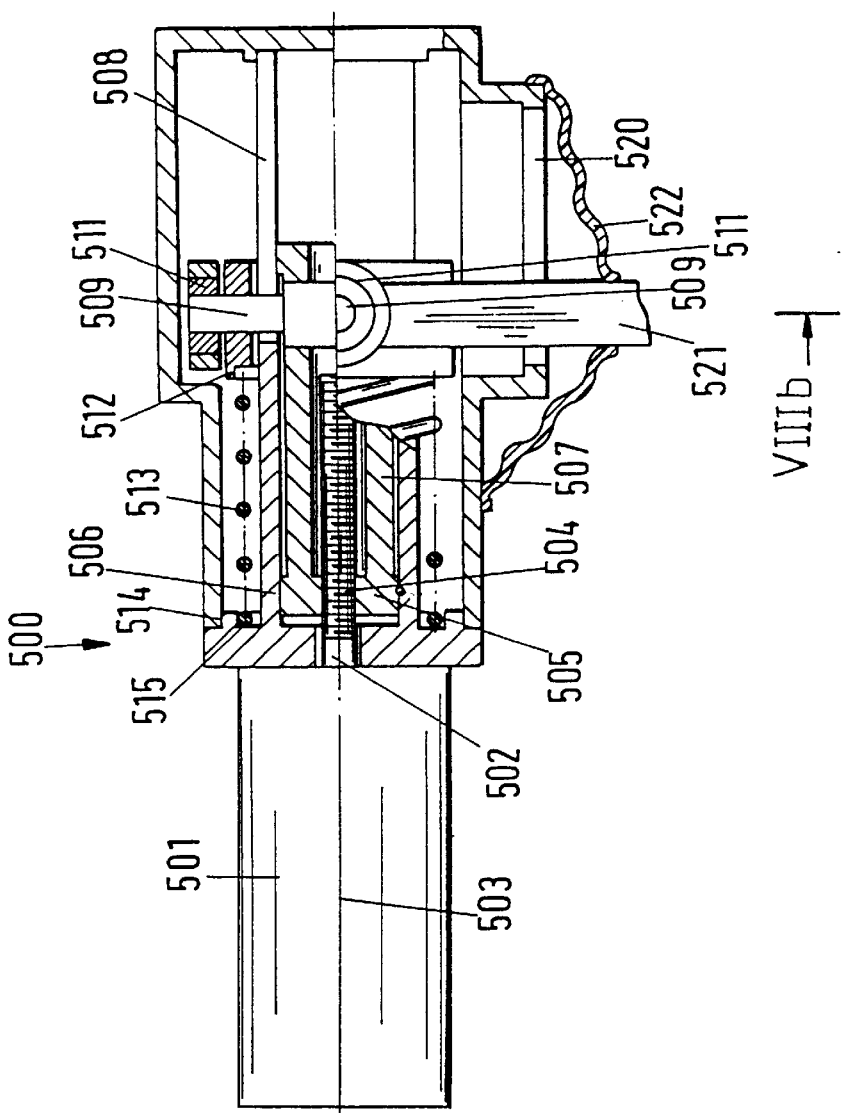

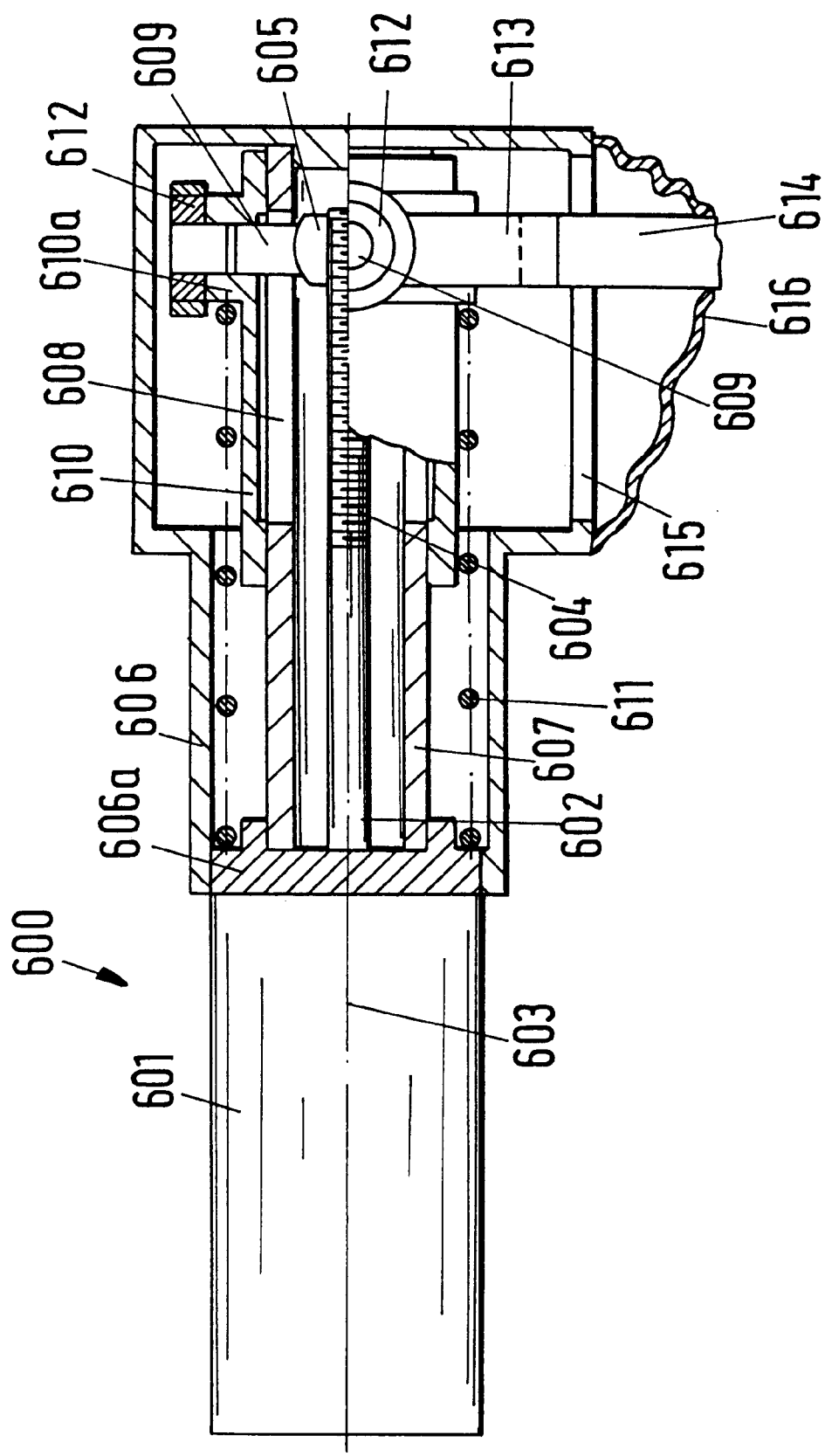

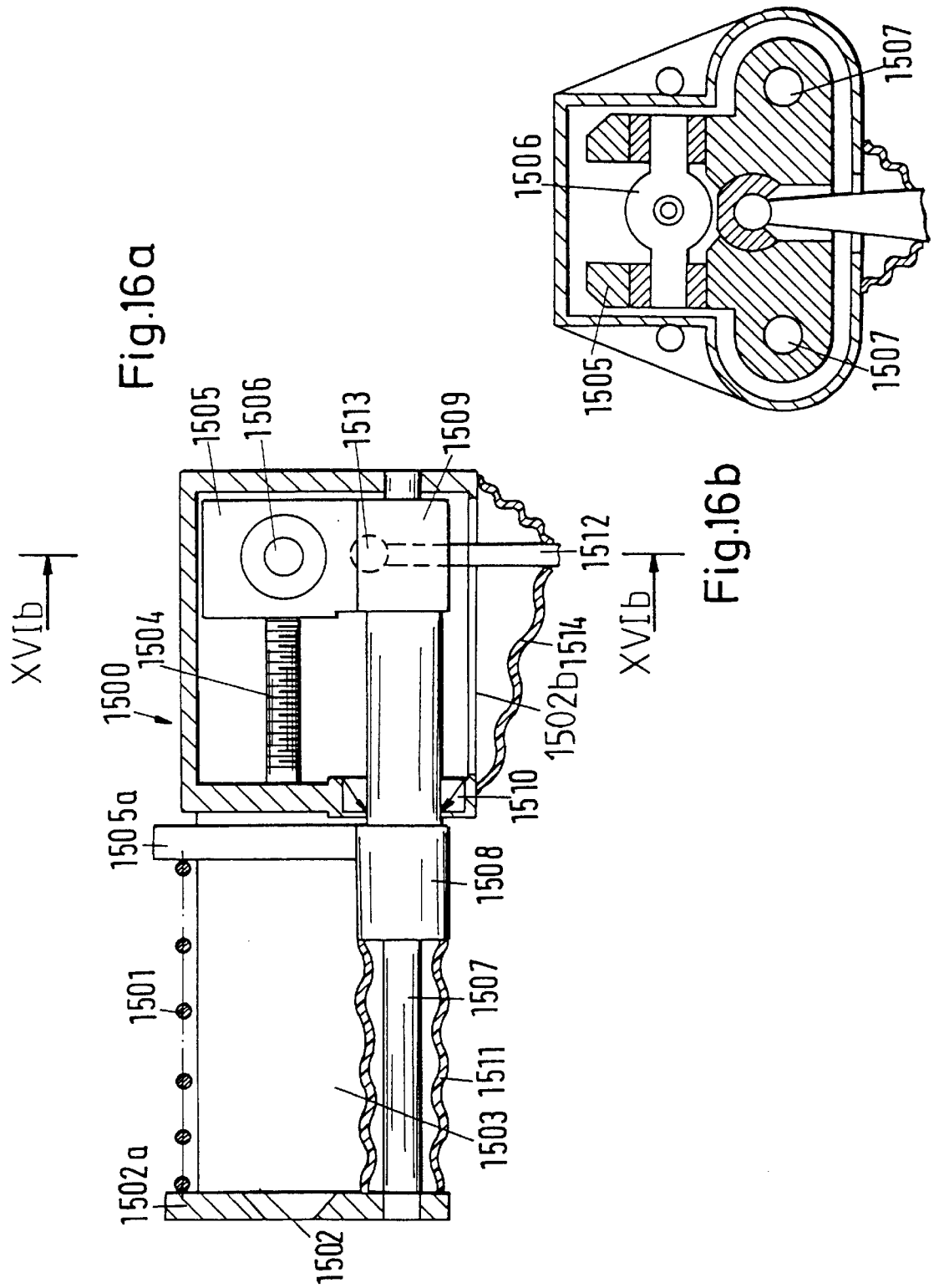

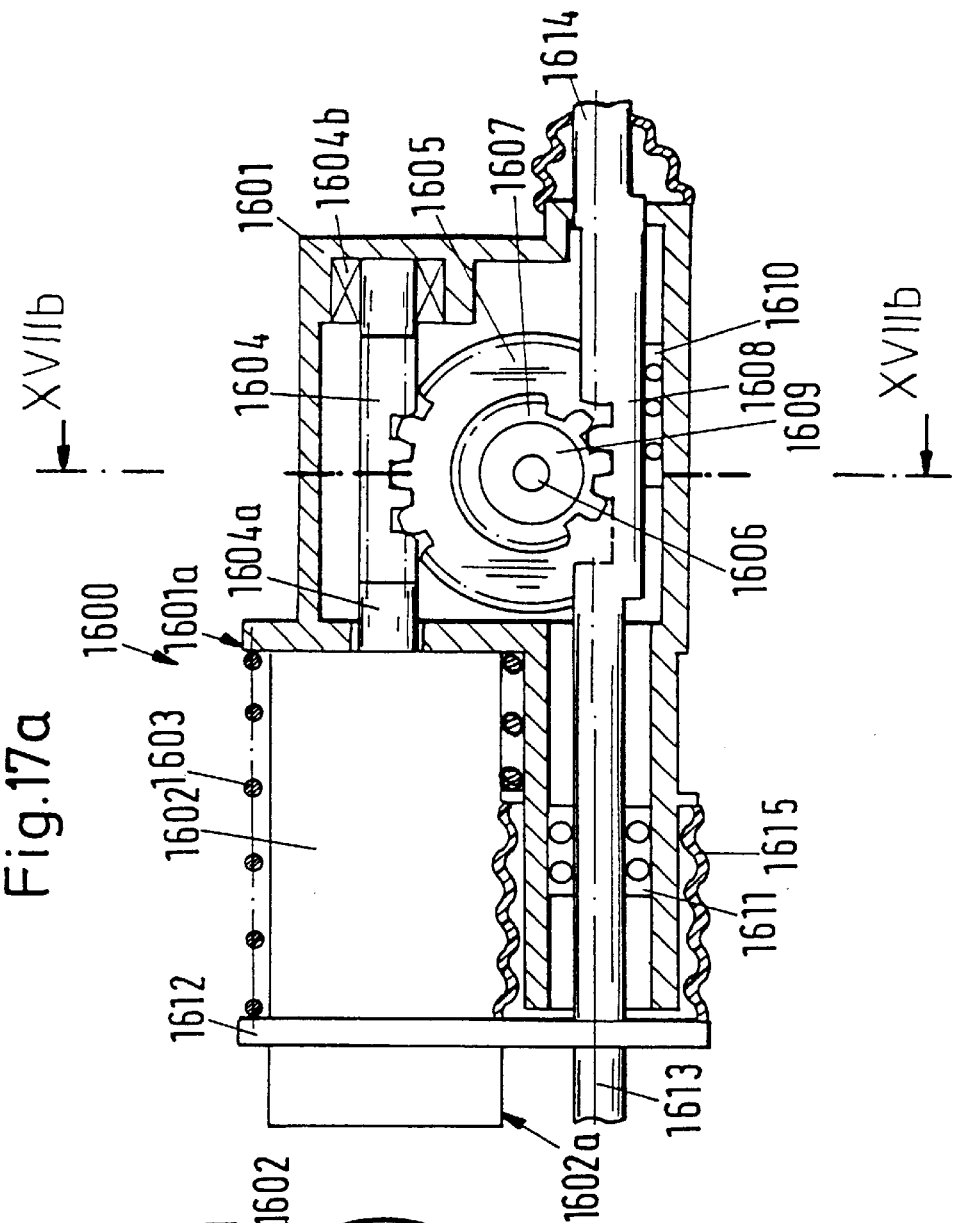
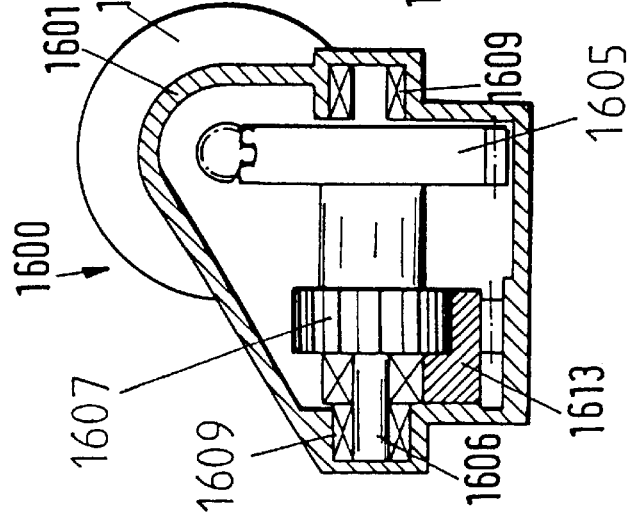
Fig.17a
Fig.17b

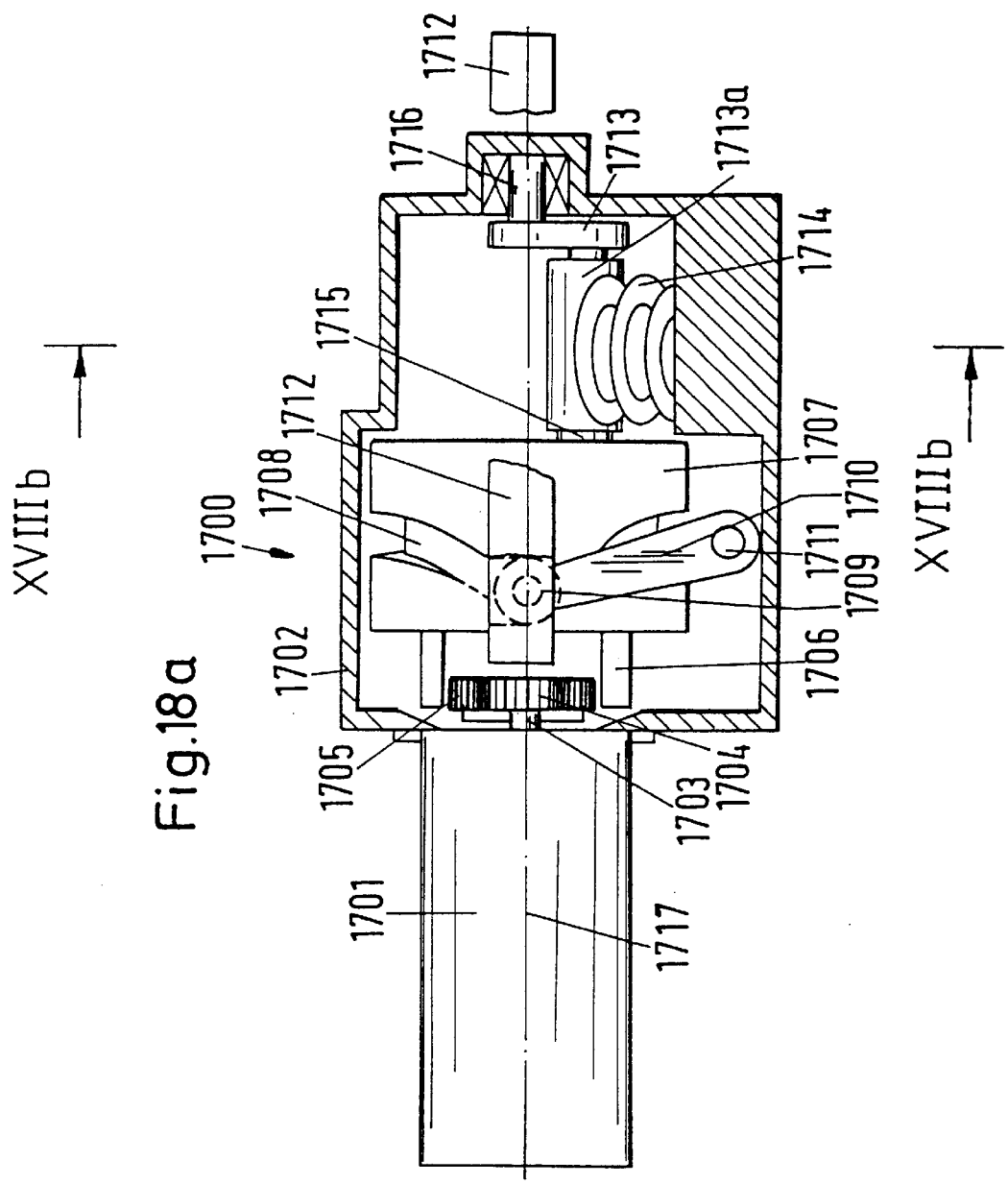

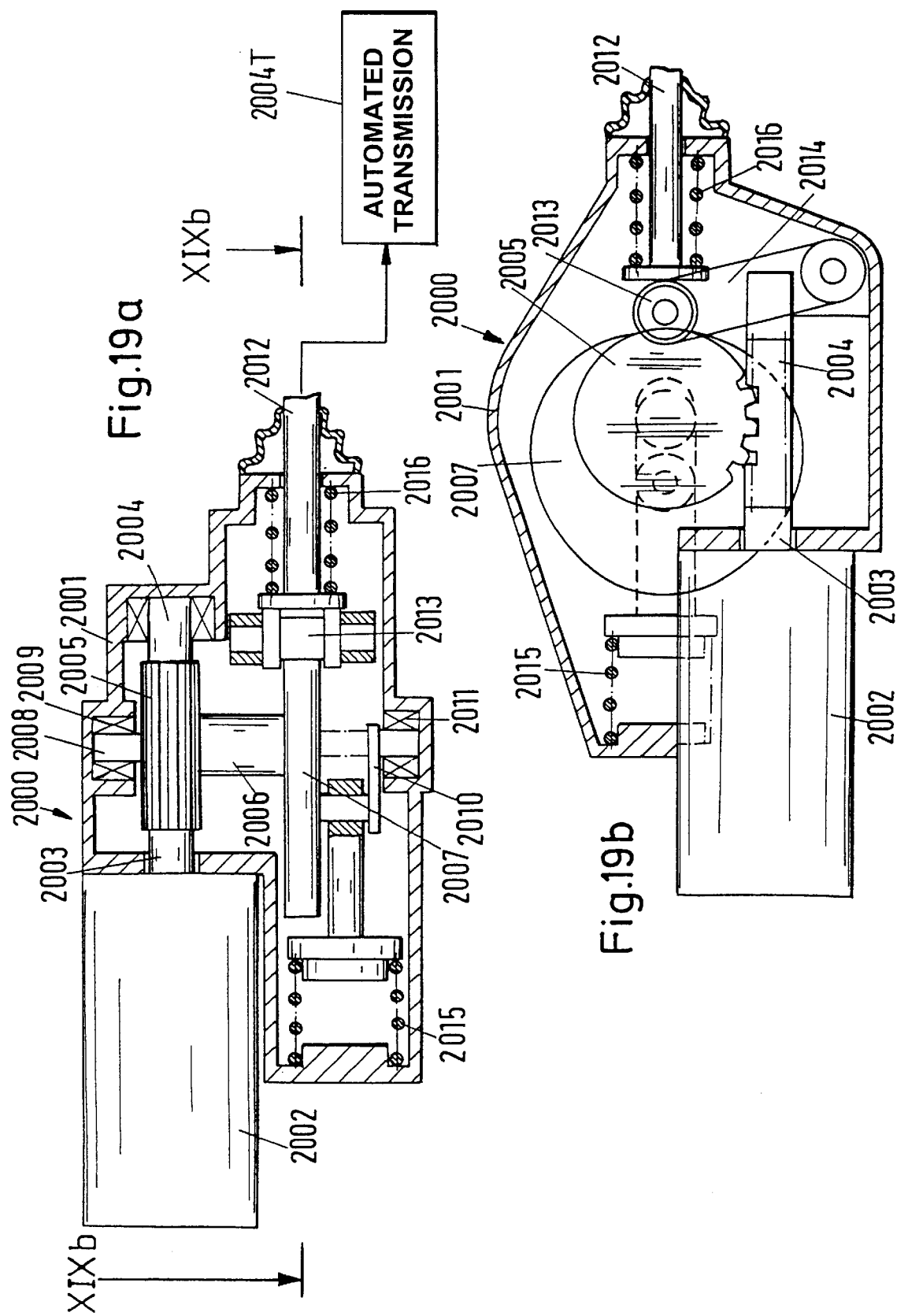

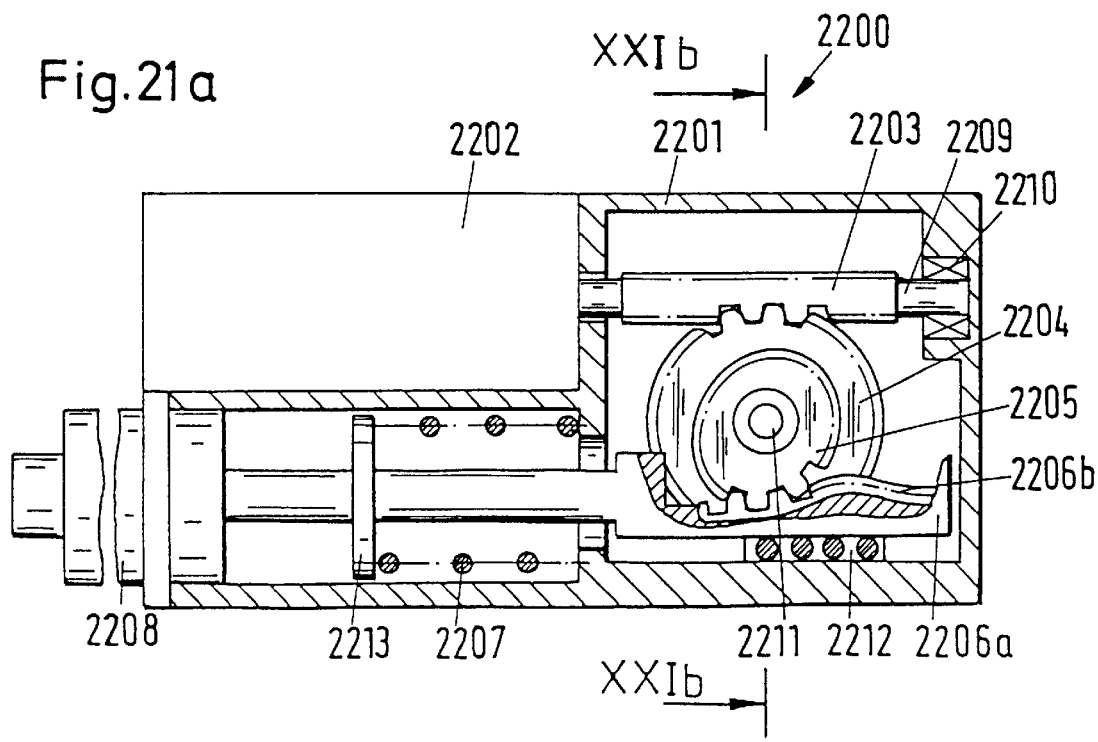
Fig.21a
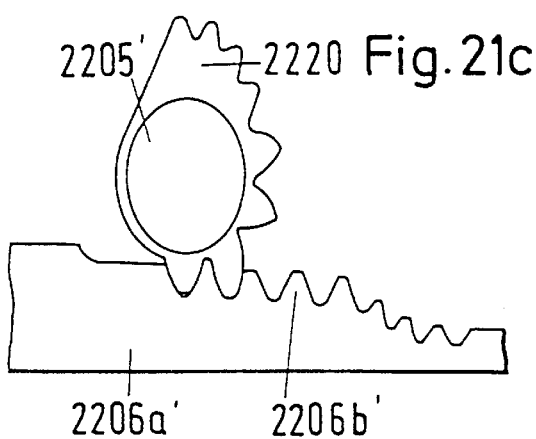
Fig.21c
Fig.21b
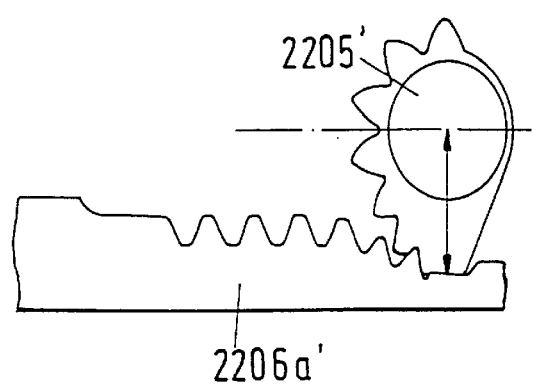
Fig.21d

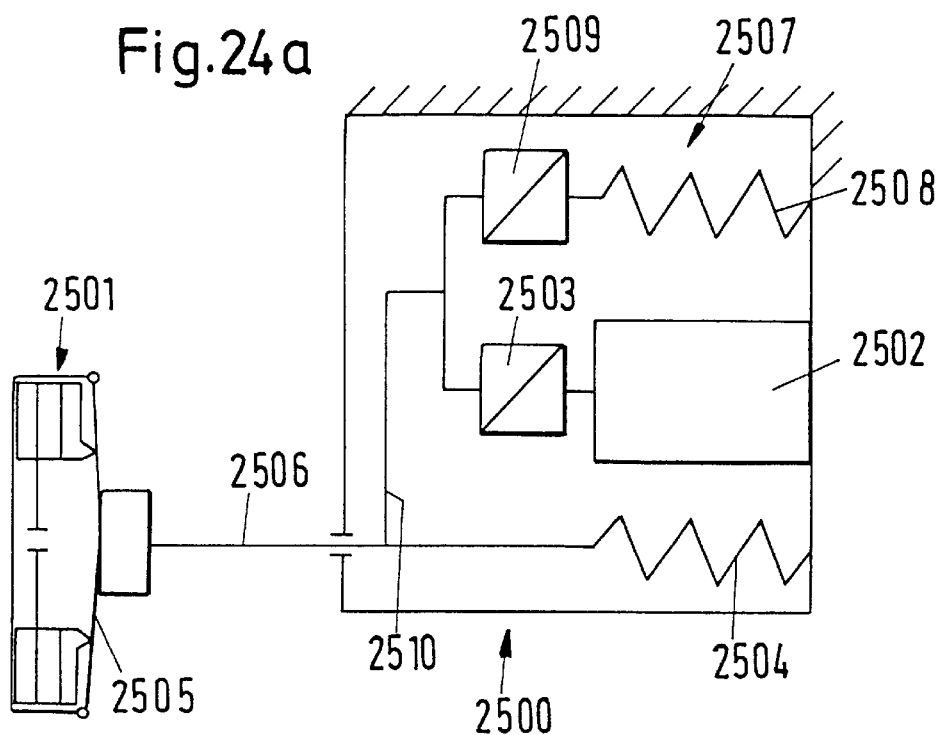
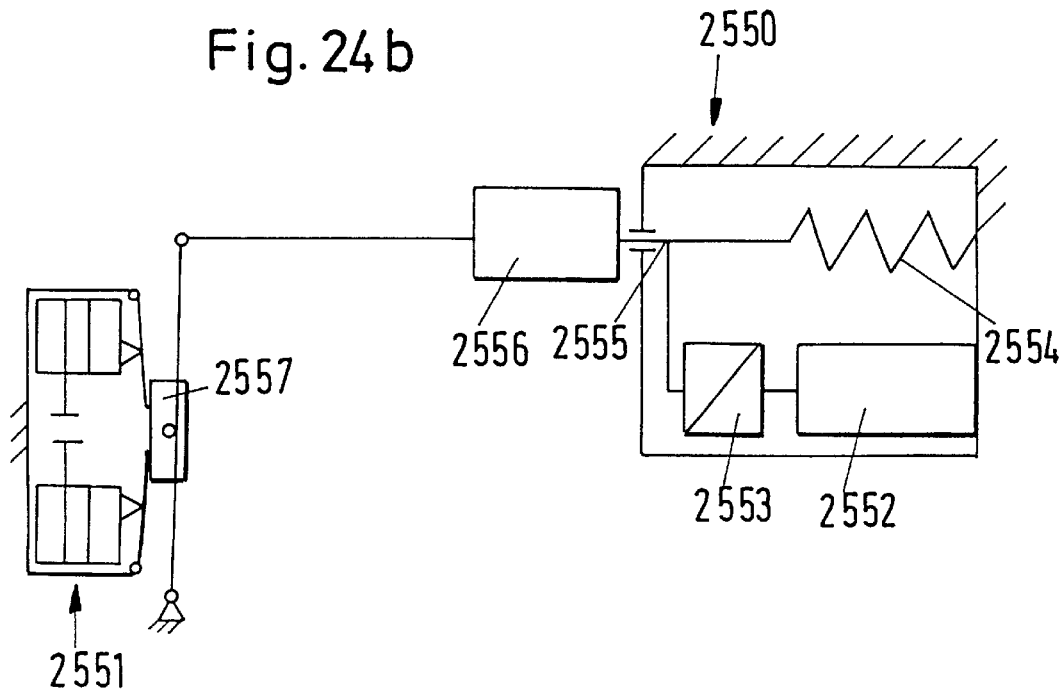

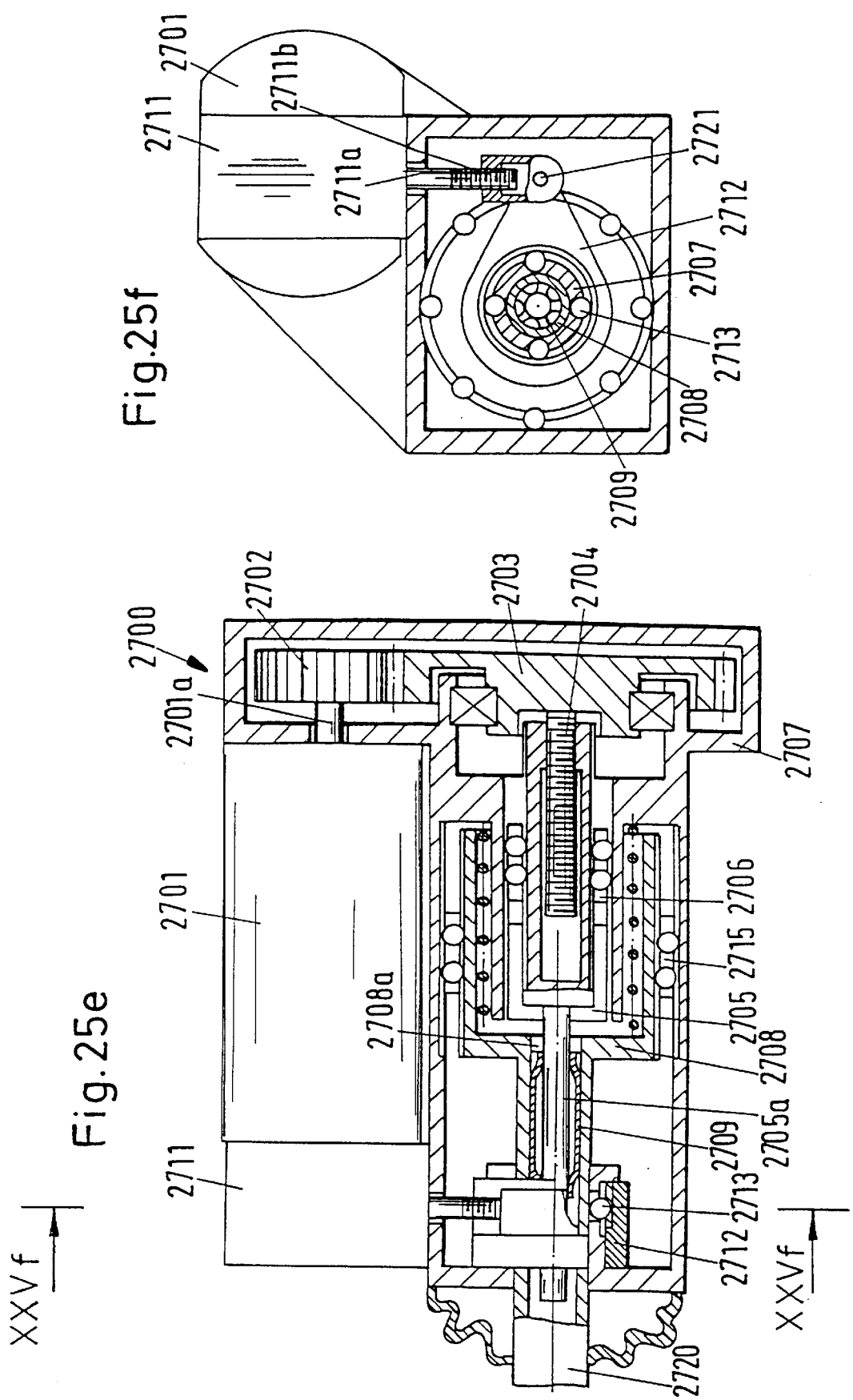

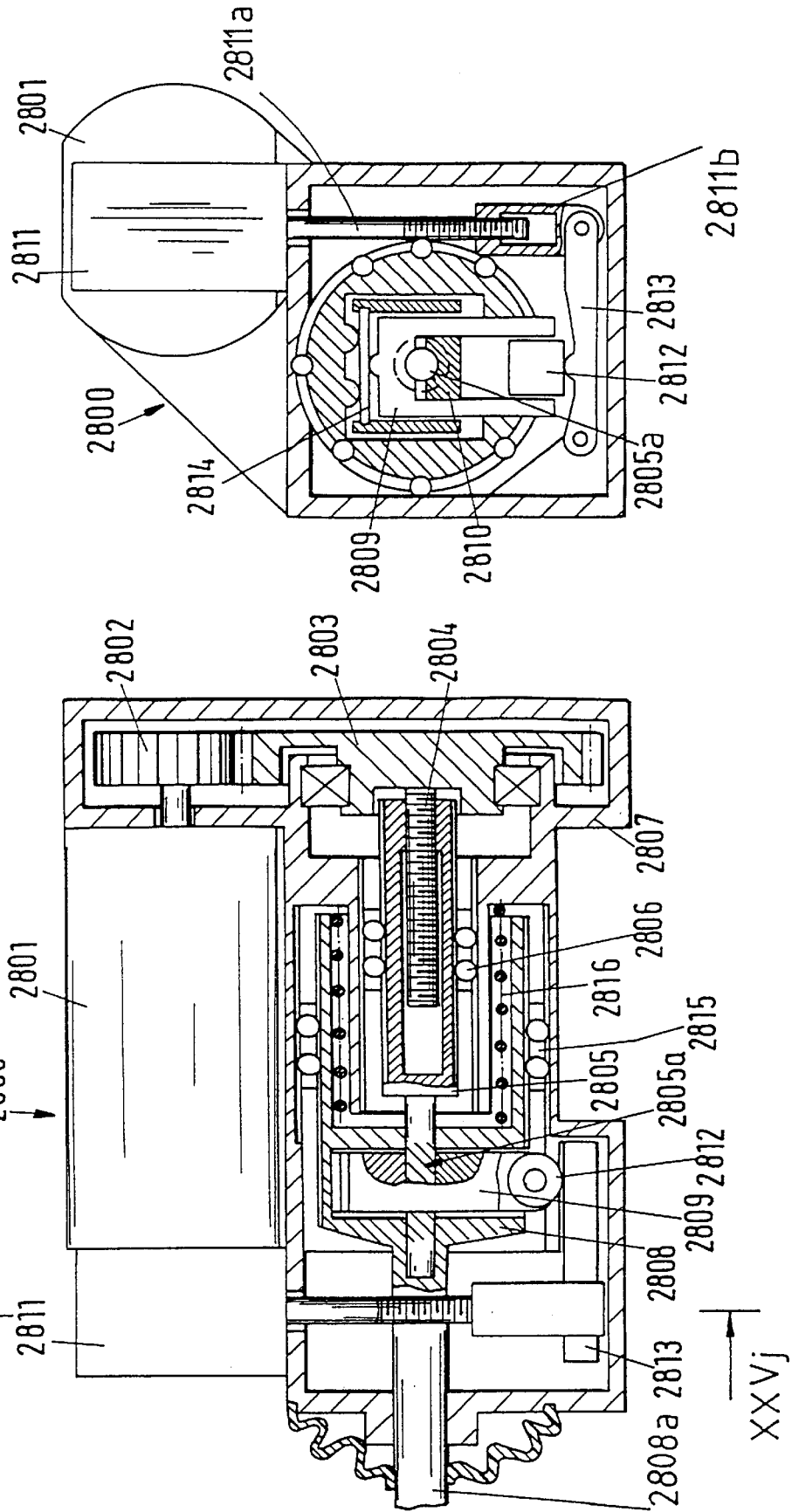

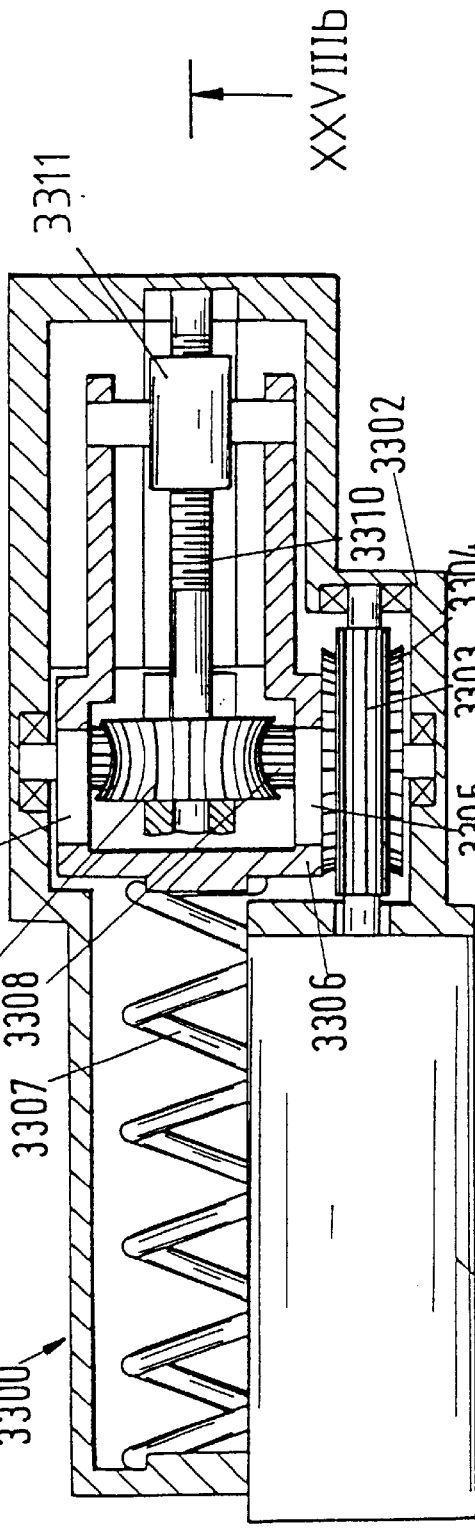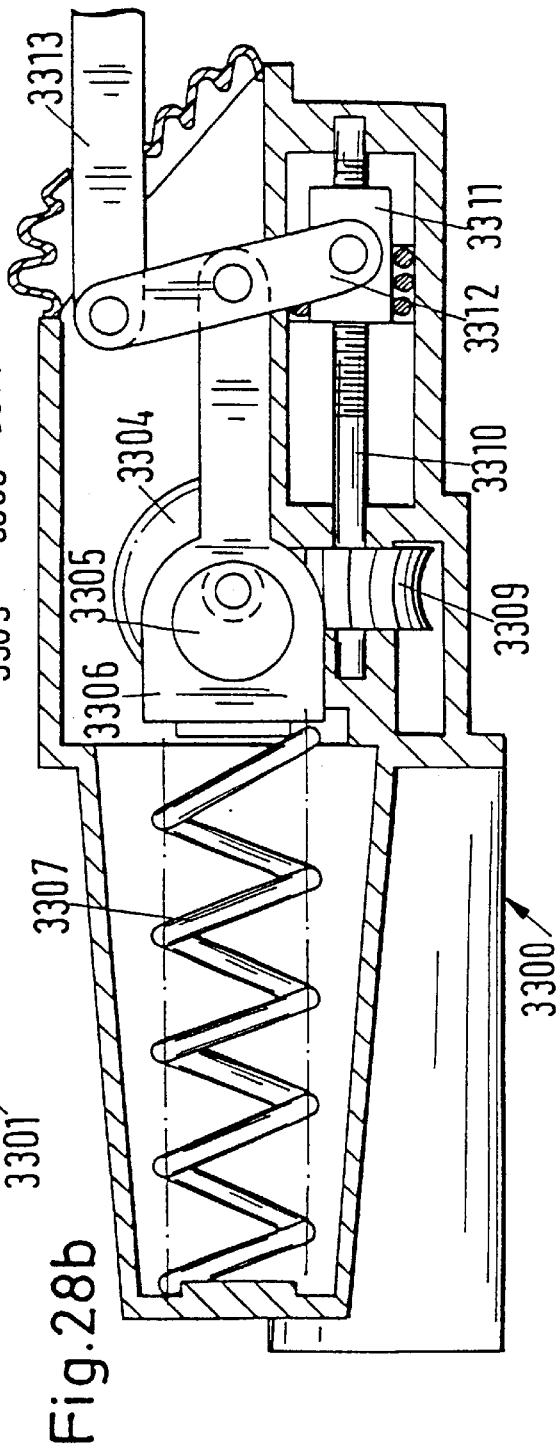

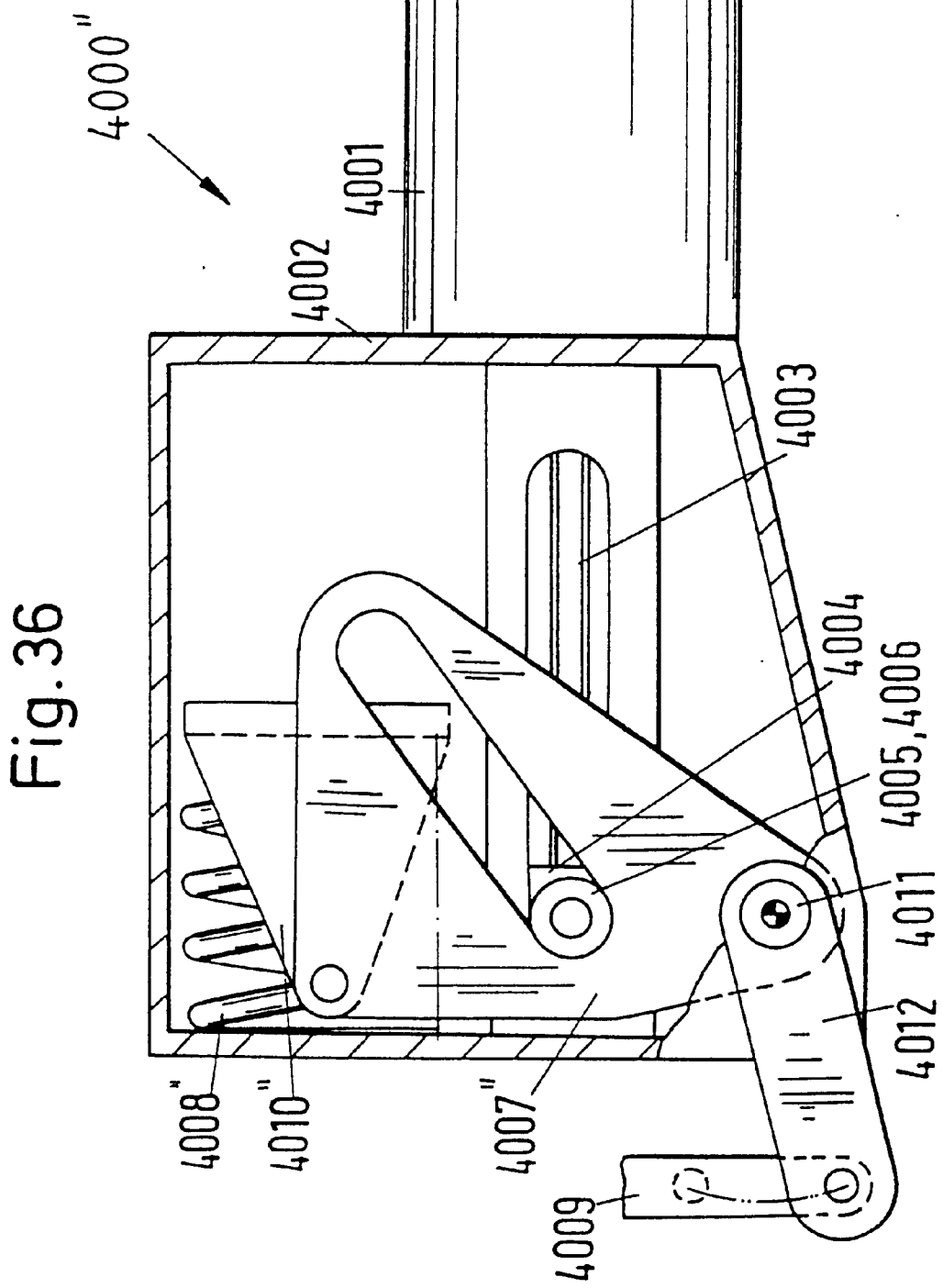

APPARATUS FOR ACTUATING AN AGGREGATE IN THE POWER TRAIN OF A MOTOR VEHICLE

BACKGROUND OF THE INVENTION

The invention relates to motor vehicles in general, and more particularly to improvements in apparatus for operating certain constituents of power trains in motor vehicles. Still more particularly, the invention relates to improvements in apparatus for automatically adjusting, controlling, regulating and/or otherwise operating the torque transmitting system and/or the transmission system in the power train of a passenger car, a van, a truck or another motor vehicle.

The power train of a motor vehicle normally comprises a driving arrangement (such as a combustion engine or a motor), a manual or automated or automatic transmission which receives torque from the driving arrangement and which can transmit torque to the front and/or rear wheels of the vehicle, and one or more clutches or other types of torque transmitting systems. For example, a friction clutch can be installed in the power train between the rotary output element (such as a crankshaft or a camshaft) of an internal combustion engine and the input element of the transmission, and such clutch is adjustable to transmit a desired torque.

It is already known to provide a motor vehicle with a control unit which can receive signals from one or more sensors serving to monitor one or more parameters of the vehicle (such as the RPM of the output member of the engine, the input RPM of the transmission, the condition (extent of engagement or disengagement) of the clutch, and/or others). The control unit evaluates and/or otherwise processes such signals and/or memorized information and automatically adjusts the clutch when an adjustment is deemed necessary.

OBJECTS OF THE INVENTION

An object of the invention is to provide a novel and improved control unit of the above outlined character.

Another object of the invention is to provide a control unit which can effect automatic changes of the operation of one or more constituents of the power train in a motor vehicle in a novel and improved way.

A further object of the invention is to provide a control unit which can automatically adjust a friction clutch or another torque transmitting system and/or a manual or automatic or automated transmission system in the power train of a motor vehicle.

An additional object of the invention is to provide the control unit with novel and improved means for actuating or operating a torque transmitting system and/or a transmission system.

Still another object of the invention is to provide novel and improved means for assisting the prime mover of a control unit so that the prime mover must exert a relatively small force in order to change the condition of a friction clutch and/or the gear ratio of a transmission system in the power train of a motor vehicle.

A further object of the invention is to provide a novel and improved method of operating the torque transmitting system and/or the transmission system in the power train of a motor vehicle in dependency upon variations of all such parameters which must be taken into consideration to ensure the transmission of an optimal torque and/or the shifting of the transmission system into a proper gear ratio.

Another object of the invention is to provide a simple, compact and inexpensive control unit of the above outlined character.

An additional object of the invention is to provide a novel and improved operative connection between one or more output elements of the actuating means of a control unit and the mobile part or parts of a friction clutch or another torque transmitting system and/or a transmission system.

Still another object of the invention is to provide a control unit which can operate a clutch and/or a transmission system in a manner which does not affect the comfort to the occupant or occupants of the motor vehicle in spite of the compactness, simplicity and relatively low cost of the control unit and its actuating means.

Another object of the invention is to provide a novel transmission for use in the actuating means of the above outlined control unit.

A further object of the invention is to provide a novel and improved distribution of various component parts in the above outlined control unit, particularly in the actuating means of such control unit.

An additional object of the invention is to provide a control unit which can be combined with the power trains of existing motor vehicles.

SUMMARY OF THE INVENTION

The invention is embodied in an apparatus for operating at least one constituent of a power train in a multiple-constituent motor vehicle wherein the constituents include a driving arrangement (e.g., an internal combustion engine), a transmission system (e.g., an automated, an automatic or a manual transmission which can be shifted in reverse, in neutral or in any one of a plurality of forward gear ratios), and a torque transmitting system (e.g., a friction clutch between the engine and the transmission, a starter clutch, the lockup clutch or bypass clutch of a hydrokinetic torque converter, or another clutch).

The improved apparatus comprises a control unit and a plurality of signal transmitting sensors connected with the control unit. The control unit comprises means (called actor) for actuating the at least one constituent, and the actuating means comprises a prime mover (such as an electric motor), a transmission in torque receiving relation with the prime mover, at least one output element between the transmission and the at least one constituent, and energy storing means arranged to transmit force to the at least one output element so that the latter can actuate the at least one constituent in response to the application of force which is supplied by at least one of the prime mover and the energy storing means. Thus, the energy storing means renders it possible to reduce (at least at times) the force which must be supplied by the prime mover for the actuation of the at least one constituent.

In addition to signals from one or more sensors, the control unit can also receive signals from one or more electronic units, for example, from the electronics of the engine, from the electronics of the torque transmitting system and/or from the electronics of the transmission system. Still further, the control unit can receive data which are stored in one or more memories.

In accordance with a presently preferred embodiment, the at least one constituent which is operated by the actuating means of the control unit is the torque transmitting system, and such torque transmitting system can include a friction clutch which can transmit a selected torque from the driving arrangement to the input member of the transmission system.

In lieu of a friction clutch, the torque transmitting system can include a disc clutch or the aforemetioned lockup or bypass clutch forming part of a torque converter.

It is also possible to utilize the output element of the actuating means for the transmission of forces to one or more mobile parts of the (manual, automated or automatic) transmission system; such transmission system can transmit torque to a differential for the wheels of a motor vehicle. For example, the transmission system can include a so-called change gear or an infinitely variable speed drive.

The transmission which is connected to an output member of the prime mover of the actuating means can constitute a single-stage transmission or a multi-stage transmission. For example, the single-stage transmission or at least one stage of a multi-stage transmission can include or constitute a feed screw transmission (wherein a rotary feed screw can move a non-rotary nut or a rotary nut can move a non-rotary feed screw), a set of spur gears, a set of bevel gears, a single-stage or multi-stage planetary, a Bowden cable, a worm gear transmission, a hypoid gear transmission, a crank drive, a rack-and-pinion drive, or a cam drive.

For example, if the transmission of the actuating means is a multi-stage transmission, a first stage of such transmission can have a step-down ratio and a second stage can also have a step-down ratio which is identical with or different from the ratio of the first stage. The step-down ratio of the second stage can be smaller or larger than that of the first stage.

It is also possible to employ a multi-stage transmission having a first stage which includes a set of spur gears or bevel gears and a second stage including a feed screw meshing with a nut.

The energy storing means of the actuating means can react against a portion of the transmission and bear (directly or indirectly) upon the at least one output element. For example, the transmission can include a cam drive and the energy storing means can react against such cam drive and bear (directly or indirectly) upon the at least one output element of the actuating means. Alternatively, the transmission can include a crank drive and the energy storing means can react against a portion of the crank drive or the at least one output element to bear against the at least one output element or against the aforementioned portion of the crank drive.

The energy storing means can include one or more springs, e.g., one or more compression springs or coil springs or spiral springs or so-called wrap or wraparound springs. It is also possible to employ energy storing means including at least one spring which is made, at least in part, of a suitable elastomeric material, e.g., a material selected from the group consisting of caoutchouc and synthetic plastic substances.

The at least one spring of the energy storing means can be coaxial with the rotary output shaft of the prime mover (particularly a preferably reversible electric motor), such prime mover forming part of the actuating means of the improved control unit. Alternatively, the axis of the at least one spring can be parallel to the axis of the rotary output member of the prime mover. The at least one spring of the energy storing means can be mounted to surround the housing or casing of the prime mover or it can be mounted adjacent to such housing so that its axis (e.g., the axis of a coil spring) is at least substantially parallel with and spaced apart from the axis of the rotary output member (shaft) of the prime mover (as seen in the radial direction of the axis of such output member).

The at least one spring of the energy storing means can (but need not) be coaxial with the output member of the prime mover regardless of whether or not it surrounds a portion of or the entire housing or casing of such prime mover.

If a single-stage transmission (or one stage of a multi-stage transmission) comprises a feed screw, the energy storing means can comprise a spring which is coaxial with such feed screw. Alternatively, the axis of this spring can be parallel to the axis of the feed screw, i.e., the spring can be located radially outwardly of the axis of the feed screw. The feed screw can be coaxial with or parallel to the axis of the output member of the transmission. In accordance with one of the presently preferred embodiments of the improved control unit and its actuating means, the energy storing means can include at least one coil spring having an axis which coincides with or is parallel to the axis of the output member of the prime mover.

The housing or casing of the prime mover can comprise a wall and the energy storing means can comprise at least one spring which reacts against the wall and bears against the at least one output element or reacts against the at least one output element and bears against the wall.

The at least one output element can comprise a pusher, a toothed rack, a piston, a piston rod, a link, a shaft, a linkage or other motion transmitting means. If the at least one output element comprises a link or a linkage, such motion transmitting means can be articulately connected to a component of the actuating means, such as the output member or another part or portion of the transmission. The means for articulately connecting can include a universal joint, a ball (spherical) joint, a swivel joint or any other suitable joint.

The at least one output element can include a portion which is connectable with the wire or with the sheath of a Bowden cable, and the sheath or the wire of such cable can be affixed to a motion receiving part of a torque transmitting system and/or a transmission system in the power train of a motor vehicle.

The connection between the at least one output element and a motion receiving part (or the at least one output element itself) can comprise a portion which is connectable with a member (e.g., a piston or a piston rod) of a fluid-operated (hydraulic or pneumatic) motion transmitting device. For example, the at least one output element can be connected with or can include or constitute the piston or another part of a master cylinder or a slave cylinder. A connection between a clutch and the at least one output element can include a first cylinder (such as a master cylinder), a second cylinder (such as a slave cylinder) and a fluid-containing connection (such as a hydraulic or pneumatic conduit) between the two cylinders.

If the connection between the at least one output element and the at least one constituent (particularly a torque transmitting system) includes a fluid-operated motion transmitting device, the latter can include a piston or a rod or an analogous part which constitutes or forms part of a central disengaging member of the torque transmitting system. Alternatively, the fluid-operated device can include a cylinder having a mobile output member and a mechanical linkage between the mobile output member and a mobile part of the at least one constituent.

The transmission can comprise a gear segment, one or more oval gears or other suitable means for transmitting motion at a rate other than a constant rate in response to rotation of an output shaft of an electric motor forming part of or constituting the prime mover of the actuating means in the improved control unit.

The transmission can include a metallic piston or it can comprise an elastomeric portion or a rotary member and a bearing for such rotary member. The bearing can be a radial bearing or an axial (thrust) bearing.

If the at least one constituent is or includes a torque transmitting system, such system can include an engageable and disengageable clutch. The energy storing means of the actuating means in the control unit for such clutch can comprise at least one prestressed spring which is arranged to maintain the clutch in an at least partially engaged condition by way of the at least one output element in an idle condition of the actuating means. The clutch can constitute a friction clutch, such as a push-type or a pull-type clutch. The clutch can be set up to transmit a predetermined torque when it assumes the at least partially engaged condition; this can serve to prevent unintentional rolling of the motor vehicle along an upwardly or downwardly sloping road surface.

Alternatively, the clutch can comprise resilient or other suitable means for ensuring that the clutch assumes an at least partially engaged condition when the actuating means is idle. The resilient means of the clutch can be prestressed and can include a diaphragm spring, a compression spring and/or a spiral spring.

As a rule, certain parts of the torque transmitting system (such as a friction clutch) are subject to wear when the torque transmitting system is in actual use. It is often desirable to provide means for automatically compensating for such wear.

If the control unit serves to operate an engageable and disengageable friction clutch which forms part of or constitutes the torque transmitting system, the clutch is or can be installed in such a way that it is disengaged in the idle condition of the actuating means of the control unit.

The mounting and initial adjustment of the clutch can be such that, when the actuating means is idle, the clutch transmits, or is capable of transmitting, a torque which is less than the nominal torque of the engine (driving arrangement) in a motor vehicle. This normally requires at least partial engagement of the clutch in the idle condition of the actuating means. The torque which the clutch can transmit in the idle condition of the actuating means can be between 10% and 90% (normally between 35% and 75%) of the nominal torque of the engine.

If the at least one constituent is a friction clutch which forms part of or constitutes the torque transmitting system, the transmission and the at least one output element of the actuating means can constitute or form part of an operative connection between the output member (e.g., a rotary shaft) of the prime mover of the actuating means an a clutch disc which has friction linings and forms part of the friction clutch. Such operative connection can further include at least one resilient element (which can include or constitute the aforementioned energy storing element) serving to maintain the friction clutch in an at least partially engaged condition in the idle condition of the actuating means. The arrangement can be such that the at least one resilient element maintains the clutch in a condition (e.g., in a partly engaged condition) in which the clutch is ready to transmit a predetermined torque.

The friction linings of the clutch disc can comprise two sets of linings, and such clutch disc can further comprise at least one spring which is disposed between the two sets of friction linings and stores energy at least in the at least partially engaged condition of the clutch. The energy storing means can be set up to operate between the clutch disc and the at least one output element. The clutch can further comprise at least one resilient element (e.g., a diaphragm spring) which stores energy in each (engaged, disengaged or partly engaged) condition of the clutch.

The transmission of the actuating means can but need not be a self-locking transmission. Such transmission can include a gear (e.g., a spur gear or a bevel gear or a worm wheel) rotatable about an axis which is at least substantially parallel to the axis of a rotary output member (such as a shaft) of the prime mover forming part of the actuating means. Alternatively, a gear of the transmission can be coaxial with the output member of the prime mover.

The housing of the actuating means can be fixedly or adjustably secured to the chassis or frame of the motor vehicle. For example, the vehicle frame can include a plastic wall which carries the actuating means of the improved control unit. A wall of the frame can have a side which confronts the driving arrangement (such as the engine) of the motor vehicle, and the actuating means of the control unit can be disposed at such side of the wall. Alternatively, the actuating means can be installed at that side of a wall of the vehicle frame which faces the passenger compartment (or the driver's compartment, depending upon the nature of the vehicle).

It is also possible to install the actuating means on the driving arrangement (such as a combustion engine) or on the transmission system of the motor vehicle.

As already indicated hereinbefore, the actuating means of the control unit can be set up to select for a friction clutch of the torque transmitting system a partially engaged condition when the control unit (such as the prime mover of the actuating means of the control unit) is idle.

The novel features which are considered as characteristic of the invention are set forth in particular in the appended claims. The improved control unit itself, however, both as to its construction, its mode of operation and the mode of installing the same, together with numerous additional important and desirable features and advantages thereof, will be best understood upon perusal of the following detailed description of certain presently preferred specific embodiments with reference to the accompanying drawings.

BRIEF DESCRIPTION OF THE DRAWINGS

FIG. 1a is a schematic view of certain parts of a motor vehicle wherein the improved control unit is utilized to operate a friction clutch constituting a torque transmitting system between the engine and the transmission system of the vehicle, with the clutch shown in section;

FIG. 2 is a schematic view of the actuating means or actor of a control unit, a schematic sectional view of a friction clutch, and a diagrammatic view of a connection between the output element of the actor and a motion receiving part of the clutch;

FIG. 3b is a sectional view substantially as seen in the direction of arrows from the line IIIb—IIIb in FIG. 3a;

FIG. 5 is a schematic partly side elevational and partly central longitudinal sectional view of an actor which employs a transmission having a rotary feed screw and an axially movable nut meshing with the feed screw;

FIG. 6 is a schematic partly elevational and partly sectional view of a different actor;

FIG. 6a is a fragmentary partly elevational and partly sectional view of an actor which constitutes a modification of the actor shown in FIG. 6;

FIG. 7 is a schematic elevational view of a further actor;

FIG. 8a is a partly elevational and partly longitudinal sectional view of an additional actor;

FIG. 8b is a transverse sectional view substantially as seen in the direction of arrows from the line VIIIb—VIIIb of FIG. 8a;

FIG. 9 is a partly elevational and partly longitudinal sectional view of another actor;

FIG. 16a is a partly elevational and partly longitudinal sectional view of a further actor;

FIG. 16b is a sectional view substantially as seen in the direction of arrows from the line XVIb—XVIb of FIG. 16a;

FIG. 17a is a partly elevational and partly longitudinal sectional view of another actor;

FIG. 17b is a transverse sectional view substantially as seen in the direction of arrows from the line XVIIb—XVIIb of FIG. 17a;

FIG. 18a is a partly elevational and partly longitudinal sectional view of still another actor;

FIG. 18b is a transverse sectional view substantially as seen in the direction of arrows from the line XVIIIb—XVIIIb in FIG. 18a;

FIG. 19a is a partly elevational and partly longitudinal sectional view of another actor;

FIG. 19b is a sectional view substantially as seen in the direction of arrows from the line XIXb—XIXb in FIG. 19a;

FIG. 21a is a fragmentary schematic partly elevational and partly longitudinal sectional view of a further actor;

FIG. 21b is a transverse sectional view substantially as seen in the direction of arrows from the line XXIb—XXIb in FIG. 21a;

FIG. 21c illustrates certain details of a transmission constituting a modification of the transmission in the actor of FIGS. 21a and 21b;

FIG. 21d illustrates the mating parts of the transmission of FIG. 21c in different positions relative to each other;

FIG. 24a is a schematic elevational view similar to that of FIG. 23 but showing another actor;

FIG. 24b illustrates a different connection between an actor and a friction clutch;

FIG. 25e is a partly elevational and partly longitudinal sectional view of a further actor;

FIG. 25f is a transverse sectional view substantially as seen in the direction of arrows from the line XXVf—XXVf of FIG. 25e;

FIG. 25h is a partly elevational and partly longitudinal sectional view of an actor which constitutes a modification of the actor shown in FIGS. 25e and 25f;

FIG. 25j is a transverse sectional view substantially as seen in the direction of arrows from the line XXVj—XXVj in FIG. 25h;

FIG. 26b is a similar view of an adjusting mechanism constituting a modification of that shown in FIG. 26a;

FIG. 28a is a partly elevational and partly longitudinal sectional view of another actor;

FIG. 28b is a sectional view substantially as seen in the direction of arrows from the line XXVIIIb—XXVIIIb in FIG. 28a;

FIG. 32b is a transverse sectional view substantially as seen in the direction of arrows from the line XXXIIb—XXXIIb of FIG. 32a;

FIG. 34a is a partly elevational and partly sectional view substantially as seen in the direction of arrows from the line XXXIVa—XXXIVa in FIG. 34;

FIG. 36 is a view similar to that of FIG. 34 or but showing stil another actor.

DESCRIPTION OF PREFERRED EMBODIMENTS

Figure 1B:
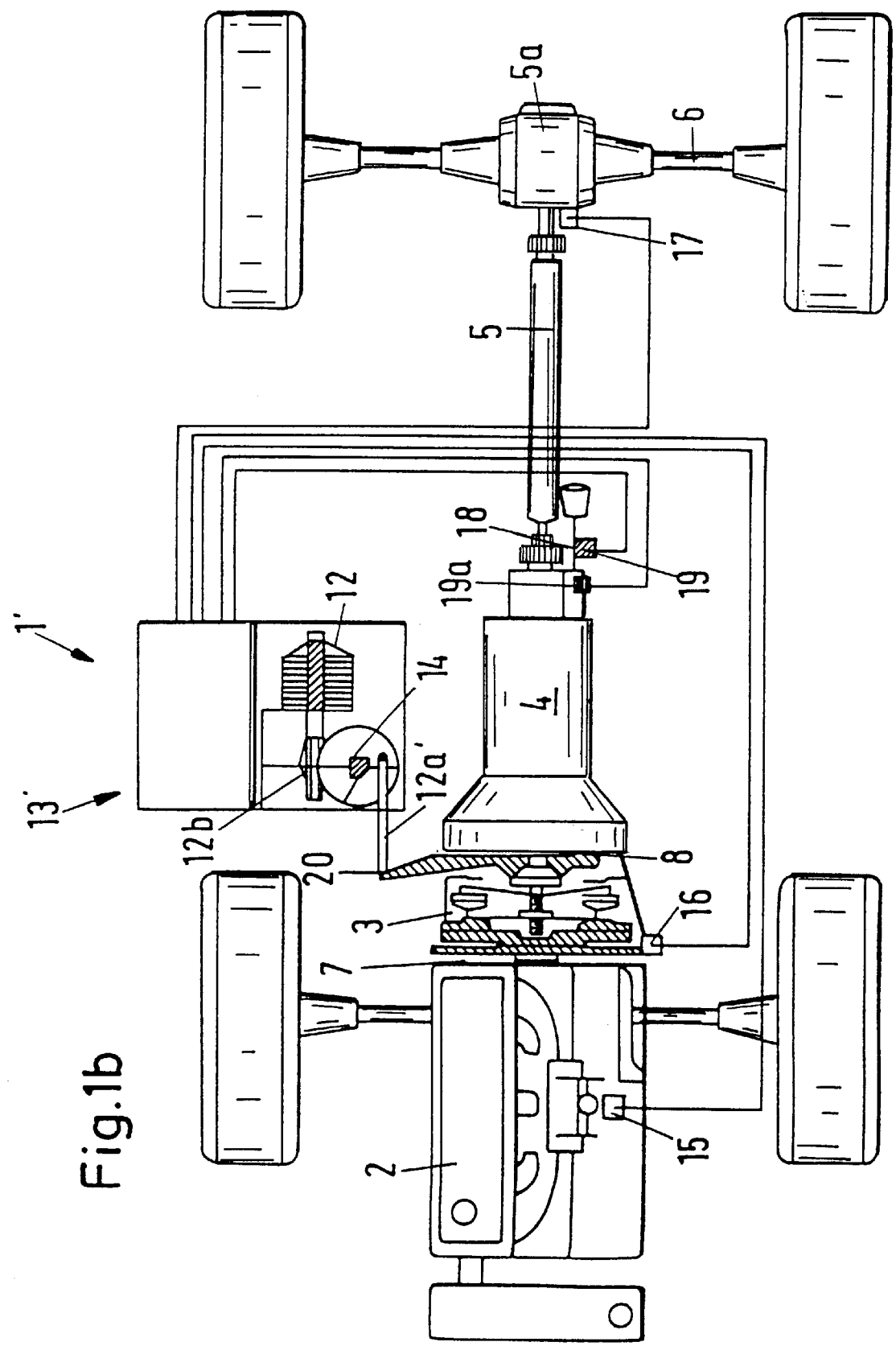
FIG. 1b is a similar schematic view of motor vehicle utilizing a modified control unit to operate a friction clutch, with the clutch shown in section.

Referring first to FIG. 1a, there is shown a portion of a motor vehicle 1 (e.g., a passenger car) with a power train comprising a plurality of constituents including a driving arrangement 2, a torque transmitting system 3, a transmission system 4, a differential 5a normally receiving torque from a rotary output shaft 5 of the transmission 4, and axles 6 which normally receive torque from the differential 5a to drive the (front or rear) wheels. The driving arrangement 2 can constitute a motor, an engine or another prime mover and, for the sake of simplicity, will be referred to as engine. The torque transmitting system 3 can include or constitute a friction clutch, a disc clutch, the lockup clutch (also called bypass clutch) of a hydrokinetic torque converter, or any other system capable of transmitting torque in the power train of a motor vehicle. This torque transmitting system (hereinafter called clutch for short) is shown as being installed between a rotary output member (such as a crankshaft or a camshaft) of the engine 2 and a rotary input member of the transmission system 4; however, it is also possible to install the clutch 3 downstream of the transmission system or to employ the illustrated clutch with one or more additional clutches, such as a clutch downstream of the transmission system and/or a starter clutch. The clutch 3 can be an automatic clutch, an automatically resettable clutch and/or a clutch which automatically compensates for progressing wear upon the friction linings of its clutch disc or clutch plate and/or upon other component parts which are subject to wear during the useful life of the clutch. Such clutches are disclosed, for example, in U.S. Pat. No. 5,409,091 granted Apr. 28, 1995 to Wolfgang Reik et al. for "Automatically adjustable friction clutch"; the disclosure of this patent is incorporated herein by reference.

The transmission system 4 can include or constitute a manually shiftable transmission, such as a multi-step reduction gear (also called range gear). However, the illustrated transmission system 4 can also include or constitute an automatic or an automated transmission. A clutch can be disposed downstream of the system 4 (as seen in the direction of power flow from the engine 2 to the wheel axles 6) if the system 4 includes or constitutes an automated or automatic transmission; such clutch can constitute a friction clutch. It is also possible to employ (upstream of the transmission system 4 and/or elsewhere in the power train) a so-called reversible clutch which is designed to transmit a torque of a predetermined (planned) magnitude. The same holds true for the aforementioned safety clutch.

The reference character 7 denotes in FIG. 1a the input side of the clutch 3 (i.e., the side which receives torque from the engine 2 when the engine is on), and the reference character 8 denotes the output side which receives torque from the input side 7 and transmits torque to the input member of the transmission system 4.

The clutch 3 is actuated (i.e., the magnitude of the torque which the output side 8 of the clutch can transmit to the input member of the transmission system 4 is determined) by a control unit 13 which includes and/or is connected with one or more electronic circuits as well as with one or more sensors (such as the sensors 14–17, 19, 19a). The control unit 13 includes actuating means (hereinafter called actor for short) which constitutes an important part of the control unit and is designed to directly influence the torque selecting element or elements of the clutch 3. FIG. 1a shows an element 20 which is located at the output side 8 and can select the magnitude of the torque to be transmitted from the output side 8 to the input member of the transmission system 4.

The control unit 13 includes a housing or casing which may but need not always accommodate the aforementioned electronic circuit or circuits, i.e., at least one such electronic circuit or unit can be installed in a separate housing or casing. The electronic circuit or circuits in the housing of the control unit 13 and/or in one or more separate housings or casings can serve to regulate the operation of a prime mover 12 (such as an electric motor) which forms part of the actor for the torque selecting element 20 of the clutch 3. Such regulation can include the connection of the prime mover 12 (hereinafter called motor for short) with or the disconnection of the motor from an energy source as well as the regulation of the speed of the output member of the motor, i.e., the electronic circuit or circuits of the control unit 13 can constitute the power electronics for the motor 12 as well as the means for otherwise controlling or regulating the operation of the motor. The placing of at least some of the electronic circuits into the housing or casing of the control unit 13 is normally desirable and advantageous because this contributes to simplicity as well as to compactness of the control unit. The utilization of a compact control unit 13 is desirable in many types of motor vehicles regardless of whether the control unit is installed in the driver's or passenger compartment of or elsewhere in a motor vehicle.

In addition to the motor 12, the actor of the control unit 13 comprises a transmission 12b which receives torque from the motor and transmits motion to an output element 12a. The latter transmits motion to the torque selecting element 20 of the clutch 3 by way of a hydraulic device including a master cylinder 11, a slave cylinder 10 and a fluid-containing conduit 9 connecting the cylinders 11 and 10 with each other. The transmission 12b of the actor of the control unit 13 can constitute a worm gear transmission, a gearing which employs a nut and a feed screw, a spur gear transmission, a planetary, a rack-and-pinion drive, a crank gearing, or a composite transmission such as a combination of a planetary, a feed screw gearing and a pitch-type gear. The transmission 12b can be a single-stage transmission or a multi-stage (e.g., two- or three-stage) transmission. For example, a multi-stage transmission can comprise a first stage constituted by a worm gear transmission and a second stage constituted by or including a crank gearing. It is also possible to assemble a multi-stage transmission from a feed screw gearing and a spur gear transmission or from other combinations of identical or different transmissions.

The transmission 12b of FIG. 1a comprises a two-stage gearing including a worm gear transmission receiving torque from the output member of the motor 12 and a crank gearing which transmits motion to a pusher constituting or forming part of the output element 12a. The latter is connected to the reciprocable piston of the master cylinder 11. This cylinder is or can be a hydraulic cylinder, i.e., the conduit 9 can contain a column of hydraulic fluid. The piston of the slave cylinder 10 can transmit motion to the torque selecting element 20 of the clutch 3 by way of a piston rod 10a.

The illustrated hydraulically operated device including the cylinders 10, 11 and the conduit 9 can be replaced by a pneumatically operated device. Furthermore, the electronic circuitry of the control unit 13 can be designed to directly influence the movements and the position of the piston 10a of the slave cylinder 10 so that the master cylinder 11 and the conduit 9 can be omitted.

The friction clutch 3 of FIG. 1a comprises a clutch disc or clutch plate 3d having two sets of friction linings respectively confronting a flywheel 3b which receives torque from the output member (such as a crankshaft or a camshaft) of the engine 2, and an axially movable pressure plate 3a which is normally biased toward the flywheel 3b by a clutch spring 3c, e.g., a diaphragm spring. The torque selecting element 20 (such as a fork) can select the axial position of the pressure plate 3a and hence the magnitude of frictional forces between the plate 3a and the flywheel 3b on the one hand and the respective friction linings of the clutch disc 3d on the other hand. When the clutch 3 is at least partially engaged, a centrally located hub of the clutch disc 3d transmits torque to the rotary input element of the transmission system 4. The illustrated torque transmitting element 20 can be replaced by a suitable bearing or another centrally located torque selecting (clutch engaging/disengaging) element without departing from the spirit of the invention. The pressure plate 3a is movable axially of the clutch 3 between a first end position in which the clutch is fully disengaged and a second end position in which the clutch is fully engaged as well as to a desired number of intermediate positions in each of which the clutch transmits a different torque. For example, the pressure plate 3a can be moved to one or more intermediate positions in which the magnitude of the torque then being transmitted by the clutch 3 to the input member of the transmission system 4 is less than the nominal torque of the engine 2.

The transmission of torque by the clutch 3 can be regulated by the control unit 13 (and initiated by the actor including the motor 12, the composite transmission 12b and the output element 12a) in such a way that the magnitude of the transmitted torque varies as a function of time. Furthermore, the transmission of torque to the clutch 3 can take place with a so-called follow-up which is intended to denote that the magnitude of torque being actually transmissible by the clutch 3 due to the selected position of the piston rod 10a and the element 20 equals the engine torque being actually transmitted to the input side 7 of the clutch minus the torque being branched off to one or more auxiliary aggregates, such as for example a pump of a power steering system, an air conditioning system and/or others. The magnitude of the torque being branched off to one or more auxiliary aggregates is preferably maintained within a predetermined range, i.e., the difference between the then transmitted nominal engine torque and the torque being transmitted by the output side 8 of the clutch 3 to the transmission system 4 is also maintained within a given range.

However, it is also possible to set the clutch 3 for the transmission of torque having a magnitude exceeding the magnitude of the then prevailing engine torque, for example, to select on purpose a clutch torque which exceeds the then prevailing engine torque by a predetermined value. This renders it possible to transmit desired engine torques but to damp or isolate undesirable peaks and/or other irregularities in the magnitude of the engine torque.

The sensors which are connected with the electronic circuitry of the control unit 13 include the sensor 14 which monitors the setting of the transmission 12b and/or the position of the output element 12a, the sensor 15 which monitors the position of the throttle valve of the motor vehicle 1, the sensor 16 which monitors the RPM of the engine 2, the sensor 17 which monitors the RPM of a rotary part of the differential 5a (to thus determine the RPM of the wheels connected to the axles 6), the sensor 19 which monitors the position of a gear shifting lever 18 of the transmission system 4, and the sensor 19a which monitors the position and/or one or more other parameters of an internal component part of the transmission system 4. The signals from the sensor 17 can be processed with the signals denoting the setting (selected gear ratio) of the transmission system 4 to calculate the RPM of the input member of the transmission system. Signals which are transmitted by the sensor 19 are indicative of the intent of the operator of the motor vehicle 1 to shift the transmission system 4 into a particular gear ratio. On the other hand, those signals which are transmitted by the sensor 19a are indicative of the momentarily selected gear ratio of the transmission system 4. For example, the latter can be shifted into any one of five forward gear ratios, into reverse or into neutral. If the sensor 19a is an analogous sensor, it can further serve to indicate an intermediate stage of the transmission system 4, i.e., the position(s) of one or more internal component parts of the transmission system during shifting from a previously selected gear ratio into a different gear ratio. Thus, the signals from the sensors 19 and 19a enable the electronics of the control unit 13 to take into consideration the actually selected setting of the transmission system 4 as well as one or more parameters which are indicative of the operator's intent to select a different gear ratio.

As already mentioned above, the control unit 13 can embrace or can be communicatively connected with one or more additional electronic systems or units in the motor vehicle 1, for example, with an electronic system of the engine 2, with an electronic system of the transmission system 4 when the latter is an automatic or automated system, with the electronics of a antiblocking system (ABS), with the electronics of an antislip regulating system (ASR) and/or others.

FIG. 1b shows certain parts of a modified motor vehicle 1'. All such parts of the vehicle 1' which are identical with or clearly analogous to the corresponding parts of the vehicle 1 shown in FIG. 1a are denoted by similar reference characters. The main difference between the vehicles 1 and 1' is that the latter comprises a control unit 13' wherein the output element 12a' is directly coupled to the torque selecting element 20 (e.g., a fork) of the clutch 3. Thus, the fluid-operated connection including the cylinders 10, 11 and the conduit 9 shown in FIG. 1a can be dispensed with.

The housing or casing of the control unit 13' can be installed adjacent the housing of the clutch 3 and/or the bell of the transmission system 4 in such position that the output element 12a' can extend into the space for the clutch 3 so that it can be directly coupled to the motion receiving end or portion of the torque selecting element 20. The latter can be replaced by a centrally located bearing or the like. The functions of the sensors 15 to 17 and 19, 19a shown in FIG. 1b are the same as those of the similarly referenced sensors in the motor vehicle 1 of FIG. 1a. The actor including the component parts 12, 12a' and 12b of the control unit 13' shown in FIG. 1b constitutes a simplified and more compact version of the actor 13 which is depicted in FIG. 1a.

FIG. 2 shows a clutch 3' which constitutes a modification of the clutch 3 of FIGS. 1a and 1b in that the torque selecting means includes a disengaging member 55 (e.g., a fork) which carries a centrally located bearing 54 serving to change the position and/or configuration of a diaphragm spring or a set of levers 53 which serve to change the axial position of a pressure plate 52. When the clutch 3' is engaged, the pressure plate 52 cooperates with an engine-driven flywheel (counterpressure plate) 50 to clamp the respective friction linings 51b, 51a of a clutch disc or clutch plate 51. The latter has a hub which is non-rotatably connected with and can transmit torque to a rotary input member of a transmission system (not shown in FIG. 2). One end portion of the member 55 is fulcrumed at 55a (e.g., in the chassis or frame of the motor vehicle), and the other end portion 55b of the member 55 is articulately connected with an output element 56 of an actor 57 forming part of a control unit which determines the magnitude of the torque being transmitted by the clutch 3'.

The clutch disc 51 further comprises resilient segments 51A which are disposed between the two sets of friction linings 51a, 51b and tend to move such sets of friction linings apart, i.e., away from each other as seen in the axial direction of the clutch 3'. Such resilient segments (or otherwise configurated elastic components) between two sets of friction linings forming part of a clutch disc are shown (and their purpose and advantages pointed out) in U.S. Pat. No. 5,450,934 granted Sep. 19, 1995 to Paul Maucher for "Friction Clutch". The disclosure of this patent is incorporated herein by reference.

The actor 57 further comprises a primemover 58 (e.g., an electric motor which receives signals from the electronic circuitry of the control unit embodying the actor 57), a non-self-locking transmission 59 which is driven by the output member of the prime mover 58, and an energy storing element 60 (here shown as a coil spring) which reacts against a housing of the actor 57 and acts upon the output element 56. The transmission 59 can be a single-stage or a multi-stage transmission and can comprise at least one of a feed screw gearing, a spur gear transmission, a planetary, a worm gear transmission, a crank gearing, a bevel gear transmission and/or another suitable transmission or gearing or gear.

The purpose of the energy storing element 60 is to act upon the output element 56 to reduce or to compensate at least for a portion of the force which must be furnished by the prime mover 58 to engage or to disengage the friction clutch 3'. To this end, the energy storing element 60 cooperates with one or more additional energy storing or resilient elements or members, such as for example the aforementioned resilient segments (if provided) between the friction linings 51a, 51b and/or a diaphragm spring which constitutes or is provided in addition to the levers 53 shown in FIG. 2. The energy storing element 60 (with or without additional energy storing elements of the control unit including the actor 57 and with or without one or more energy storing elements of the clutch 3') determines the magnitude of that force which must be furnished by the prime mover 58 in order to at least partially engage or to disengage the friction clutch 3'.

For example, if the part denoted in FIG. 2 by the character 53 is a set of levers which are articulately connected with the flywheel 50 and can be pivoted by the bearing 54 to move the pressure plate 52 axially toward the adjacent set of friction linings 51b (i.e., if the clutch 3' is devoid of a diaphragm spring serving to permanently urge the pressure plate 52 axially toward the flywheel 50), the clutch is at least partially engaged only when the output element 56 pivots the member 55 in a clockwise direction (as viewed in FIG. 2) to an extent which is necessary to ensure that the pressure plate 52 and the flywheel 50 engage the respective friction linings 51b, 51a with a certain force. Such partial engagement can be ensured by the (prestressed) energy storing element 60 which can be constructed, prestressed and installed to urge the output element 56 in a direction to the left (as viewed in FIG. 2) with a predetermined force when the actor 57 is otherwise idle, i.e., when the prime mover 58 is off. Otherwise stated, the energy storing element 60 can ensure that the clutch 3' can transmit a certain torque even if the prime mover 58 of the actor 57 is idle and even if the clutch 3' is not designed to automatically transmit a certain torque when the levers 53 are permitted to assume their starting or neutral positions. For example, the prestressing of the energy storing element 60 can be such that the clutch 3' is set to transmit about 50% of nominal torque when the prime mover 58 of the actor 57 is off.

If the part denoted in FIG. 2 by the reference character 53 includes a set of levers and/or a diaphragm spring (or another resilient element serving to urge the pressure plate 52 axially toward the flywheel 50), the actor 57 can be designed to exert a force upon the member 55 irrespective of the direction of movement to be carried out by the bearing 54. This can be readily achieved by employing a pretressed energy storing element 60 which can assume an intermediate state or condition which can be said to constitute a neutral condition and in which the magnitude of the force transmitted by the element 60 is zero or at least close to zero. This force increases irrespective of whether the element 60 is expanded or contracted as a result of movement from a position corresponding to the aforementioned neutral condition.

Figure 3B:
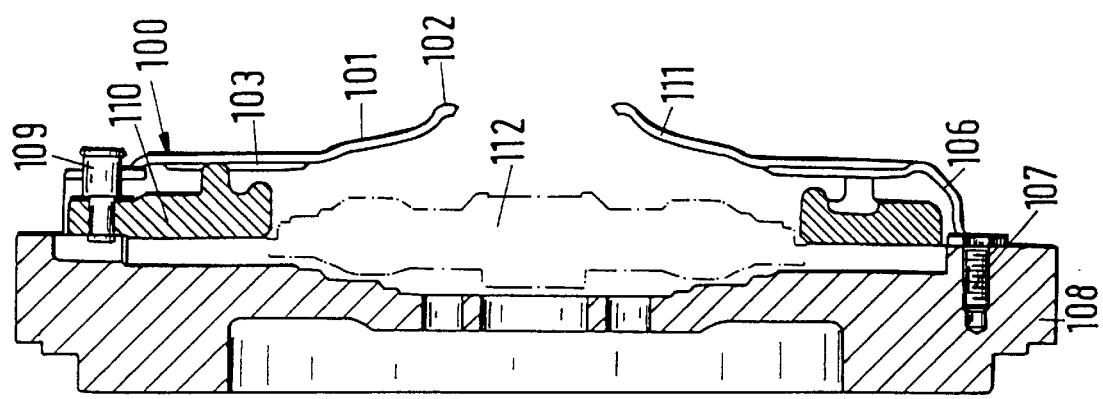
Figure 3A:
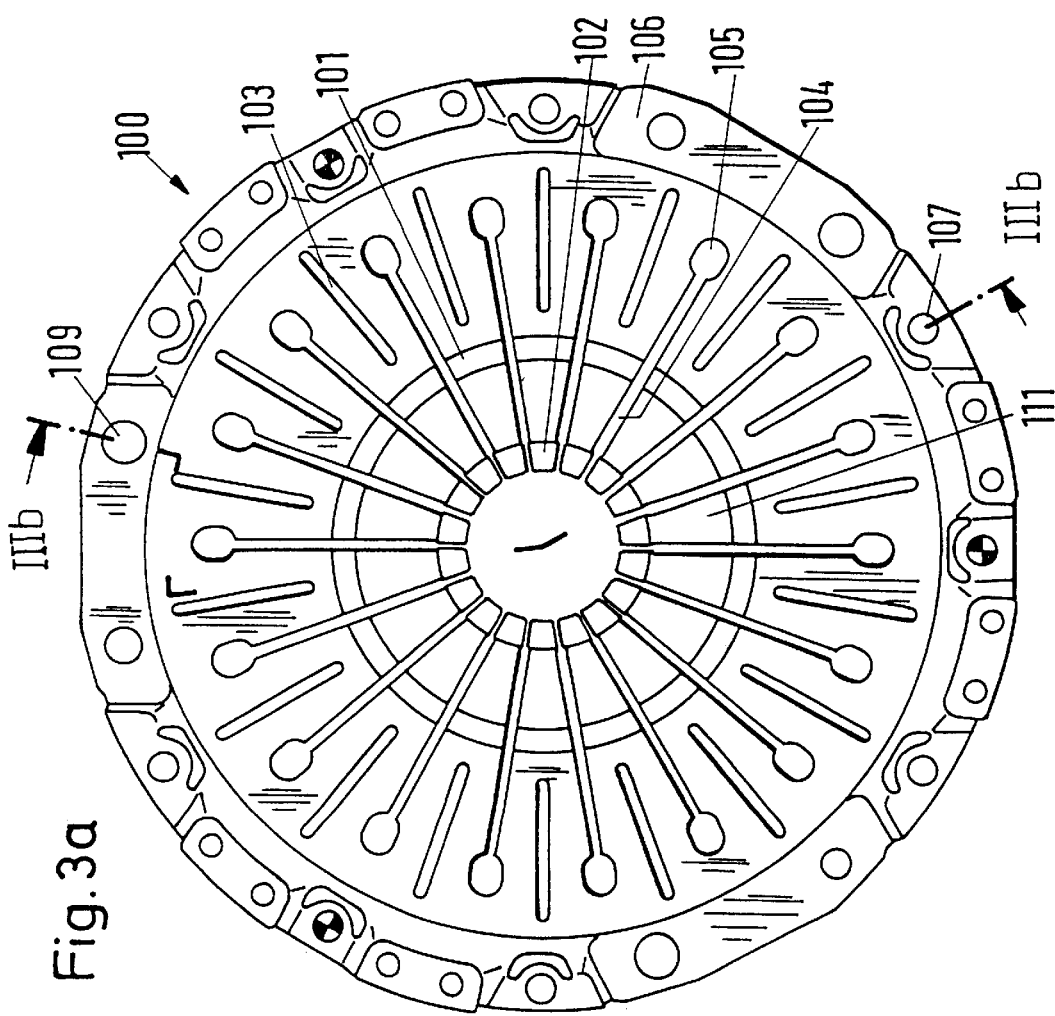
FIG. 3a is an end elevational view of a friction clutch which can be operated by the improved control unit.

FIGS. 3a and 3b illustrate a further clutch which can be at least partially engaged or disengaged by an apparatus embodying the present invention. The clutch comprises a diaphragm spring 100 having a circumferentially complete (peferably uninterrupted) radially outer portion 106 affixed to an engine-driven flywheel or counterpressure plate 108 by fasteners 107. The spring 100 further comprises tongues 101 which extend radially inwardly from the outer or main portion 106 and have free end portions or tips 102 engageable by a bearing (such as the bearing 54 of FIG. 2) or another suitable clutch engaging-disengaging device. The tips 102 are suitably curved for more satisfactory engagement by a bearing or the like. The radially outer portions of the tongues 101 are provided with radially extending reinforcing ribs 103, and the neighboring tongues 101 are separated from each other by radially extending slots 104 having enlarged radially outer portions 105. The ribs 103 reinforce those portions of the tongues or prongs 101 which engage the adjacent projection or projections of a pressure plate 110 when the clutch is at least partially engaged, i.e., when the friction linings of a clutch disc or clutch plate 112 are clamped between the adjacent friction surfaces of the pressure plate 110 and the flywheel 108 so that the hub of the clutch disc can transmit torque to the input member of a transmission system (such as the transmission system 4 shown in FIG. 1a or 1b). The pressure plate 110 is secured to the diaphragm spring 100 in such a way that it shares all angular movements of the parts 100, 108 but is free to perform limited axial movements between such parts. The means for securing the pressure plate 110 to the outer portion 106 of the diaphragm spring 100 and/or to the flywheel 106 comprises axially parallel rivets 109 or other suitable fasteners.

The character 111 denotes those portions of the prongs or tongues 101 which undergo maximum deflection or deformation in order to engage or disengage the clutch of FIGS. 3a, 3b. The illustrated clutch is a pull-type friction clutch, i.e., the diaphragm spring 100 tends to maintain the pressure plate 110 in an axial position corresponding to the fully engaged condition of the clutch and the actor (not shown in FIGS. 3a and 3b) is designed to partially or fully disengage the clutch by pulling the tips 102 of the prongs 101 in a direction to the right, as viewed in FIG. 3b. However, it is equally possible to mount the diaphragm spring 100 (or another suitable clutch spring) on the flywheel 108 in such a way that the clutch spring tends to pull or to permit a movement of the pressure plate 110 to an axial position in which the clutch is fully disengaged. The actor then serves to move the pressure plate of such (push-type) clutch to any one of a number of positions in which the clutch is at least partially engaged.

Otherwise stated, the tips 102 must be pushed toward the flywheel 108 in order to at least partially engage the clutch if the diaphragm spring 100 is installed in an unstressed condition. On the other hand, the tips 102 must be pulled away from the flywheel 108 if the diaphragm spring 100 is installed in a prestressed condition so that it tends to maintain the friction surface of the pressure plate 110 in torque transmitting engagement with the adjacent friction linings of the clutch disc 112.

If the clutch of FIGS. 3a and 3b is to be operated by an actor of the type shown at 57 in FIG. 2, the energy storing element 60 of the actor can be coupled with the output element 56 in such a way that the energy storing element 60 cooperates with the diaphragm spring in a desired manner, e.g., that the clutch of FIGS. 3a and 3b is fully engaged when the actor 57 is idle, that the clutch is fully disengaged in response to idling of the motor 58, or that the clutch is engaged to a desired extent (e.g., so that it can transmit a nominal torque) when the motor 58 is idle. This holds true regardless of whether the clutch disc 112 is provided with resilient segments or other types of resilient elements between the two sets of friction linings which are adjacent the friction surfaces of the pressure plate 110 and flywheel 108.

For example, the prestressing of the diaphragm spring 100 can be selected in such a way that, when the actor is idle, the energy storing element (such as the element 60 shown in FIG. 2) cooperates with the diaphragm spring to ensure that the clutch can transmit approximately 50% of the nominal torque. The output element (such as 56) of the actor must cause a bearing or the like to push the tips 102 of the prongs 101 of the diaphragm spring 100 toward the flywheel 108 in order to increase the magnitude of torque capable of being transmitted by the clutch of FIGS. 3a, 3b, and the output element 60 must cause a suitable device to pull the tips 102 away from the flywheel 108 if the magnitude of transmitted torque is to be reduced to less than about 50% of nominal torque.

As already mentioned above, the clutch 3 which is used in the vehicle 1 of FIG. 1a can be of the self-adjusting type as disclosed in U.S. Pat. No. 5,409,091 to Reik et al. This patent discloses but one of numerous self-adjusting clutches which can be used in the motor vehicle 1 or 1', i.e., wherein the clutch and/or the transmission system can be actuated by an apparatus embodying the present invention. Other types of automatic self-adjusting clutches which can be actuated by the improved apparatus are disclosed in published German patent applications Nos. 42 39 291, 43 06 505, 42 39 289 and 43 22 677. To the extent which is necessary, advisable and/or permissible, the disclosures of these German patent applications (and/or of the corresponding United States patent or patent and/or application or applications) are incorporated herein by reference. Though the wear which is to be compensated for by a self-adjusting clutch is most likely to take place or to be most pronounced upon the friction linings of the clutch disc or clutch plate, the compensating system of such an automatic self-adjusting clutch can also serve to take into consideration the wear on one or more additional parts of the clutch, such as upon the friction surface of the pressure plate, the wear upon the friction surface of the flywheel, the wear upon the diaphragm spring (if a diaphragm spring is being used in the clutch), the wear upon the seat or seats (if any) for the diaphragm spring on the housing or cover of the friction clutch and/or others.

The actor of the control unit which actuates the clutch 3 or 3' and/or the transmission 4 can embody numerous additional features all of which will be described hereinafter. Such additional features include the utilization of an actor with a self-locking or with a non-self-locking output element (e.g., by resorting to an auxiliary or secondary actor of the type to be described, for example, with reference to FIG. 20), with a single energy storing element (such as 60) in the actor, and/or with an adaption of the engagement point and/or friction coefficient. Still further, the transmission of torque to the clutch 3 or 3' can take place with the aforementioned so-called follow-up, for example, in a manner as fully described in published German patent application No. 19 504 847 to which reference may be had, if necessary.

An advantage of a clutch wherein the pressure plate is not invariably biased against the clutch disc (e.g., by a prestressed diaphragm spring) is that such a clutch can be disengaged in response to the application of a minimal or very small force. This holds true even if a diaphragm spring or another clutch spring is installed to exert a relatively small force in a direction to maintain the clutch in the engaged condition. In fact, the clutch spring can be omitted (reference may be had again to the description of FIG. 2) if the clutch is designed to offer little or no resistance to movement of the pressure plate axially and away from the counterpressure plate, i.e., to disengage the clutch. In fact, the aforementioned resilient segments between the two sets of the friction linings forming part of the clutch disc normally tend to move the two sets of friction linings apart, i.e., to move the pressure plate away from the flywheel.

Another advantage of a friction clutch which does not employ a diaphragm spring or another clutch spring (reference can be had again to the description of FIG. 2) is that it is also possible to dispense with the clutch cover or housing which normally carries the clutch spring (reference may be had again to U.S. Pat. No. 5,409,091 to Reik et al.) as well as to dispense with the seat or seats which are normally used to tiltably mount a clutch spring in the form of a diaphragm spring. In other words, the omission of a clutch spring contributes significantly to simplicity, compactness and lower cost of the clutch.

The clutch of FIGS. 3a and 3b is also designed in such a way that it need not be provided with a discrete housing or cover. Thus, the radially outer portion 106 of the diaphragm spring 100 can be said to constitute a housing for the adjacent radially outer portion of the pressure plate 110, and the prongs or tongues 101 (and more specifically their non-reinforced portions 111) can be said to constitute an equivalent of the levers 53 in the clutch 3' of FIG. 2. By the same token, it can be said that the part 100 shown in FIGS. 3a and 3b constitutes a housing which is of one piece with (i.e., which embodies) a diaphragm spring or clutch spring having resiliently deformable tongues or prongs 111 with end portions or tips 102 engageable by a bearing (such as the bearing 54 of FIG. 2) or the like. The mounting of the part 100 can be such that the tongues are under some initial stress or under a stress which suffices to maintain the clutch in a fully engaged condition.

The actor (such as the actor 57 of FIG. 2) can serve the additional purpose of ensuring that the motor vehicle 1 or 1' is not likely to roll when parked on a sloping surface even if the engine 2 is off and the motor (such as the motor 58 of the actor) is also idle. The energy storing element 60 is then installed in such a way that it acts upon the output element 56 in a sense to maintain the clutch in an at least partially engaged condition when the engine 2 and the motor 58 are off. In other words, the energy storing element 60 then acts alone, or cooperates with the clutch spring or with the resilient segments or otherwise configured resilient elements of the clutch disc, to ensure that the clutch is set to transmit a preselected torque such as is sufficient to prevent unintentional rolling of the motor vehicle when the engine 2 is off. The same result can be obtained if the transmission 59 in the actor 57 is of the self-locking type, i.e., when the transmission 59 (rather than the energy storing element 60 and/or the clutch spring and/or the spring or springs of the clutch disc) maintains the output element 56 in an axial position in which the clutch (such as the clutch 3' of FIG. 2 or the clutch of FIGS. 3a, 3b) is set to transmit a certain torque which suffices to prevent an unintentional rolling of the vehicle along an upwardly or downwardly sloping surface. Such self-locking action develops as soon as the motor 58 is turned off.

It is also possible to ensure an automatic partial or full engagement of the clutch 3 or 3' or the clutch of FIGS. 3a and 3b by providing one or more additional resilient elements which are normally idle but become effective in response to deactivation of the engine 2 and of the motor (such as 58) of the actor in order to automatically engage the clutch to an extent which is necessary or desirable to prevent the vehicle from rolling along an upwardly or downwardly sloping road surface.

A mechanical connection between the output element of the actor and the torque selecting part or parts of the clutch is desirable in many instances, for example, when the transmission (such as 59) of the actor is not a self-locking transmission or when the output element (such as 56) of the actor is to be biased by a spring (such as 60) or the like, i.e., by an energy storing element other than a component part of the clutch. The mechanical connection can be established by a rod or link (such as the element 56) or in any one of a number of other ways, for example, by resorting to a linkage, to a rack-and-pinion drive or to a Bowden cable.

Another important advantage of a mechanical connection is that it can be designed to occupy a minimal amount of space, e.g. (and as shown in FIG. 2), the output element of an actor can be coupled directly to a motion receiving part (55) of the clutch. Moreover, the actor can be installed in close or immediate proximity to the clutch. On the other hand, a fluid-operated connection between the actor and the clutch (such as the connection 9–11 shown in FIG. 1a) can be used to accurately transmit motion through greater distances, to be less prone to extensive wear, to be self-lubricating and/or to be less likely to generate noise.

The energy storing element (such as 60) or elements of the actor can be readily designed, installed and dimensioned in such a way that it can or that they can assist the motor (such as 58) to furnish considerable forces such as are required to maintain the clutch in a fully engaged condition. Furthermore, the function of an energy storing element which forms part of or cooperates with an actor can be selected in such a way that the element is active (put to use) when the load upon the motor of the actor is minimal and the condition of the clutch corresponds to that which is required or which must be established more frequently than other conditions of engagement. This can be of advantage, for example, when the clutch is a push-type clutch and the transmission of torque to the clutch takes place with the aforediscussed follow-up.

Figure 4A:
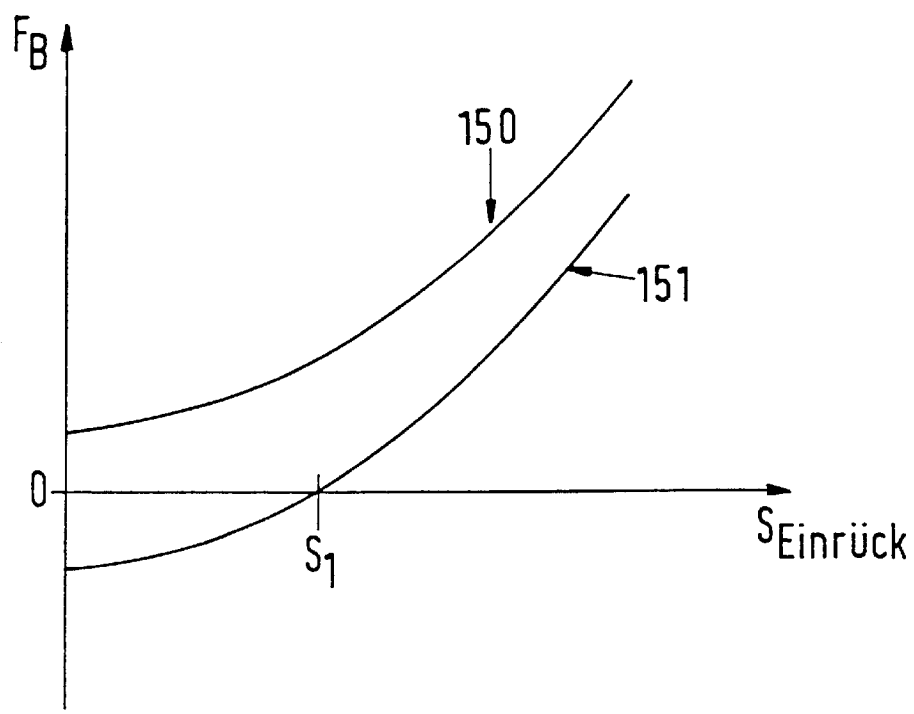
FIG. 4a shows a coordinate system wherein the curves denote the relationship between the force furnished by the prime mover of the actor of a control unit and the distance covered by a mobile part of a torque transmitting system.

Referring to the coordinate system of FIG. 4a, the force $F_B$ furnished by the motor (such as the motor 58 shown in FIG. 2) of the actor (such as the actor 57) is measured along the ordinate, and the distance $S_{Einrück}$ covered by one or more mobile parts of the clutch and/or of the actor (e.g., that covered by the output element 56 of the actor 57) is measured along the abscissa. The curve 150 denotes the variations of the force $F_B$ if the actor operates without a compensating or supporting energy storing element (60), and the curve 151 denotes the variations of the force $F_B$ when the actor embodies an energy storing element (such as the energy storing element 60). It will be noted that the entire curve 150 is at the positive side of the abscissa within the entire range of engagements of the clutch (such as the clutch 3 or 3') which is controlled by the actor. On the other hand, a portion of the curve 151 is at the negative side of the abscissa; the shift or transition from the negative side to the positive side takes place at a point $S_1$ corresponding to a preselected average or median distance being covered by the aforementioned mobile part(s) of the clutch and/or of the actor during a series of changes of the condition of the clutch from zero engagement (disengagement), through a range of partial engagement and to full engagement.

Figure 4B:
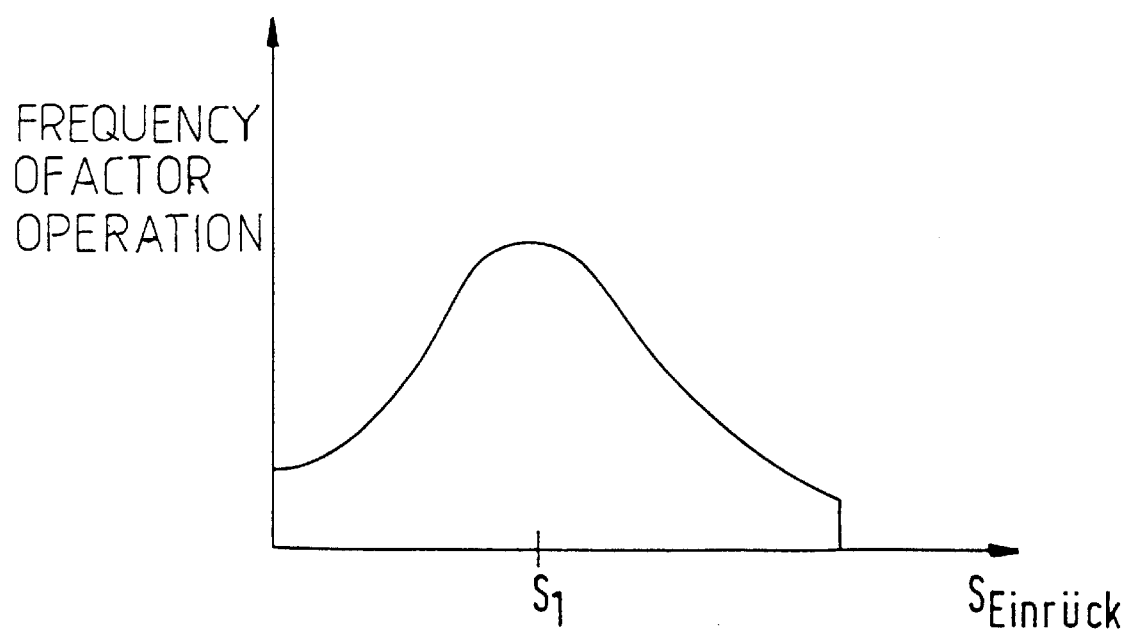
FIG. 4b shows a coordinate system wherein the curve denotes the relationship between frequency of operation of an actor and distance covered by a mobile part of a torque transmitting system.

In the coordinate system of FIG. 4b, the frequency of operation of the actor (i.e., of the motor of the actor, such as the motor 58) is measured along the ordinate, and the aforementioned distance $S_{Einrück}$ is measured along the abscissa. It is assumed that the clutch is operated with the aforediscussed torque follow-up. The frequency of operation of the actor reaches a maximum value at the distance $S_1$, for example, within a range of one millimeter around the distance $S_1$, it being assumed here that the distance $S_{Einrück}$ is measured in millimeters. The operation of the clutch with a torque follow-up renders it possible to operate the actor at a maximum frequency and within a range of one millimeter or so at the distance $S_1$ because, due to the conformance of the transmissible torque to (i.e., in dependency upon) the actual engine torque, it is merely necessary to carry out a small or relatively small change of the distance $S_{Einrück}$ in order to ensure that the torque which can be transmitted by the clutch trails or conforms to the actual engine torque within a relatively narrow (acceptable) range of tolerances.

FIGS. 4a and 4b show that, if one employs an energy storing element (this term is intended to encompass a single energy storing element such as the coil spring 60 of the actor 57, or a composite element including two or more identical or different springs and/or other resilient elements) which is installed in a predetermined manner, it is possible to select the minimum value of the force to be supplied by the motor of the actor, as a function of the distance $S_{Einrück}$, in such a way that it must be applied at a distance ($S_1$) which is most frequently covered by the mobile part(s) of the clutch and/or by the output element of the actor. This means that the motor (such as 58) of the actor is operated at a maximum frequency when the distance $S_{Einrück}$ matches or approximates (within the preselected range of, e.g., one millimeter) the value $S_1$, namely when the magnitude of the force $F_B$ (FIG. 4a) is zero or close to zero. The maximum force which is to be applied by the motor of the actor is required when the clutch is fully engaged or fully disengaged, i.e., when the distance $S_{Einrück}$ is zero or reaches a maximum value. FIGS. 4a and 4b further show that, in the just described example, the frequency of the application of a maximum force (by the motor of the actor) is a small fraction of the frequency of the application (at $S_1$) of a force which is zero or close to zero.

The just discussed selection of the frequency of operation of (and of the magnitudes of forces to be applied by) the motor of the actor, as well as of the resort to an energy storing element, renders it possible to operate the actor with substantial savings in energy. All that is necessary is to install the energy storing element in such a way that the curve 151 intersects the abscissa at the point or distance $S_1$, i.e., at the locus of maximum frequency of operation of the motor of the actor for a friction clutch which is operated with a torque follow-up. The distance $S_1$ is covered by the aforementioned mobile part(s) of the clutch and/or of the actor when the motor of the actor is called upon to apply a minimal force.

When the motor vehicle is in use, the clutch is normally required to transmit a relatively small torque, i.e., the torque normally required to be transmitted by the motor of the actor is also small or zero. It is often desirable to employ a relatively soft energy storing element which is installed in a prestressed condition in such a way that its force or bias varies very little within the entire operating range of the actor.

A shifting of the operating point which is attributable to wear can be ascertained in a number of ways. For example, it is possible to adapt the engagement point of the clutch. The term "engagement point" is intended to denote that condition or setting of the clutch when the latter actually begins to transmit torque; such condition can be close to the fully disengaged condition but the distance which must be covered by the aforementioned mobile part(s) to cause the clutch to reach the engagement point can vary as a function of wear and/or other influences. Alternatively, a shifting of the operating point in response to progressing wear can be ascertained by an adaption of the friction coefficient of the friction linings of the clutch disc. Once the shifting of the operating point is ascertained (such as by the aforediscussed adaption procedure or procedures carried out by the electronics of the control unit), it can be compensated for in a number of ways, e.g., by resorting to an adaption of parameters in a manner as described, for example, in the commonly owned copending U.S. patent application Ser. No. 08/211,020.

FIG. 5 shows an actor which comprises an electric motor 200 having a housing or casing 201 and a rotary output element including or connected with an externally threaded member or feed screw 202. The latter mates with a nut 203, and this nut is held against rotation so that, when the motor 200 is on to rotate the feed screw 202, the nut is caused to move in the direction of the common axis 209 of the feed screw and a reciprocable output element 206 of the actor. The feed screw 202 and the nut 203 constitute a simple transmission which is interposed between the motor 200 and the output element 206.

The nut 203 is rigid with a tubular guide 204 which carries a disc-shaped or plate-like retainer 205 of one piece with or connected to the output element 206 and serving as an abutment or retainer for one end convolution of an energy storing element 208 in the form of a coil spring. The other end convolution of the energy storing element 208 reacts against a wall 210 of the housing 201 or of a separate casing forming part of the actor and affixed to the housing 201. The housing or casing including the wall 210 carries one or more bearings 207 which confine the output element 206 to reciprocatory movements in the direction of the axis 209.

One end convolution of the energy storing element 208 is coupled to the wall 210 by one or more hook-shaped or otherwise configured fasteners 211, and one or more similar fasteners 211 are used to couple the other end convolution of the element 208 to the retainer 205. Thus, depending upon the initial stressing of the element 208 (namely whether this element tends to expand or contract), the latter can be used to assist the motor 200 in moving the output element 206 axially in a direction toward or away from the housing 201.

The output element 206 shares all axial movements of the nut 203 toward or away from the wall 210. The motor 200 is or can constitute a reversible electric motor. The retainer 205 can cooperate with the housing or casing including the wall 210 to prevent the nut 203 from rotating with the feed screw 202. Alternatively, such function can be performed by the output element 206 in cooperation with the bearing 207.

The energy storing element 208 is coaxial with the feed screw 202, nut 203 and output element 206. However, it is equally possible to mount the illustrated energy storing element 208 or an equivalent energy storing element in such a way that its axis is parallel to the axis 209. Still further, and depending upon the dimensions of the space which is available for the actor of FIG. 5, the axial length of the energy storing element 208 can be less than that of the feed screw 202.

Referring to FIG. 6, there is shown an actor 300 including an electric motor 301 having a housing or casing 302 and a rotary output shaft 303 which is connected or of one piece with a coaxial feed screw 304 forming part of a transmission further including a nut 305 mating with the feed screw and non-rotatably carried by the housing 302 and/or by the chassis of the motor vehicle in which the actor 300 is put to use to select the torque adapted to be transmitted by a torque transmitting system (such as a friction clutch) and/or the ratio of a transmission system. The nut 305 has an elongated extension 306 (e.g., a tube) which includes an end portion 307 carrying or constituting the axially reciprocable output element of the actor 300.

That (right-hand) end portion 308 of the housing 302 which is adjacent the nut 305 carries a plate 309 which is affixed to a ring-shaped part 310 surrounding the left-hand end portion 302b of the housing 302 by axially parallel bolts or tie rods 311. Nuts which mate with the right-hand end portions of the bolts 311 urge the plate 309 against a flange-like part 302a of the right-hand end portion 308 of the housing 302. The bolts 311 are surrounded by the convolutions of a coil spring 312 which reacts against the part 310 (i.e., against the housing 302) and bears against the nut 305, i.e., against the output element which forms part of or is carried by the extension 306, 307 of the nut. The latter is provided with several arms 313 which extend toward the part 310 and have radially inwardly extending end portions 313a engaged by the adjacent end convolution of the coil spring (energy storing element) 312 of the actor 300.

The part 310 can be affixed to the adjacent end convolution of the element 312 by one or more hook-shaped or otherwise configured fasteners 315, and analogous fasteners 314 are provided on the end portions 313a to engage the adjacent end conolution of the element 312. This enables the element 312 to pull the extension 306, 307 toward or to push such extension axially of and away from the end portion 302b of the housing 302.

The right-hand end convolution of the energy storing element 312 need not be coupled to each arm 313 of the nut 305.

A bellows 316 is installed between the flange 302a and the end portions 313a of the arms 313 to reduce the likelihood of penetration of dust and/or other foreign matter into contact with the mating threads of the feed screw 304 and the nut 305.

The part 310 constitutes an optional component of the actor 300. This part can be omitted if the end portion 302b of the housing 302 is configured in such a way that it can carry or embody fasteners corresponding to and performing the function of the fasteners 315. For example, the material of the end portion 302b can be upset and/or otherwise deformed to form a collar which can be deformed again to provide it with fasteners corresponding to the fasteners 315. This renders it possible to dispense with the bolts 311 and the nuts which mate with such bolts. It is further possible to employ separately produced fasteners 314 and/or 315 which are welded, glued, riveted, soldered or threadedly connected to the respective end portions of the housing 302.

FIG. 6a illustrates a portion of a modified motor housing 302' which has radially outwardly bent portions 330 provided with radially inwardly extending free end portions or tips 331 engaging the adjacent end convolution of the energy storing element 312. The portions 330 and their tips 331 replace the part 310, the fasteners 315 and the bolts 311 of the actor 300 which is shown in FIG. 6. The right-hand end convolution of the energy storing element 312 of FIG. 6a is preferably coupled to the nut 305 (not shown in FIG. 6a) in the same manner as, or in a manner analogous to that, shown in FIG. 6. This enables the energy storing element 312 to pull an output element (such as the extension 306, 307 of the nut 305 shown in FIG. 6) toward or to push such output element away from the motor including the housing 302'.

FIG. 7 shows an actor 400 which comprises an electric motor 401 having a housing or casing 402 and a rotary output shaft 403. The latter is connected to or of one piece with a feed screw 404 and has a free end portion mounted in a bearing 405 which is carried by a separate housing or casing or by an extension of the housing 402. The shaft 403, the feed screw 404 and the bearing 405 have a common axis 406, and the feed screw mates with a worm wheel 407 having an axis 408 which is normal to the axis 406. The bearing 405 ensures that the shaft 403 and the feed screw (worm) 404 cannot yield sideways when the motor 401 is on and the worm wheel 407 is driven to rotate a coaxial spur gear 409. The teeth of the spur gear 409 mesh with the teeth 410 of a reciprocable toothed rack 411 having at its left-hand end a platform 414 abutting one end convolution of an energy storing element 415. The other end convolution of the element 415 reacts against a wall 416 or an analogous retainer on the housing 402 of the motor 401 or on or in the frame or chassis of the motor vehicle. The rack 411 is guided by bearings 412 which hold it against movement radially of the axis 408 so that the rack can move only along a path which is parallel to the axis 406. The right-hand end portion 413 of the rack 411 can carry or can constitute the output element of the actor 400. The arrow 417 indicates one of the directions in which the rack 411 is movable under the action of the worm wheel 407 and/or under the bias of the energy storing element 415.

The parts 404, 407 can be said to constitute a first stage, and the parts 409, 411 can be said to constitute a second stage, of a composite transmission between the motor 401 and the output element (such as 413 or a part affixed to or of one piece with the end portion 413) of the actor 400.

The actor 400 can be modified in a number of ways. For example, and depending upon the desired or required or optimal direction of movement of the end portion 413, the toothed rack 411 can be mounted in such a way that the path of its reciprocatory movement is not parallel to the axis 406. The bearings 412 for the rack 411 can include or constitute slide (friction) bearings and/or bearings with spherical or other suitable rolling elements. Such bearings can be designed to confine the rack 411 to movements in and counter to the direction which is indicated by the arrow 417 as well as to hold the rack against any undesired movements in directions toward and away from the observer of FIG. 7, i.e., against movements in the direction of the axis 408.

The composite (two-stage) transmission between the output shaft 403 of the motor 401 and the output element 413 (or an output element which is connected to the part 413 by mechanical, hydraulic, pneumatic or other suitable means) can be replaced with a simpler (single-stage) transmission or with a more complex (e.g., three-stage) transmission without departing from the spirit or scope of the invention. Furthermore, the first stage including the parts 404 and 407 can be replaced by any other suitable transmission (e.g., by a set of gears or the like), and the same holds true for the second stage including the parts 409, 411. The exact construction of the transmission which is to operate between the shaft 403 and the output element 413 will depend on the nature of motion to be transmitted to the clutch.

FIGS. 8a and 8b illustrate the relevant details of a further actor 500 which comprises an electric motor 501 having an output shaft 502 rotatable about an axis 503. The shaft 502 is connected to or of one piece with a coaxial feed screw 504 mating with a nut 505 which is compelled to move in the direction of the axis 503 in response to rotation of the shaft 502. The parts 504, 505 constitute a first stage of a multistage transmission between the motor 501 and a pivotable output element (arm) 521 of the actor 500.

The nut 505 is reciprocable in a tubular guide 506 and comprises a coaxial extension 507 projecting in a direction away from the motor 501 and carrying two radially outwardly extending pivot pins 509 which are disposed diametrically opposite each other with reference to the axis 503. The extension 507 can be welded or otherwise secured to or it can be of one piece with the nut 505. It is also possible to assemble the nut 505 and/or the extension 507 of two or more separately produced parts. The guide 506 surrounds the extension 507 and is provided with axially parallel slots 508 for the radially outwardly extending pins 509. The pins 509 can constitute separately produced parts which are threadedly or otherwise connected with the extension 507.

The slots 508 are provided in that portion of the tubular guide 506 which is remote from the housing of the motor 501, and this guide cooperates with the pins 509 in the slots 508 to prevent the nut 505 from rotating with the feed screw 504.

The pins 509 constitute pivots for the two tines of a fork 510 which further includes the aforementioned arm 521 constituting the output element of the actor 500. The tines of the fork 510 include portions 511 which carry abutments 512 for the adjacent end convolution of an energy storing element 513 which further includes a second end convolution 515 reacting against a housing 514 secured to or forming part of the housing or casing of the motor 501. If the end convolutions of the energy storing element 513 are not affixed to the abutments 512 and to the housing 514, and if this element is installed in a prestressed condition, it can assist the motor 501 in moving the nut 505 in the direction of the axis 503 and away from the output shaft 502. On the other hand, if the end convolutions of the energy storing element 513 are coupled to the abutments 512 and to the housing 514, this energy storing element can assist the motor 501 in moving the nut 505 and the tines of the fork 510 away from as well as toward the output shaft 502.

The arm or output element 521 can constitute a two-armed lever one arm of which carries the pins and the abutments 512, an intermediate portion of which is fulcrumed in the frame of the motor vehicle (or in a part which is affixed to such frame), and the other end portion of which is mechanically, hydraulically, pneumatically or otherwise connected to a mobile torque selecting element of a clutch, e.g., to the member 55 shown in FIG. 2.

The housing 514 has an opening 520 for the output element 521 of the fork 510, and such opening is preferably sealed by a bellows 522 (or in any other suitable way) to prevent the penetration of foreign matter into the range of the pins 509, feed screw 504 and nut 505.

In addition to or in lieu of the slotted guide 506 and pins 509, the nut 505 can be held against rotation with the feed screw 504 by the surfaces flanking the elongated opening 520 and the output element 521 of the fork 510. Still further, the housing 514 can contain a plate like (linear) guide 523 which can be used to directly or indirectly hold the nut 505 against rotation with the feed screw 504. Thus, the nut 505 is confined to reciprocatory movements in the direction of the arrow 503 under the action of the motor 501 and/or under the bias of the energy storing element 513. As already mentioned above, the element 513 can be mounted in the housing 514 in such a way that it can maintain the output element 521 in a selected position (or can move the element 521 to such selected position) with or without assistance from the motor 501. The latter can be designed to rotate the output shaft 502 in a clockwise or in a counterclockwise direction. Otherwise stated, the energy storing element 513 can be designed and installed in such a way that it can reduce the energy requirements of the motor 501 when the latter is operated to increase or to reduce the magnitude of torque to be transmitted by the torque transmitting system (such as the clutch 3 or 3') which is operatively connected with the output element 521.

The output element 521 can be directly coupled to a torque selecting element of a friction clutch or another torque transmitting system, and the connection can be a rigid connection, a pivotable connection or another articulate connection.

The sensor 14 (shown in FIGS. 1a and 1b) can constitute a Hall generator, a potentiometer or an inductive monitoring device and can be installed in the housing 514 to monitor the distances covered by the nut 505 (e.g., by the extension 507 which is secured to or of one piece with the nut) in the direction of the axis 503. Alternatively, the sensor which monitors the distances covered by the nut 505 can be replaced by or used jointly with a sensor which monitors the extent of angular movements of the output shaft 502 and/or feed screw 504 and/or the extent of pivoting of the output element 521. The signals from such sensor or sensors are transmitted to the electronic circuitry of the control unit which includes the actor 500, and such signals are utilized to calculate or to otherwise ascertain whether or not the setting of the clutch is satisfactory and the extent of additional adjustment of the clutch by way of the output element 521 which must be carried out in order to ensure that the clutch will transmit torque of a desired magnitude.

The aforementioned plate- or panel-like guide 523 in the housing 514 can constitute a printed circuit board which carries some or all of the electronic circuitry of the control unit including the actor 500. Thus, it is possible to confine some or all of the circuitry (power and/or control electronics) of the control unit in the housing 514 of the actor 500.

FIG. 8a shows that the extension 507 of the nut 505 is installed radially inwardly of (i.e., within) the tubular guide 506, and that this guide is surrounded by the coil spring which constitutes the energy storing element 513. The latter is confined in the housing 514. It is clear, however, that the components which are confined in the housing 514 can be distributed and/or dimensioned in a different way.

FIG. 9 shows certain details of an actor 600 which constitutes a modification of the actor 500 of FIGS. 8a and 8b. The actor 600 comprises an electric motor 601 having an output shaft 602 which is of one piece with or connected to a feed screw 604 mating with a nut 605. The feed screw 604 and the output shaft 602 are rotatable about a common axis 603, and the nut 605 is held against rotation so that it is compelled to move in the direction of the axis 603 either toward or away from the motor 601, depending upon whether the shaft 602 is driven to rotate in a clockwise or in a counterclockwise direction.

The housing 606 of the actor 600 includes or confines an elongated tubular guide 607 which has axially parallel slots 608 for the radially outwardly extending pin-shaped followers 609 of the nut 605. The latter is reciprocable in and can but need not be in actual sliding contact with the internal surface of the guide 607. The pins 609 are coupled to a tubular pusher 610 which surrounds the guide 607 and includes one or more abutments 610a for one end convolution of an energy storing element 611 reacting against an end wall 606a of the housing 606. The pusher 610 is slidable along the external surface of the guide 607, and the energy storing element 611 is a coil spring which is installed between the pusher 610 and the guide 607 on the one hand, and a tubular or otherwise configurated wall of the housing 606 on the other hand.

The pin-shaped followers 609 of the nut 605 are coupled with the tines or prongs 612 of a fork 613 in the same way as described in connection with the pins 509 and fork 510 of the actor 500. The rod-shaped portion or arm 614 of the fork 613 constitutes or is connected to the output element of the actor 600 and extends through an axially parallel slot 615 of the housing 606. Such slot is sealed by a flexible bellows 616 or in any other suitable way which ensures that the threads of the parts 604, 605 are less likely or unlikely to be contaminated by dust and/or other foreign matter.

The pins 609 cooperate with the surfaces surrounding the slots 608 of the guide 607 (this guide cannot rotate in the housing 606) to hold the nut 605 against rotation with the output shaft 602 and feed screw 604 about the axis 603. The output element 614 can be installed in the slot or opening 615 in such a way that it cooperates with the surfaces surrounding the slot 615 to prevent the nut 605 from rotating in the housing 606.

The parts 604, 605 can be said to constitute a first stage, and the parts 609, 612 can be said to constitute a second stage, of a composite transmission between the electric motor 601 and the output element 614 of the actor 600.

The energy storing element 611 can be coupled to the end wall 606a and to the abutments 610a so that it can assist the motor 601 in moving the nut 605 axially toward or away from the end wall 606a as well as to automatically push or pull the nut to a selected axial position when the motor 601 is idle.

Figure 10:
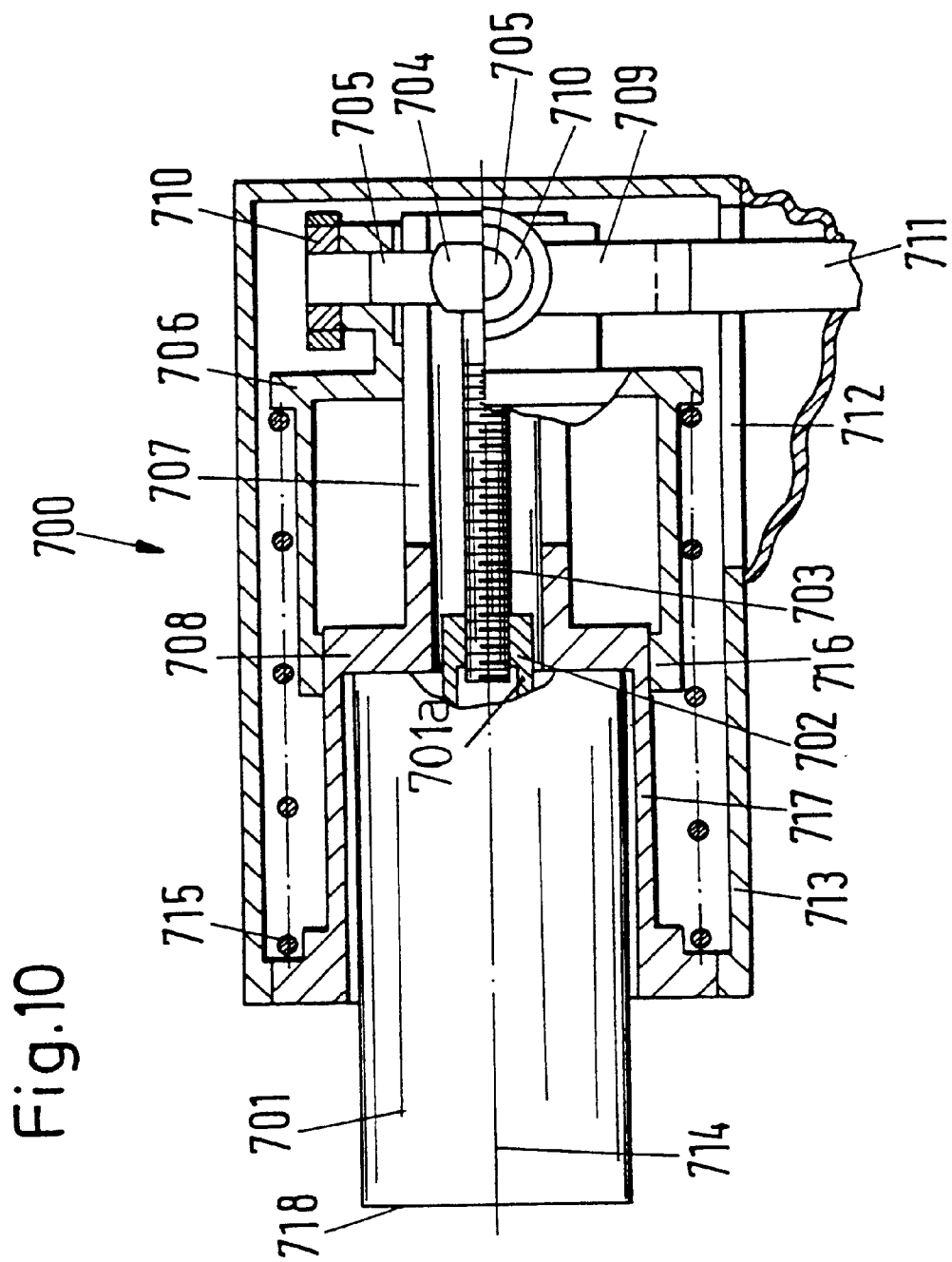
FIG. 10 is a partly elevational and partly longitudinal sectional view of a further actor.

Referring to FIG. 10, there is shown an actor 700 which constitutes a modification of the actors 500 and 600. This actor 700 comprises an electric motor 701 with a hollow rotary output shaft 701a which is of one piece with or is non-rotatably connected to a nut 702 so that the latter is compelled to rotate about the axis 714 when the motor 701 is on. The nut 702 meshes with a coaxial feed screw 703 which is held against rotation about the axis 714, i.e., the feed screw is compelled to move axially when the motor 701 is on to rotate the nut 702 in a clockwise or in a counter-clockwise direction.

That end portion (704) of the feed screw 703 which is remote from the motor 701 carries one or more radially outwardly extending pins 705 which couple the feed screw with a slide 706. The latter is slidable along the external surface of a portion 717 of a housing or casing 713 of the actor 700. The housing portion 717 has an extension 708 which surrounds the nut 702 and the feed screw 703 and is provided with an axially parallel slot 707 for each pin 705 of the end portion 704 of the feed screw. Each pin 705 is articulately connected (as at 710) with a tine or prong of a fork 709 having a shaft or rod or arm 711 extending outwardly through an opening or slot 712 of the housing 713 and constituting or being connected with the output element of the actor 700. Such output element can be rigidly, movably, directly or indirectly connected with a torque selecting element of a clutch or another torque transmitting system to automatically select the magnitude of torque to be transmitted by the clutch in dependency upon the nature (such as intensity) of signals being transmitted to the electric motor 701 from the electronic circuitry of the control unit including the actor 700.

An energy storing element in the form of a coil spring 715 is instaled in the housing 713 to react against an end wall at the left-hand end of this housing and to bear against an external shoulder of the slide 706. The illustrated energy storing element 715 can assist the motor 701 in moving the feed screw 703 axially in a direction to the right, as viewed in FIG. 10. However, if the end convolutions of the element 715 are respectively coupled to the housing 713 and to the slide 706 (i.e., to the feed screw 703), the element 715 can assist the motor 701 in moving the feed screw in a direction deeper into the hollow output shaft 701a or in the opposite direction. The slide 706 can slidably but sealingly (or substantially sealingly) engage the external surface of the housing portion 717; the locus of such sliding engagement is shown at 716.

An important advantage of the actor 700 is its compactness. Thus, a substantial portion of the coiled energy storing element 715 surrounds the housing 718 of the motor 701 to reduce the space requirements of the actor as seen in the direction of the axis 714. Additional savings in space (as seen in the direction of the axis 714) are achieved in that the output shaft 701a is hollow so that it can receive a larger or smaller portion of the feed screw 703, depending on the desired position of the output element 711. For example (and as actually shown in FIG. 10), one-half of the energy storing element 715 can surround the motor housing 718 when the pin or pins 705 is or are located at (or close to) a maximum distance from the motor 701. However, it is equally possible to transfer the abutment for the right-hand end convolution of the energy storing element 715 to the left-hand end of the slide 706 so that the entire energy storing element is then located between the two axial ends of the motor housing 718. The nut 702 can be said to constitute an internally threaded end portion of the hollow output shaft 701a of the motor 701.

The positioning of the left-hand end convolution of the energy storing element 715 substantially midway between the axial ends of the motor housing 718 is made possible in that the housing 713 is designed to surround a major portion of the housing 718. This renders it possible to achieve certain of the aforediscussed savings in space as considered in the direction of the common axis 714 of the shaft 701a, nut 702 and feed screw 703.

Figure 11:
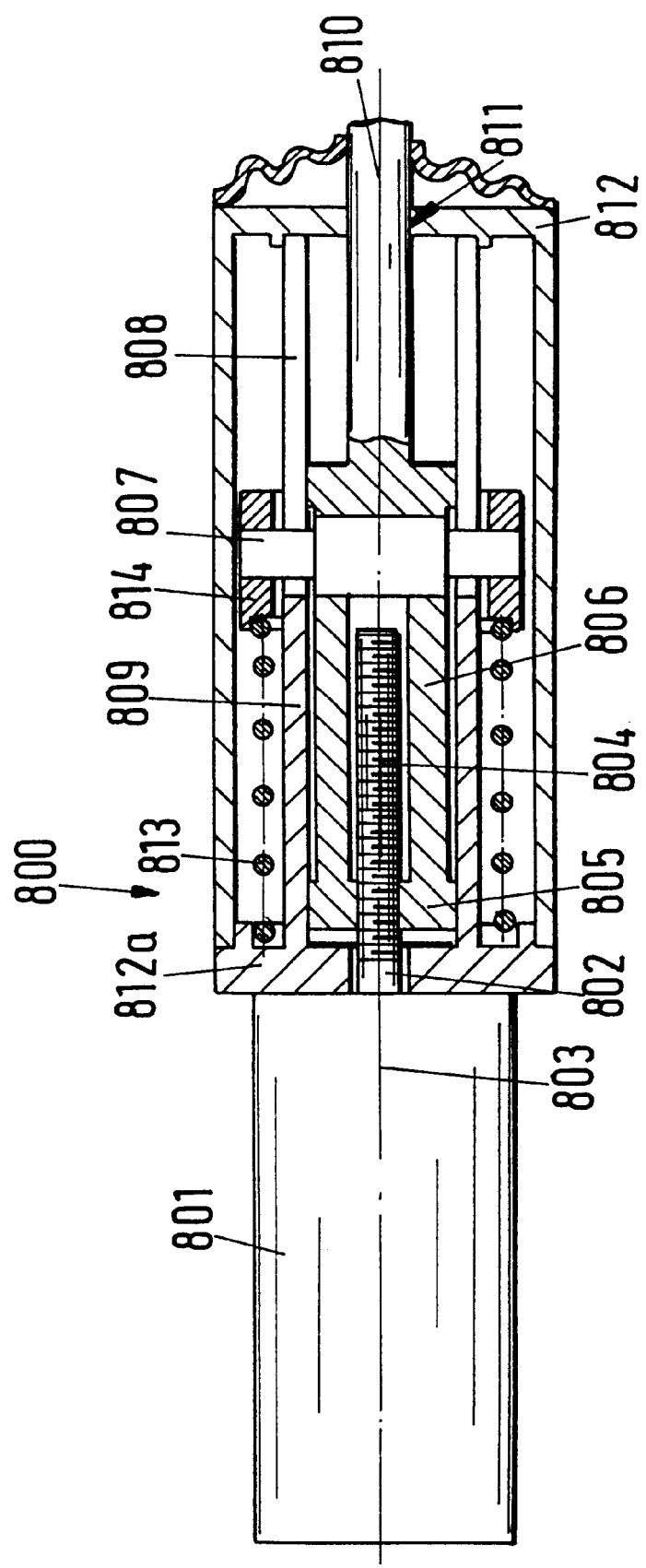
FIG. 11 is a partly elevational and partly longitudinal sectional view of still another actor.

FIG. 11 shows an actor 800 having an electric motor 801 with an output shaft 802 rotatable about an axis 803. The shaft 802 is non-rotatably connected to or is of one piece with a coaxial feed screw 804 which mates with a nut 805. The parts 804, 805 constitute a simple transmission between the output shaft 802 of the motor 801 and a reciprocable output element 810 of the actor 800.

The nut 805 shares movements with a slide 806 having radially outwardly extending pin-shaped followers 807 reciprocable in axially parallel slots 808 of an internal wall 809 of an actor housing 812. The followers 807 can be of one piece with the slide 806 or they can constitute separately produced parts which are frictionally, threadedly or otherwise affixed to the slide. These followers cooperate with the wall 809 to hold the nut 805 and the slide 806 against rotation about the axis 803, i.e., the nut 805 is compelled to move in the direction of the axis 803 whenever the output shaft 802 of the motor 801 is caused to rotate in a clockwise or in a counterclockwise direction.

The output element 810 of the actor 800 is of one piece with or is affixed to the slide 806 so that it shares all movements of the nut 805 in the direction of the axis 803. This output element extends outwardly through an opening 811 in an end wall of the housing 812, and such opening can be sealed by a bellows or in any other suitable way. The output element 810 can be directly or indirectly coupled with a forked, lever-shaped or otherwise configurated torque selecting element of a torque transmitting system (such as a friction clutch) or with a gear ratio selecting member of a transmission system in a manner not specifically shown in FIG. 11. An indirect connection between the output element 810 and an automatically adjustable torque transmitting or transmission system can include a linkage, a Bowden cable or a fluid-operated connection, e.g., a hydraulically or pneumatically operated device of the type shown in FIG. 1a and including the conduit 9 and the cylinders 10, 11.

The housing 812 confines an energy storing element 813 which is disposed radially outwardly of the wall 809. One end convolution of the element 813 bears against abutments 814 which are provided on the followers 807, and the other end convolution of this element reacts against an end wall 812a of the housing 812. Thus, unless its end convolutions are coupled to the abutments 814 and the end wall 812a, the illustrated energy storing element 813 serves to assist the motor 801 in moving the output element 810 in a direction to the right, as viewed in FIG. 11, or to maintain the element 810 in a predetermined axial position when the motor is off. For example, the element 813 can overcome or balance the bias of one or more springs which are installed in a clutch and oppose the movements of the output element 810 in a direction to the right, as viewed in FIG. 11.

The construction and the mode of operation of the actor 800 are quite similar to those of the actor 500 shown in FIGS. 8a and 8b. A difference between these actors is that the output element 521 of the actor 500 is articulately connected with the nut 505 whereas the output element 810 of the actor 800 is rigidly connected to (e.g., of one piece with) the nut 805. Moreover, the output element 521 is inclined relative to the axis 503 of the nut 505 and its extension 507, whereas the output element 810 is coaxial with the nut 805 and the extension or slide 806. The positions of the nut 805 and feed screw 804 can be reversed, i.e., the nut can be rotated by the output shaft 802 (reference may be had to FIG. 10).

Figure 12:
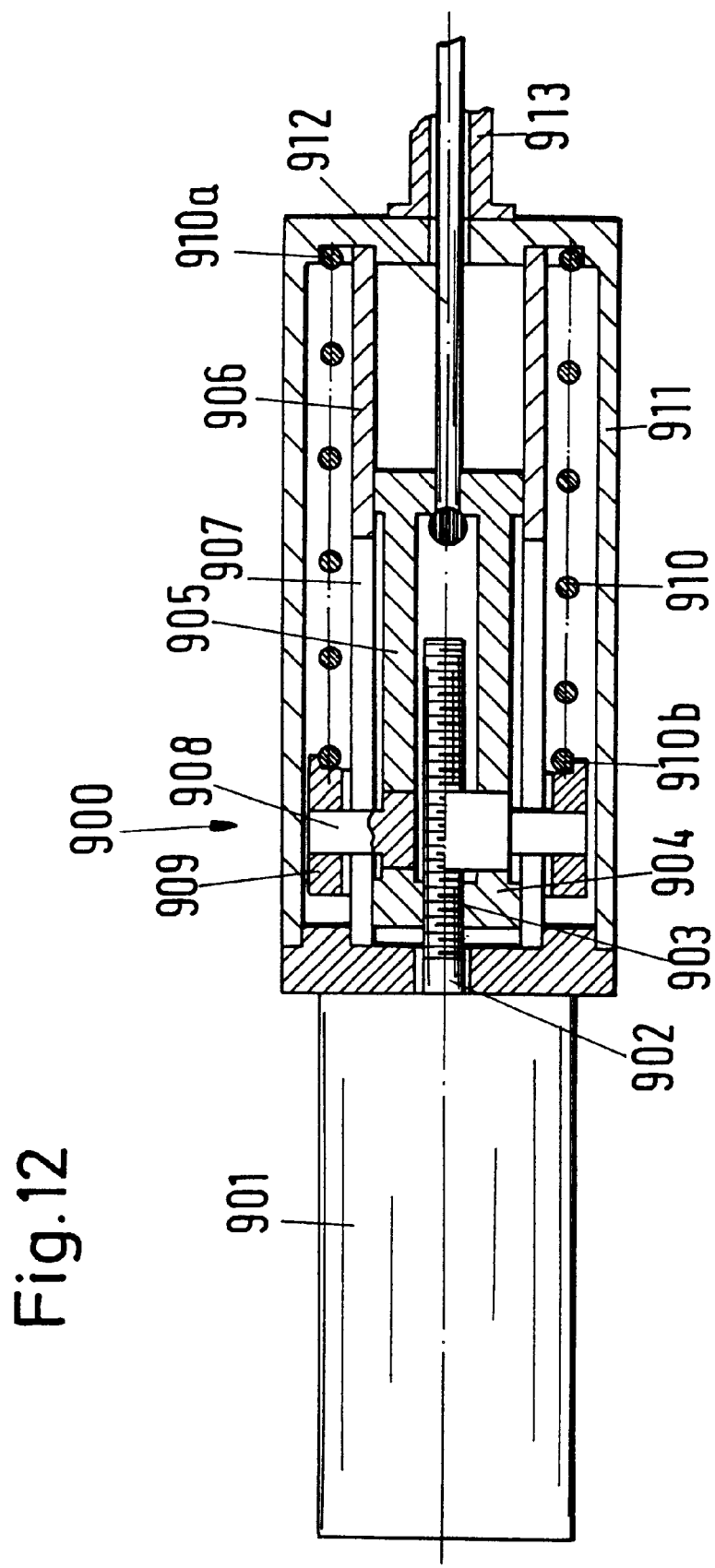
FIG. 12 is a partly elevational and partly longitudinal sectional view of a further actor.

FIG. 12 shows an actor 900 having an electric motor 901 with a rotary output shaft 902 which is connected to or is made of one piece with a feed screw 903. The latter meshes with a nut 904 having a tubular extension 905 which can be said to constitute or to form part of an output element of the actor 900. The nut 904 is held against rotation with the feed screw 903 by radially outwardly extending pins or followers 908 which are attached to or of one piece with the extension 905 and are reciprocable in elongated slots 907 provided in a tubular guide 906 forming part of or affixed to a housing 911 of the actor 900. The pins 908 carry suitable abutments 909 for one end convolution 910b of an energy storing element 910. The other end convolution 910a of this energy storing element reacts against that end wall of the housing 911 which is remote from the motor 901. The energy storing element 910 is confined in the space between the radially outermost wall of the housing 911 and the tubular guide 906, and the latter can slidably and reciprocably receive the extension 905 of the nut 904.

The output element or extension 905 is connectable with a torque selecting element of a clutch or another torque transmitting system by a Bowden cable including a wire 912 having one end portion affixed to the extension 905, and a sleeve or sheath 913 which is secured to the right-hand end wall of the housing 911. The motor 901 can pull the wire 912 relative to the sheath 913, and such pulling action can be assisted by the energy storing element 910. This function of the energy storing element 910 is obtained due to the simple expedient of causing the right-hand end convolution 910a to react against that end wall of the housing 911 which is remote from the motor 901 and causing the left-hand end convolution 910b to bear against the abutments 909 in a direction to urge the nut 904 toward the motor (compare with the mounting of the energy storing element 813 in the actor 800 of FIG. 11).

The heretofore described and illustrated actors are provided with output elements which form part of or which cooperate with forks, levers, links, shafts, rods, cables or analogous parts to exert upon the torque selecting element of a clutch and/or upon a particular component of a transmission system a push or a pull, either directly or by way of a spherical, cardan or other suitable joint or as a result of the establishment of a rigid connection with such element or component. It is also possible, and often desirable, to provide a universal or other suitable joint between the output element of the actor and the motion receiving element or component of a torque transmitting system and/or a transmission system, e.g., to reduce the likelihood of the application of excessive lateral (radial) stresses upon the rotary output shaft of an electric motor and/or upon a nut or a feed screw which is coaxial with such output shaft. For example, a universal joint can be provided between the output element 810 and the slide 806 of the nut 805 in the actor 800 of FIG. 11 in order to reduce lateral stressing of the nut 805, feed screw 804 and/or output shaft 802. This might necessitate the making of an enlarged opening 811 in the end wall of the housing 812 and the provision of more complex guide means for the output element 810 if the latter is articulately connected with the extension 806. However, such precautionary undertakings are necessary only if the operative connection between the motor or the transmission of the actor and the motion receiving element or elements of a torque transmitting system and/or transmission system is likely to produce pronounced lateral stressing of the output shaft of the motor and/or of the parts which are coaxial with such output shaft.

The feed screws which are utilized in certain heretofore described actors are preferably provided with threads having a relatively small pitch or lead to ensure that, at the nominal RPM of the output shaft of the electric motor of the actor, the feed screw or the nut can be moved at a requisite speed as well as that the axially moving part (nut or feed screw) can transmit forces of a required magnitude for reliable adjustment of the torque transmitting system and/or of the transmission system in response to signals from the electronic controls of the control unit to the actor. The pitch or lead of the feed screw can be increased if the transmission or one stage of a multi-stage transmission in the actor is a step-down transmission or a step-down stage. This is often desirable because one can ensure that a relatively small number of revolutions of the feed screw or of the nut which mates with the feed screw suffices to cause the nut or the feed screw to cover a required distance in the axial direction of the output shaft of the motor of the actor employing a transmission or a transmission stage with a nut and a feed screw in mesh with such nut.

Figure 13:
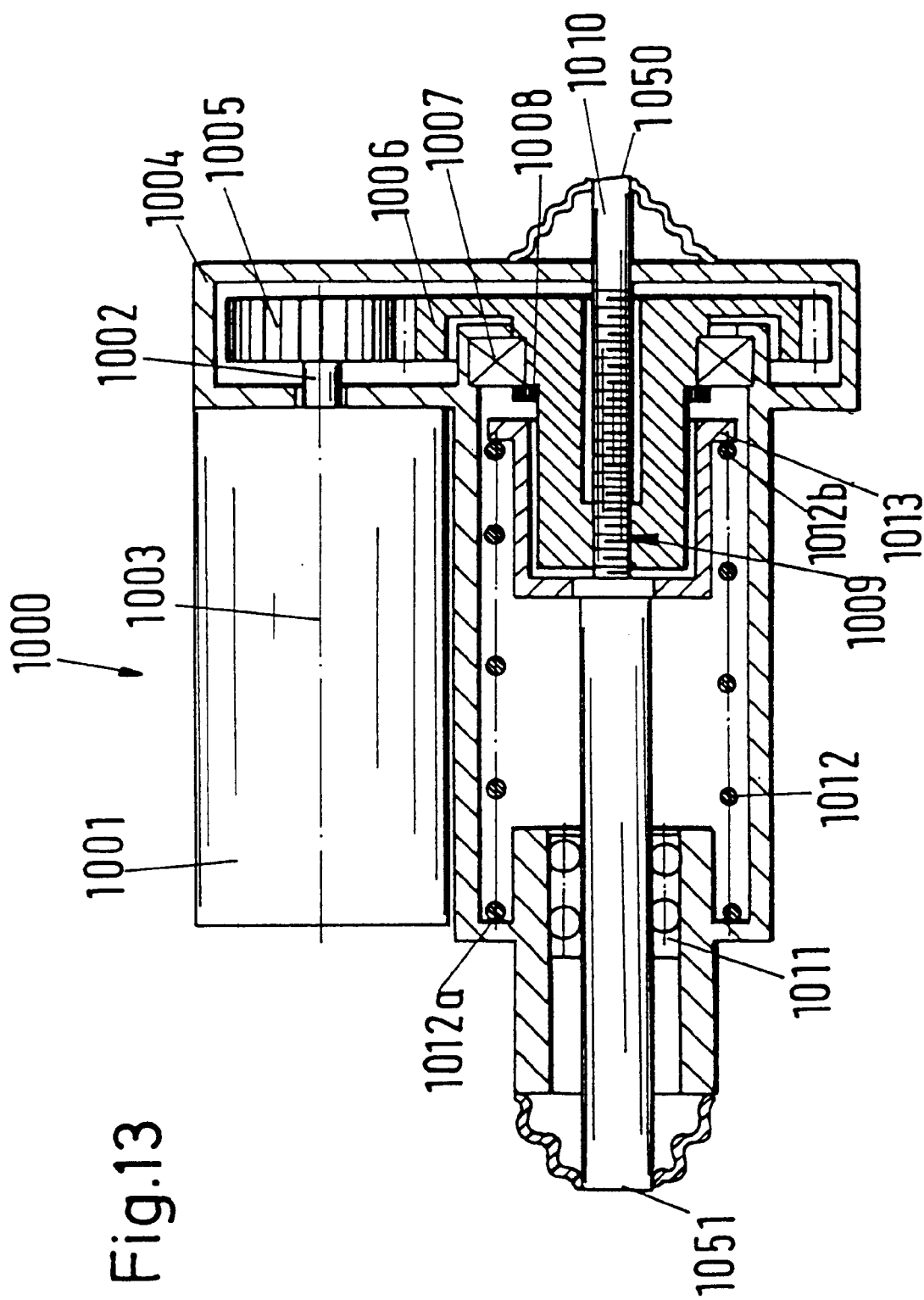
FIG. 13 is a partly elevational and partly sectional view of an additional actor.

FIG. 13 illustrates certain details of a further actor 1000 having an electric motor 1001 with an output shaft 1002 which is rotatable about an axis 1003. The actor 1000 further comprises a two-stage transmission the first stage of which includes a set of mating spur gears 1005, 1006 and the second stage of which includes a nut 1009 and a feed screw 1010. These stages are installed in a housing 1004 which can include or which can be connected to the housing or casing of the electric motor 1001. The spur gear 1005 is affixed to or of one piece with the output shaft 1002, and the spur gear 1006 is coaxial with the feed screw 1010 and of one piece with or secured to the nut 1009.

The one and/or the other stage of the transmission of the actor 1000 can be replaced with another transmission, e.g., with an endless belt or chain and pulley or sprocket wheel transmission. Also, the gearing including the spur gears 1005, 1006 can be replaced with a gearing including more than two gears (e.g., further including an intermediate gear between the gears 1005, 1006). If one stage of the transmission includes one or more endless belts and pulleys or sheaves, the belt or belts are preferably internally toothed belts and the pulleys or sheaves have complementary external teeth.

It is also possible to replace the spur gears 1005, 1006 with a set of bevel gears, particularly if the common axis of the nut 1009 and feed screw 1010 should be inclined relative to the axis 1003. Such mutually inclined axes may but need not cross each other.

The gear 1005 can be of one piece with the output shaft 1002 or can constitute a separately produced part, and the gear 1006 is held against axial movement but is free to rotate in the housing 1004. The reference character 1007 denotes a suitable bearing for the gear 1006; such bearing can be designed to center the gear 1006 relative to the feed screw 1010 as well as to hold the gear 1006 against axial movement. This ensures that the nut 1009 (which is shown as being of one piece with the gear 1006) compels the feed screw 1010 to move axially in response to rotation of the output shaft 1002. A split ring 1008 or another suitable retaining element is provided to hold the bearing 1007 in a desired axial position within the housing 1004.

The gears 1005, 1006 and the nut 1009 can be made of a suitable synthetic plastic material (e.g., in an injection molding machine) or they can be produced of a metallic material. The illustrated nut 1009 is actually an internally threaded sleeve-like axial extension of the gear 1006.

The feed screw 1010 is elongated and is mounted in the housing 1004 by way of one or more guides (e.g., bearings) 1011 in such a way that it cannot rotate with the nut 1009. This can be readily achieved by configurating at least a portion of the feed screw 1010 in such a way that it is longitudinally slidable in but cannot rotate relative to the guide or guides 1011.

An energy storing element 1012 in the form of a coil spring is mounted in the housing 1004 in such a way that its end convolution 1012a reacts against an end wall of the housing and that its other end convolution 1012b bears upon a cupped abutment 1013 which is affixed to or of one piece with the feed screw 1010. If its end convolutions 1012a, 1012b are not coupled to the housing 1004 and to the abutment 1013, respectively, the energy storing element 1012 can serve as a means for assisting the motor 1001 in moving the feed screw 1010 in a direction to the right, as viewed in FIG. 13.

The feed screw 1010 is dimensioned and installed in such a way that either of its end portions 1050, 1051 can constitute, or can be connected with, an output element of the actor 1000 or directly with a torque selecting element of a clutch or another torque transmitting system. Thus, the end portion 1050 can be rigidly or articulately (e.g., by way of a universal joint or another suitable joint) connected to the aforementioned torque selecting element, e.g., to an engaging/disengaging fork of a friction clutch. The end portion 1051 can be rigidly or articulately (e.g., by way of a Bowden cable) connected to the fork of a friction clutch or to another part of a torque transmitting system or a transmission system. The end portion 1050 can serve to push a motion receiving part, and the end portion 1051 can serve to pull such motion receiving part.

FIG. 13 further shows bellows which are used to seal the housing 1004 at the end portions 1050 and 1051 of the feed screw 1010. If only one of the end portions is actually used as an output element of the actor 1000, the other end portion can be completely confined within a bellows, a membrane or another suitable sealing device to thus reduce the likelihood of penetration of foreign matter into the interior of the housing 1004.

Figure 14:
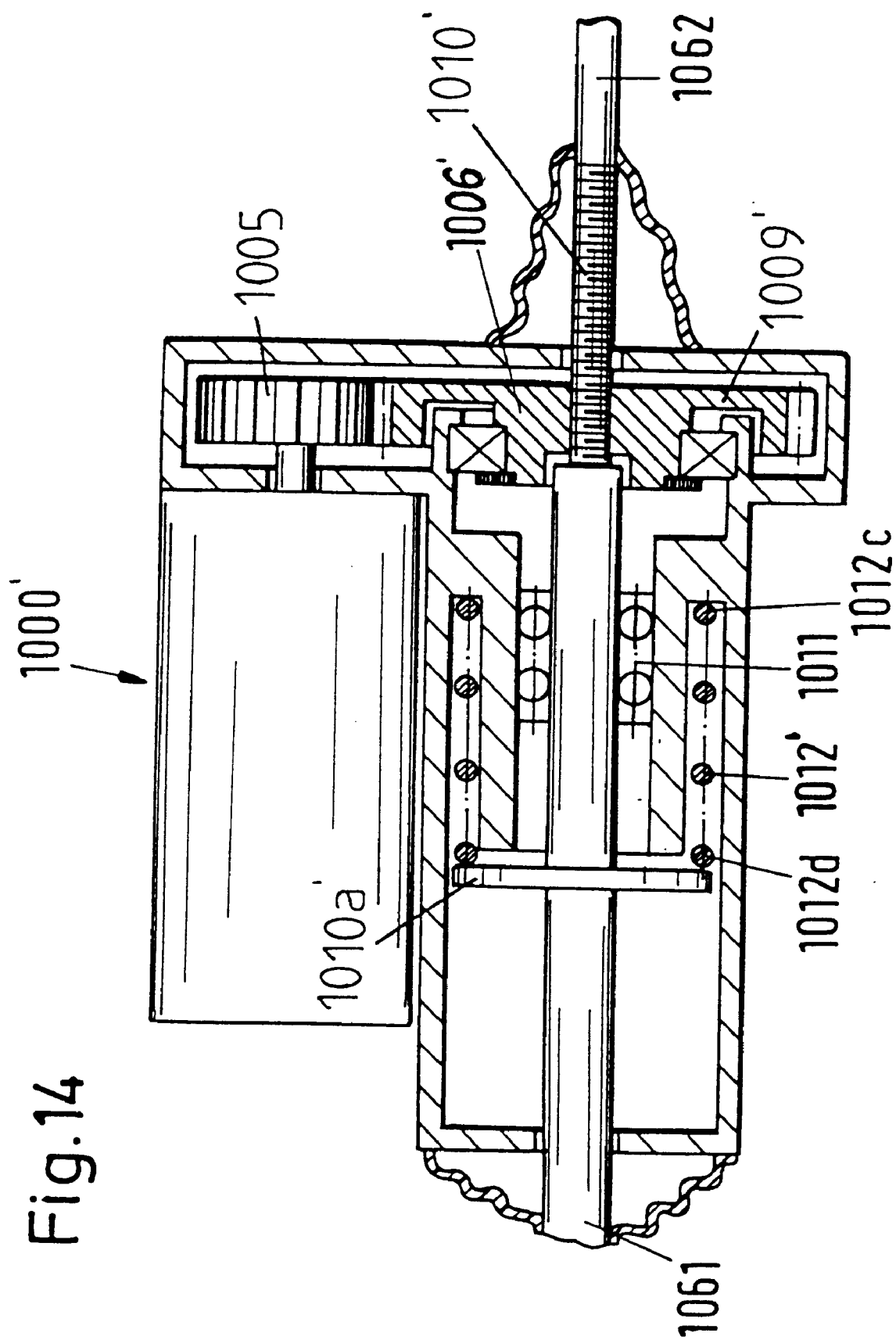
FIG. 14 is a similar view of an actor constituting a modification of the actor of FIG. 13.

FIG. 14 shows an actor 1000' which constitutes a modification of the actor 1000. The main difference is that the energy storing element 1012' is mounted in the housing of the actor 1000' in such a way that it pulls the right-hand end portion 1062 of the feed screw 1010' into the housing and pushes the left-hand end portion 1061 of the feed screw out of the housing. The left-hand end convolution 1012d of the element 1012' bears against a disc-shaped portion or abutment 1010a' of the feed screw 1010', and the right-hand end convolution 1012c reacts against an internal shoulder of the housing. The gear 1006' is shorter than the gear 1006 of the actor 1000 because its nut 1009' is aligned with the spur gear 1005.

It will be seen that, whereas the energy storing element 1012 of the actor 1000 pushes the feed screw 1010 in a direction to the right (as viewed in FIG. 13), the energy storing element 1012' pushes the feed screw 1010' in a direction to the left (as viewed in FIG. 14). Therefore, the end portion 1062 of the element 1010' can be used as a means for pulling a motion receiving part, and the end portion 1061 can be utilized as a means for pushing a motion receiving part, e.g., the engaging/disengaging fork or bearing of a friction clutch. FIG. 14 further shows that the housing of the actor 1000' is somewhat different from the housing 1004, that the linear guide or bearing 1011 of the actor 1000' is mounted rather close to the nut 1009', and that the axial length of the energy storing element 1012' is less than that of the element 1012.

Figure 15A:
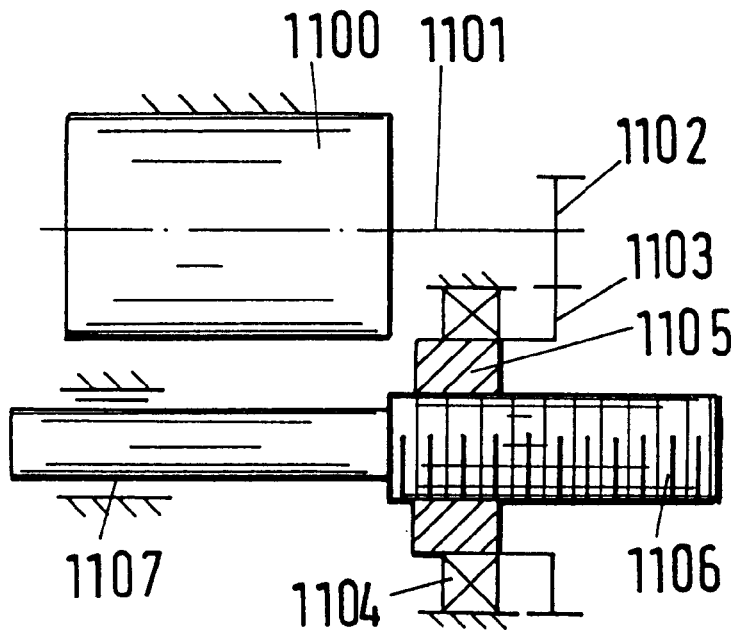
FIG. 15a is a schematic partly elevational and partly sectional view of another actor, with the energy storing means omitted.

FIGS. 15a, 15b, 15c and 15d show four of the presently preferred multi-stage transmissions which can be utilized in the improved actor. Referring first to FIG. 15a, that portion of an actor which is shown therein comprises an electric motor 1100 having a rotary output shaft 1101 of one piece with or rigidly connected to a first spur gear 1102 of a gearing further including a second spur gear 1103 meshing with the spur gear 1102 and including a hub 1105 which constitutes a nut and is rotatably held in a bearing 1104 against movement in the axial direction of the gear 1103 and a feed screw 1106 mating with the nut 1105. The feed screw 1106 is held against rotation by a linear bearing or guide 1107, i.e., this feed screw is compelled to move axially in response to rotation of the output shaft 1101. It will be seen that the two-stage transmission of FIG. 15a is similar to that of the actor 1000 which is shown in FIG. 13. That portion of the feed screw 1106 which is in contact with the guide 1107 can have a non-circular cross-sectional outline, and the guide 1107 can be designed in such a way that it permits such non-circular portion of the feed screw to move axially (lengthwise) but that it cannot rotate in or with the guide.

Figure 15B:
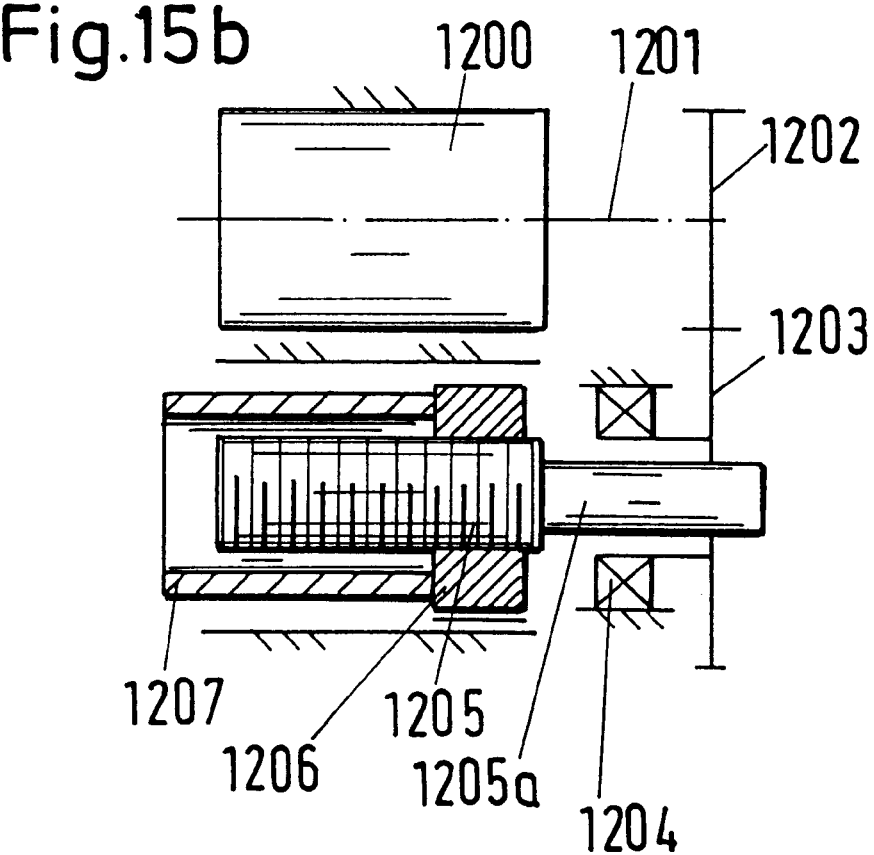
FIG. 15b is a similar view of still another actor.

FIG. 15b shows another actor which includes an electric motor 1200 or another prime mover having a rotary output shaft 1201 carrying a spur gear 1202 in mesh with a second spur gear 1203. The latter is rotatable in a bearing 1204 and is held against axial movement relative to the housing of the actor. The spur gear 1203 transmits torque to an extension 1205a of a rotary feed screw 1205 which is mounted in the housing of the actor in such a way that its axial position remains unchanged. The feed screw 1205 meshes with a nut 1206 which is non-rotatably but axially movably mounted in the housing and carries a tubular (or otherwise configurated) output element 1207 serving to transmit a pull or a push to a mobile part of a torque transmitting system and/or a transmission system (not shown in FIG. 15b). It will be seen that the first stage of the transmission between the motor 1200 and the output element 1207 comprises a set of spur gears 1202, 1203, and that the second stage comprises a feed screw 1205 and a nut 1206 in mesh with the feed screw and movable in the axial direction (in contrast to the axially fixed rotary nut or hub 1105 in the multi-stage transmission of FIG. 15a).

Figure 15C:
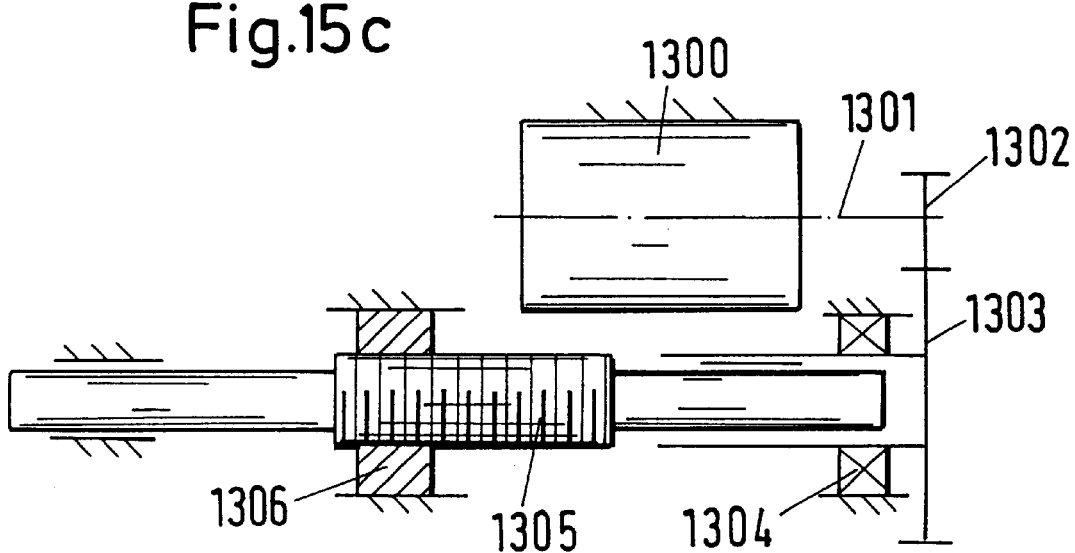
FIG. 15c is a similar view of a further actor.

The multi-stage transmission of the actor which is shown in FIG. 15c comprises a spur gearing including a first gear 1302 on the output shaft 1301 of an electric motor 1300, and a second gear 1303 meshing with the spur gear 1302 and rotatably mounted in a bearing 1304 against movement in the direction of its rotational axis. An elongated tubular hub of the gear 1303 transmits torque to the adjacent elongated end portion of an axially reciprocable feed screw 1305 meshing with a nut 1306 which is fixedly mounted in the housing of the actor. When the gear 1303 is driven by the motor 1300, it rotates the feed screw 1305 which moves axially because it meshes with the fixedly mounted nut 1306.

Either end portion of the feed screw 1305 can be used as an output element of the actor. It is clear that, instead of being telescoped into the hub of the spur gear 1303, the right-hand end portion of the feed screw 1305 can confine and can receive torque from an axial extension of the gear 1303.

Figure 15D:
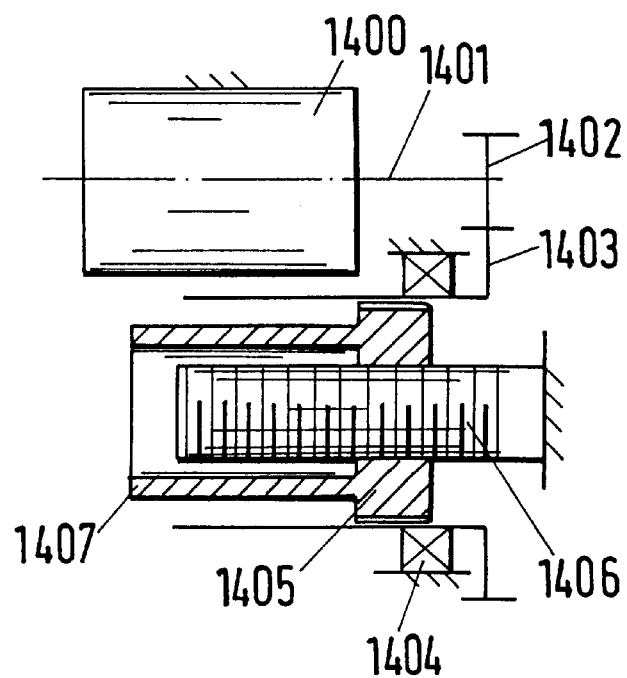
FIG. 15d is a similar view of an additional actor.

The actor of FIG. 15*d* comprises an electric motor 1400 having a rotary output shaft 1401 which drives a first spur gear 1402 meshing with a second spur gear 1403. The latter is rotatable in a bearing 1404 and is held against axial movement relative to the housing of the actor. The gear 1403 has an elongated hollow tubular hub which transmits torque to a nut 1405 which is non-rotatably but axially movably installed in the housing. The nut 1405 meshes with a feed screw 1406 which is fixedly mounted in the housing of the actor and compels the nut to move axially in response to rotation of the output shaft 1401. A tubular extension 1407 of the nut 1405 serves as an output element of the actor or as a means for pulling and/or pushing a discrete output element which is rigidly or articulately connected thereto.

FIGS. 16*a* and 16*b* show an actor 1500 which is designed in such a way that its space requirements in the direction of the axis of the output shaft 1504 of its electric motor 1503 are small or minimal. To this end, the energy storing element 1501 surrounds the housing 1502 of the motor 1503; one end convolution of this energy storing element reacts against an end wall 1502*a* of the housing 1502 and its other end convolution bears against a portion 1505*a* of an axially reciprocable slide or pusher 1505. The latter contains a nut 1506 which mates with an elongated feed screw forming an integral part of or being affixed to the output shaft 1504 of the motor 1503. The housing 1502 is at least partially open to permit dissipation of heat which is generated by the motor 1503.

As can be seen in FIG. 16*b*, the nut 1506 is pivotably mounted in the slide or pusher 1505 to thus reduce the likelihood of jamming of the transmission stage including the nut and the feed screw of the output shaft 1504 when the motor 1503 is on. The member 1505 is reciprocable along two guide rods 1507 which are parallel to the output shaft 1504 and are mounted in the housing 1502 at one side of the motor 1503. To this end, the member 1505 comprises two pairs of followers 1508, 1509 which are spaced apart from each other in the axial direction of the guide rods 1507 and slidably surround the latter. A suitable seal 1510 is provided in the housing 1502 to reduce the likelihood of penetration of foreign matter between the mating portions of the nut 1506 and the feed screw of the output shaft 1504. The actor 1500 further comprises two bellows 1511 and 1514. The bellows 1511 extends between the end wall 1502*a* and the followers 1508 to surround the left-hand portions of the guide rods 1507 (as viewed in FIG. 16*a*). The bellows 1514 seals a slot 1502*b* which is provided in the housing 1502 for the output element of the actor 1500, namely for an arm or rod or leg of a lever or link 1512 which is articulately connected to the member 1505 by a universal joint 1513 or in another suitable way.

The energy storing element 1501 can push the member 1505 and the output element 1512 in a direction to the right, as viewed in FIG. 16*a*, i.e., this energy storing element can assist the motor 1503 in moving the member 1505 in at least one of the two directions of movability of the member 1505 along the guide rods 1507. Such rods can be replaced by rails or by other types of elongated guide means for the member 1505. The element 1512 can (directly or indirectly) transmit motion from the member 1505 to a mobile part of a torque transmitting system and/or a transmission system. The connection between the output element 1512 and a mobile part of a torque transmitting system and/or a transmission system can include a spherical joint or any other suitable motion transmitting means.

The connection between the output element 1512 and a motion receiving means can also include a fluid-operated (hydraulic or pneumatic) arrangement. Still further, the element 1512 can be replaced by a pusher which is rigidly connected with the member 1505 and with the piston of a master cylinder corresponding to the master cylinder 11 of the actor forming part of the control unit 13 which is shown in FIG. 1*a*. Such master cylinder can be mounted on (or even in) the housing 1502; for example, the master cylinder can be secured to the housing 1502 by threaded fasteners or by other suitable fasteners, or it can be made of one piece with the housing 1502. It is also possible to connect the member 1505 or the output element 1512 with a motion receiving part of a friction clutch or the like by a Bowden cable. Thus, the element 1512 can be omitted, the wire of the Bowden cable can be secured to the member 1505 between the two guide rods 1507, and the sheath or sleeve of the Bowden wire can be affixed to the housing 1502.

Referring now to FIGS. 17*a* and 17*b*, there is shown an actor 1600 which comprises a housing 1601 of one piece with or affixed to the housing or casing 1602*a* of an electric motor 1602. An energy storing element 1603 in the form of a coil spring surrounds the motor housing 1602*a* and reacts against an end wall 1601*a* of the housing 1601. The left-hand end convolution of the element 1603 bears against a reciprocable disc-shaped abutment or retainer 1612 of and elongated toothed rack 1608 forming part of a second stage of a two-stage transmission between the motor 1602 and the output elements 1613, 1614 of the actor 1600.

The output shaft 1604*a* of the motor 1602 is of one piece with an elongated worm 1604 which meshes with a worm wheel 1605 rotatable about the axis of a shaft 1606 which is mounted in the housing 1601 so that its axis is normal to the axis of the shaft 1604*a*. The parts 1604, 1605 constitute the first stage of the two-stage transmission, and the second stage further includes a spur gear 1607 which receives torque from the worm wheel 1605 and meshes with the toothed portion of the rack 1608. The worm wheel 1605 can be of one piece with the spur gear 1607 and the two parts can constitute a component which is made of a suitable plastic material in an injection molding or other suitable machine. However, it is also possible to produce the worm wheel 1605 and the gear 1607 as two separate parts which are non-rotatably interfitted or are secured to each other by pins, bolts and nuts, screws or in any other suitable manner.

That end portion of the shaft 1604*a* which is remote from the motor 1602 is rotatably mounted in a bearing 1604*b* which is installed in the housing 1601 of the actor 1600.

The toothed rack 1608 is reciprocable in a linear guide 1611 and in a needle bearing 1610, both mounted in the housing 1601. That portion of the housing 1601 which confines the guide 1611 is outwardly adjacent the energy storing element 1603 and a portion of the motor housing 1602*a*. The purpose of the bearing 1610 and guide 1611 is to confine the toothed rack 1608 to reciprocatory movements along a predetermined path to thus reduce the stressing of the teeth on the spur gear 1607 and on the tooted portion of the rack 1608.

If it is not coupled to the disc-shaped abutment 1612 of the rack 1608 and to the end wall 1601*a* of the housing 1601, the energy storing element 1603 serves to assist in moving the rack in a direction to the left, as viewed in FIG. 17*a*.

The end portion 1613 of the rack 1608 can constitute (or can be connected with) an output element which enables the motor 1602 to exert a push in a direction to move to a selected position a mobile part of a friction clutch or another torque transmitting system. If the end portion 1613 is not directly connected to such mobile part, the connection can include a fork, a lever, a linkage, a combination of master and slave cylinders or the like. If the mobile part of a clutch or the like is to be adjusted in response to a pull exerted by the end portion 1614 of the toothed rack 1608, the connection between the end portion 1614 and the mobile part can include a linkage, a fork or another suitable lever or a Bowden cable.

A first bellows 1615 serves to at least substantially seal the open end of that (substantially tubular) portion of the housing 1601 which confines the guide 1611. A second bellows (or another suitable sealing device) is provided on the housing 1601 around the end portion 1614 of the rack 1608.

That stage of the transmission which includes the gear 1607 and the rack 1608 can be replaced with a stage which employs a crank or a cam or a set of bevel gears or a planetary.

The reference character 1609 denotes bearings which are provided in the housing 1601 for the end portions of the shaft 1606 mounting the gear 1607 and the worm wheel 1605. FIG. 17*b* shows that the parts 1605, 1607 are non-rotatably connected to each other by a sleeve surrounding the shaft 1606.

FIGS. 18*a* and 18*b* illustrate a further actor 1700 which comprises an electric motor 1701 having an output shaft 1703 rotatable about an axis 1717 and journalled in an actor housing 1702. The output shaft 1703 carries or is of one piece with a spur gear 1704 which constitutes the sun wheel of a planetary. The latter forms a first stage of a two-stage transmission between the motor 1701 and a reciprocable output element 1712 and further includes a set of planet pinions 1705 in mesh with the sun wheel 1704 as well as with an internal gear 1706 which is rigidly connected to or is of one piece with a rotary cylinder cam 1707 forming part of a second stage of the aforementioned transmission. The cam 1707 is rotatably journalled in the housing 1702 and is provided with a suitably configured peripheral cam groove 1708 for a roller follower 1709 at one end of a lever 1710 pivotably mounted in the housing 1702, as at 1711. The cam 1707 can include two cylindrical portions including an inner portion which is telescoped into the outer portion; the outer portion is then provided with the cam groove 1708. The surface surrounding such cam groove can be treated to enhance the hardness of the material of the cylinder cam 1707. The axis of the roller follower 1709 is normal to the axis 1717, the same as the pivot axis of the lever 1710. The output element 1712 is a reciprocable pusher which receives motion (either directly or indirectly) from the roller follower 1709. It will be seen that the second stage 1707–1711 of the two-stage transmission of the actor 1700 converts the rotary motion of the internal gear 1706 of the planetary 1704–1706 into a reciprocatory movement of the output element or pusher 1712.

The output element 1712 can be (directly or indirectly) coupled to a motion receiving part of a clutch or another torque transmitting system and/or to a motion receiving element of a transmission system. The mounting of the lever 1710 in the housing 1702 is, or can be, such that the lever takes up at least some lateral stresses acting upon the output element 1712 when the actor 1700 is in use as well as that the lever supports the roller follower 1709 with a certain permissible amount of play relative to the cam 1707.

An energy storing element 1714 in the form of a coil spring reacts against the housing 1702 (see FIG. 18*b*) and indirectly acts upon the cam 1707 to assist the motor 1701 in turning the cam about the axis 1717. That end convolution of the energy storing element 1714 which is nearer to the axis 1717 bears upon an abutment 1713*a* on a shaft one end portion of which is journalled in a bearing 1715 carried by the cam 1707 and the other end portion of which is connected with a crank 1713 having a pin 1716 journalled in the housing 1702. The abutment 1713*a* can turn back and forth about the axis of its shaft and is spaced apart from the axis 1717 in a radial direction of the cam 1707.

The motor 1701 can be used to push or pull the output element 1712, depending upon the direction of rotation of the output shaft 1703 about the axis 1717 and the configuration of the cam groove 1708.

The exact configuration of the cam groove 1708 is a function of the nature of the mounting (at 1713, 1713*a*, 1715 and 1716) of the adjacent end convolution of the energy storing element 1714 and/or vice versa.

FIGS. 19*a* and 19*b* illustrate the important features of a further actor 2000 including a prime mover 2002 (such as an electric motor) and a housing 2001 rotatably mounting the output shaft 2003 of the motor 2002. The shaft 2003 is connected to, or is of one piece with, an elongated worm 2004 having one end portion journalled in the housing 2001 and meshing with a worm wheel 2005. The worm wheel 2005 is coaxially connected (as at 2006) with a disc cam 2007. That side of the worm wheel 2005 which faces away from the cam 2007 is provided with a shaft 2008 mounted in a bearing 2009 which is installed in the housing 2001. The cam 2007 is connected with a pin at one end of a link or crank arm 2010 the other end of which carries a pin journalled in a bearing 2011 of the housing 2001.

The cam 2007 shares all angular movements of the worm wheel 2005 and its peripheral surface is tracked by a roller follower 2013 cooperating with a reciprocable output element 2012 of the actor 2000. The roller follower 2013 is mounted at one end of a lever 2014 which, in turn, is pivotably mounted in the housing 2001 and serves to take up stresses acting in the axial direction of the roller follower 2013. The latter operates between the peripheral surface of the cam 2007 and a platform at the adjacent axial end of the output element 2012.

That pin of the crank arm or link 2010 which is connected with the disc cam 2007 is acted upon by an energy storing element 2015 which reacts against a wall of the housing 2001. The cam 2007 is being acted upon by the torque which is being transmitted by a clutch controlled by the unit including the actor 2000, and the magnitude of such torque further depends upon the configuration of the peripheral surface of the cam 2007. The just discussed torque acting upon the cam 2007 and the torque being transmitted by the energy storing element 2015 can be related to each other in such a way that the magnitude of the resultant torque acting upon the cam is less than in the absence of the energy storing element 2015.

In order to maintain the relationship between the load torque and the compensatory torque within an acceptable range, it is normally necessary to provide adjusting means in the connection between the output element 2012 and the mobile part of a clutch if the actor 2000 forms part of a unit which controls the operation of a torque transmitting system such as the clutch 3 of FIG. 1*a*. For example, the conduit 9 of the connection 9–11 shown in FIG. 1*a* can be connected with a source of pressurized fluid (such as oil) by a so-called sniffing bore or hole (not shown in FIG. 1a). Reference may be had to the commonly owned copending U.S. patent application Ser. No. 08/610,674.

In order to ensure the establishment and maintenance of continuous physical contact between the aforementioned platform of the output element 2012 and the roller follower 2013 during each stage of operation of the actor 2000, it is advisable to provide resilient means which urges one of the parts 2012, 2013 against the other of these parts. FIGS. 19a and 19b show a coil spring 2016 which reacts against an internal surface of the housing 2001 and urges the platform of the output element 2012 against the roller follower 2013; this further ensures that the roller follower remains in contact with the peripheral surface of the disc cam 2007.

The electronic circuitry of the control unit which includes the actor 2000 can be installed in the housing 2001. Furthermore, the control unit can include suitable sensor means corresponding to the sensors 14–17, 19, 19a of FIG. 1a and/or other sensors. For example, the electronic circuitry of the control unit including the actor 2000 can receive signals from a sensor (such as a Hall generator or a potentiometer or an inductive distance monitoring device) which monitors the linear displacements of the output element 2012 (i.e., the momentary position of this output element), and/or from a sensor which monitors the incremental movements of an indexible part and/or the angular position of a rotary part of the actor and/or of a part in the connection between the output element 2012 and a mobile part of a torque transmitting system and/or a transmission system in a motor vehicle (FIG. 19 shows schematically an automated transmission 2004T). The circuitry in the housing 2001 can include all of the circuitry (including the power electronics for the motor 2002) or certain parts of such circuitry.

If the actor of the control unit is not of the self-locking type (e.g., if neither of the plural stages of the transmission forming part of an actor is self-locking), it is often desirable or advisable to design the actor in such a way that the energy storing element or elements of the actor automatically maintain the mobile part or parts of a torque transmitting system and/or a transmission system in a predetermined position when the actor (particularly the prime mover of the actor) is idle. For example, and if the output element of an improved actor is directly or indirectly connected with a mobile torque selecting part of a clutch, the energy storing element or elements of such actor can be designed in such a way that, when the actor of the prime mover is idle, the clutch is automatically set (by the energy storing element and the output element of the actor and/or by one or more resilient elements of the clutch) for the transmission of a preselected torque. This ensures that the motor vehicle is not permitted to roll when the engine of the vehicle is idle while the wheels of the vehicle engage an upwardly or a downwardly sloping road surface.

Alternatively, the actor and/or the clutch can be provided with a blocking or locking device which automatically prevents any rolling of the vehicle wheels when the engine is off and the clutch is fully disengaged. This, too, can be achieved with the energy storing element or elements of the actor and/or by a cam which is tracked by a follower and assumes a particular position (such as a position other than a dead center position) when the rolling movements of the vehicle are to be blocked while the actor is idle. It is also possible to provide suitable detent means to positively maintain the clutch in a desired condition when the engine of the motor vehicle and/or the motor of the actor is off. The term "detent means" can also embrace a device which employs a so-called wraparound spring, an electromagnetic auxiliary brake or any other so-called auxiliary actor which becomes active during certain stages of operation or absence of operation of the main actor. For example, an electromagnet can be used to displace a pin or stud or bolt so that such mobile part penetrates into or is withdrawn from a socket, an opening, a hole or the like. Penetration of a pin, stud or bolt into a socket in response to the action of an electromagnet or the like can entail a blockage of an otherwise mobile part in a selected position, e.g., in a position in which a friction clutch is engaged to an extent necessary to prevent undesirable movements of a motor vehicle on an inclined road surface when the engine and/or the motor of the actor is idle.

Figure 20:
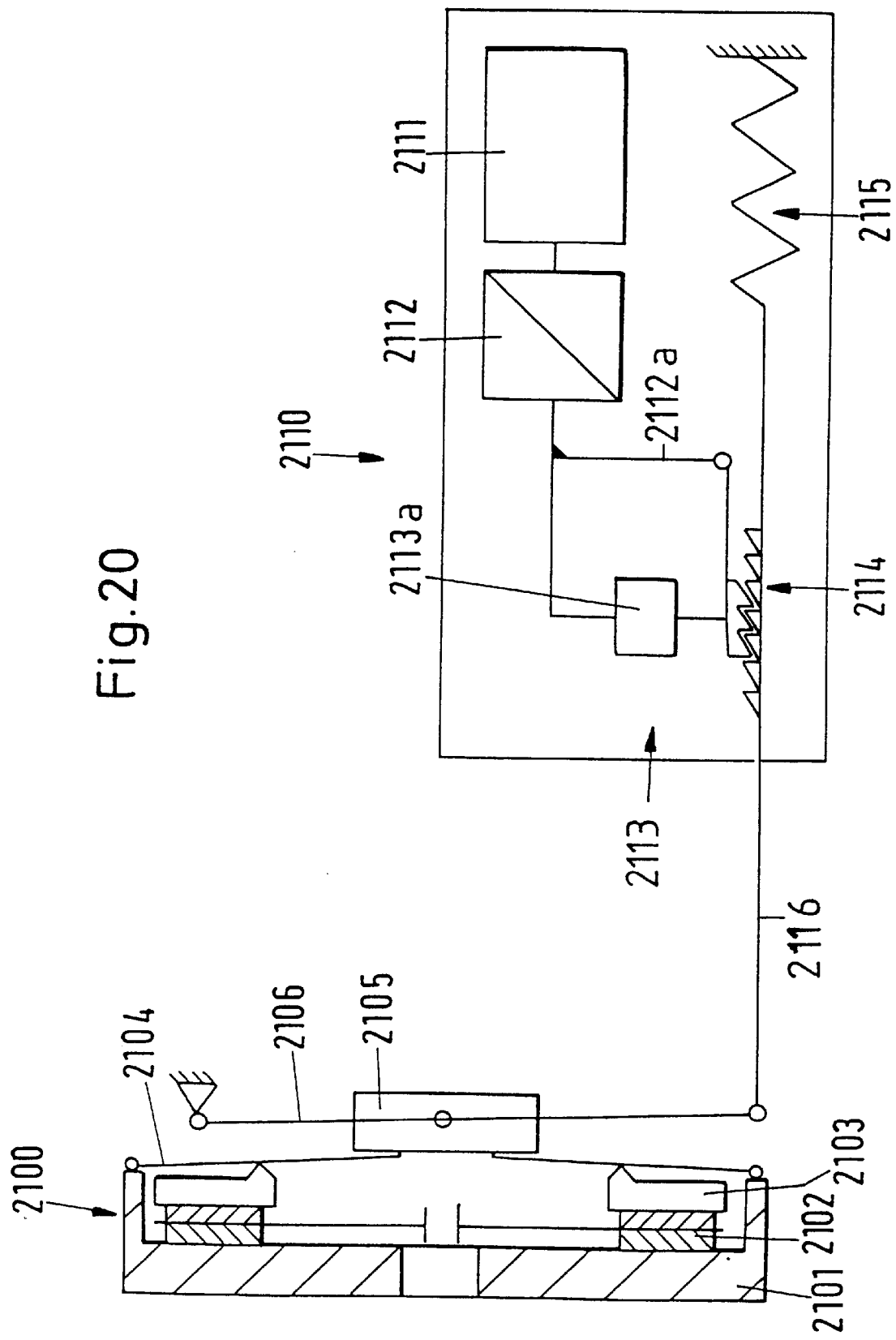
FIG. 20 is a view similar to that of FIG. 2 but showing a different actor.

The structure of FIG. 20 is similar to that which is shown in FIG. 2. Thus, the torque transmitting system 2100 is a push-type clutch having an engine-driven flywheel 2101, an axially movable pressure plate 2103, a clutch disc 2102 with friction linings between the friction surfaces of the flywheel 2101 and the pressure plate 2103, a system of levers 2104 which can act upon the pressure plate 2103 to move it axially toward the flywheel 2101 to thus engage the clutch to a desired extent, a centrally located bearing 2105 which can push or pull the radially inner portions of the levers 2104, and a lever 2106 which supports or is otherwise operatively connected with the bearing 2105. The structure which is shown in FIG. 20 further comprises a primary actor 2110 having a prime mover (e.g., an electric motor) 2111, a single-stage or multi-stage transmission 2112, and an energy storing element 2115. An elongated rod- or pusher-like output element 2116 is or can be biased by the energy storing element 2115 and is articulately connected to the free end portion of the lever 2106, i.e., to that end portion which is not pivotally mounted in the frame of the motor vehicle having a power train which embodies the clutch 2100.

The primary actor 2110 cooperates with an auxiliary actor 2113 serving to selectively couple the output member 2112a of the transmission 2112 with or to uncouple such output member from the output element 2116 of the actor 2110. To this end, the auxiliary actor 2113 comprises a relay 2113a and toothed entraining means 2114. When the relay 2113a is deenergized, the entraining means 2114 is ineffective and the energy storing element 2115 can move the output element 2116 to a preselected axial position which is determined by the bias of the element 2115 and by the bias (if any) of one or more resilient elements (not specifically shown) forming part of the clutch 2100 and opposing (or promoting) a movement of the element 2116 in a direction to the left, as viewed in FIG. 20. When the entraining means 2114 is operative, i.e., when the relay 2113a of the auxiliary actor 2113 is energized, the axial position of the output element 2116 of the primary actor 2110 is determined by the energy storing element 2115 and by the transmission 2112, i.e., by the position of the output member 2112a of the transmission 2112 (it is assumed now that the clutch 2100 does not embody any resilient means which would influence the axial position of the output element 2116 or which would influence such axial position of the element 2116 to a noticeable extent). It is clear that the functions of the relay 2113a can be reversed, namely that the entraining means 2114 is operative when the relay 2113a is deenergized, and vice versa.

The bias of the resilient element or elements forming part of or directly acting upon the lever 2106 and/or upon the bearing 2105 and/or upon the levers 2104 and/or upon the pressure plate 2103 of the clutch 2100 is balanced by the bias of the energy storing element 2115 when the entraining means 2114 is ineffective. This ensures that the clutch 2100 is set to transmit a preselected torque as long as the entraining means 2114 remains inoperative, i.e., as long as the axial position of the output element 2116 cannot be influenced by the motor 2111 and by the transmission 2112 of the primary actor 2110.

An important advantage of the structure which is shown in FIG. 20 is that the energy storing element 2115 can automatically compensate for wear upon one or more component parts of the clutch 2100, particularly upon the friction linings of the clutch disc 2102 which are most likely to undergo extensive wear during the useful life of the clutch. Thus, the auxiliary actor 2113 not only ensures an automatic selection of a desired torque when the primary actor 2110 is idle but such auxiliary actor further serves as a means for ensuring automatic compensation for wear upon certain component parts of the clutch 2100.

It goes without saying that the toothed entraining means 2114 constitutes but one of a number of various devices which can be utilized to selectively couple the output member 2112a with or to uncouple this output member from the output element 2116. For example, and as will be described in detail with reference to FIG. 23, the auxiliary actor can include parts which are movable into and from frictional engagement with each other. An advantage of the form-locking connection which can be established by the complementary teeth of the two cooperating racks of the entraining means 2114 is that the energization (or deenergization) of the relay 2113a can establish a highly reliable positive mechanical connection between the member 2112a and the element 2116. In the embodiment of FIG. 20, those teeth of the entraining means 2114 which must move with the element 2116 can ride over the teeth which are connected to the output member 2112a (while the relay 2113a assumes a condition in which it tends to oppose a relative movement between the two sets of teeth) only in response to the exertion of a very large force acting to move the element 2116 in a direction to the left, as viewed in FIG. 20.

The transmission 2112 can be a single-stage transmission or a multi-stage transmission and it can be designed for a linear or non-linear transmission of forces. For example, the transmission 2112 can employ one or more cranks or one or more sets of mating spur gears or other types of gears.

FIGS. 21a and 21b show certain components of an actor 2200 which comprises a prime mover 2202 (e.g., an electric motor having an output shaft 2209 journalled in a housing 2201 and in a bearing 2210 installed in the housing. The output shaft 2209 is connected to or of one piece with an elongated worm 2203 mating with a worm wheel 2204 on a shaft 2211 which is mounted in the housing 2201. The worm wheel 2204 is of one piece with or is rigidly secured to an oval gear 2205 (this oval gear can be replaced with a gear segment) having teeth mating with the teeth 2206b of an elongated complementary toothed rack 2206a mounted in the housing 2201 for movement along a bearing 2212 which maintains the rack at a fixed radial distance from the shaft 2211. The rack 2206a is of one piece with or is connected to a plunger-like output element 2208 which is reciprocably guided in the housing 2201 and can be biased to the left, as viewed in FIG. 21a, by an energy storing element 2207. The latter reacts against an internal wall of the housing 2201 and bears upon a disc-shaped abutment 2213 of the toothed rack 2206a.

The effective radius of the oval gear 2205 varies as a function of angular displacement of the worm wheel 2204 about the axis of the shaft 2211. Thus, the extent of linear displacement of the rack 2206a in response to identical incremental angular displacements of the gear 2205 is not constant. This brings about corresponding non-linear displacements of the means for transmitting motion from the output element 2208 to a mobile part of a clutch or another torque transmitting system or a transmission system. For example, the connection between the mobile torque selecting element of a clutch and the output element 2208 can comprise a fluid-operated arrangement of the type shown, at 9, 10, 11, in the aforedescribed FIG. 1a. Of course, it is also possible to establish a direct (rigid or articulate) connection between the output element 2208 and a motion receiving torque selecting element of a clutch or another torque transmitting system.

The energy storing element 2207 (or another suitable energy storing element) can be mounted to operate between the housing 2201 and the output element 2208, or the element 2207 can be mounted to exert a push or a pull upon the abutment 2213.

An advantage of the actor 2200 is that its rack 2206a and output element 2208 can compensate for a nonlinear characteristic disengagement curve of a clutch or another torque transmitting system or transmission system. This ensures a more uniform modulation of load which is being applied to the motor 2202.

FIG. 21b shows a bearing 2214 (e.g., a ball bearing) for one end portion of the shaft 2211 which carries the worm wheel 2204 and the spur oval gear 2205.

FIGS. 21c and 21d illustrate certain details of an actor which constitutes a modification of the actor 2200. The gear 2205' of FIGS. 21c and 21d is actually a segment having teeth 2220 in mesh with the teeth 2206b' of a toothed rack 2206a'. FIG. 21c shows the gear 2205' in an angular position in which the gear teeth 2220 close to the axis of the gear 2205' are in mesh with the teeth 2206b' of the rack 2206a'. In FIG. 21d, the angular position of the gear 2205' is such that the teeth of the rack 2206a' mesh with those gear teeth which are located at a maximum distance from the axis of the gear 2205'. It will be noted that the rack 2206a' assumes a position which is different from that shown in FIG. 21c.

The actor which embodies the structure of FIGS. 21c and 21d exhibits the same advantages as the actor 2200. Thus, and since the ratio of the transmission stage including the gear 2205' and the rack 2206a' varies as a function of changes of the angular position of the gear 2205', the capacity of the prime mover (such as the electric motor 2202) can be utilized more effectively than in the absence of a transmission stage with a variable transmission ratio. This, in turn, renders it possible to equalize or level the torque which must be supplied by the prime mover to actuate a clutch or another torque transmitting system or a transmission system. Otherwise stated, it is possible to uniformize the torque during each stage of movement of a mobile torque selecting part or element of a clutch or the like, i.e., the characteristic curve of the torque selecting element or part can more accurately conform to the characteristic curve of the actor.

Figure 22:
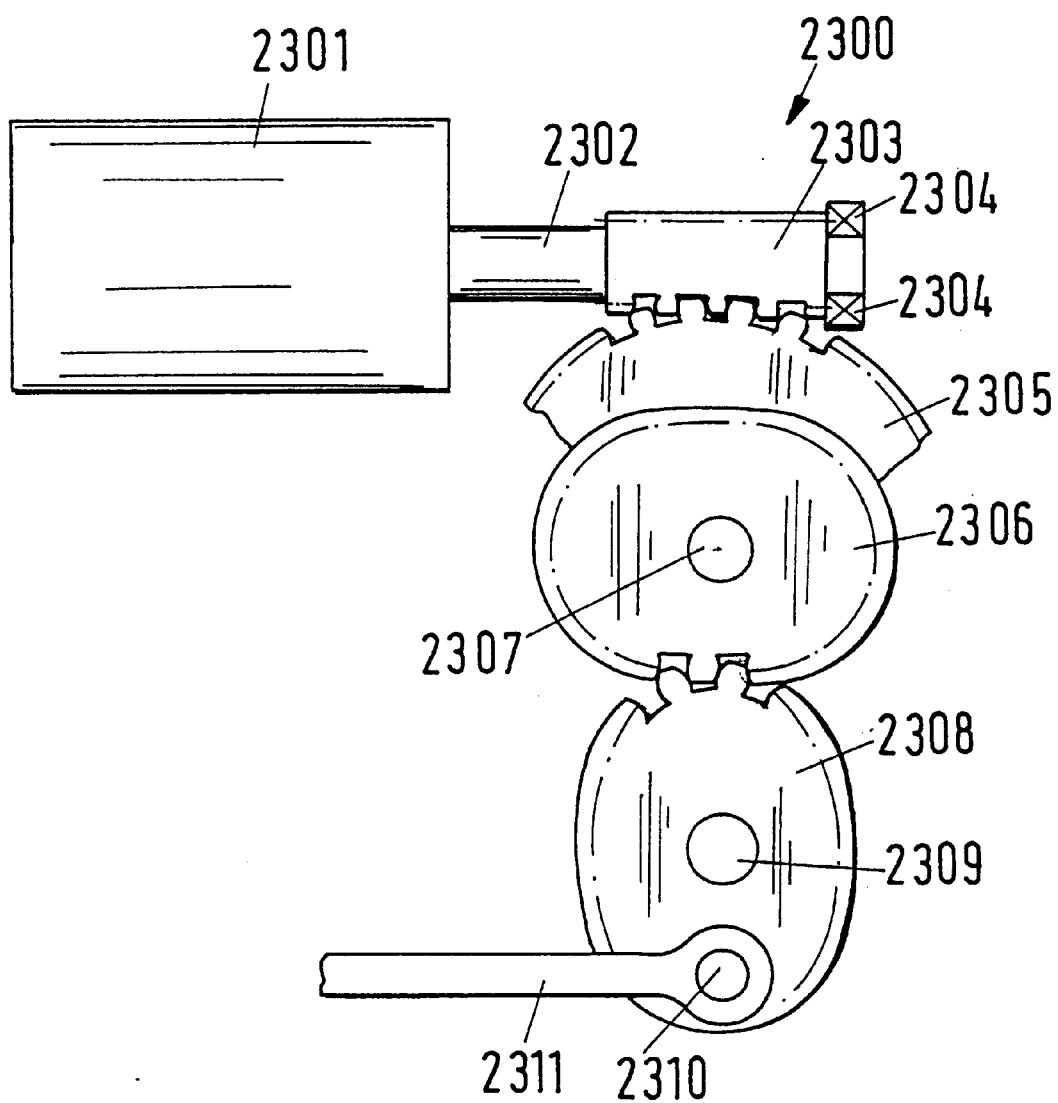
FIG. 22 is a fragmentary schematic elevational view of certain parts of an actor constituting a further modification of the actor of FIGS. 21a and 21b.

FIG. 22 illustrates certain details of a further actor 2300 which comprises a prime mover 2301 (such as an electric motor) having an output shaft 2302 journalled in a bearing 2304 of an actor housing (not shown) and carrying a worm 2303 in mesh with a worm wheel 2305 on a shaft 2307. The latter further carries an oval gear 2306 mating with a second oval gear 2308 on a shaft 2309. The gear 2308 carries an eccentric pin 2310 for a link or crank 2311 which is (or which is connected to) the output element of the actor 2300.

The advantages of the actor 2300 are analogous to those of the actor 2200 or of the actor embodying the structure of FIGS. 21c and 21d. Thus, the effective radius of the gear 2306 varies as a function of changes of the angular position of such gear, and this exerts a beneficial effect upon the uniformity of load acting upon the motor 2301. It will be noted that the actor 2300 employs a two-stage transmission wherein the second stage includes the oval gears 2306, 2308 and the crank 2311; on the other hand, the actor 2200 comprises a transmission with a second stage including the rack 2206a and the gear or gear segment or pinion 2205.

Figure 23:
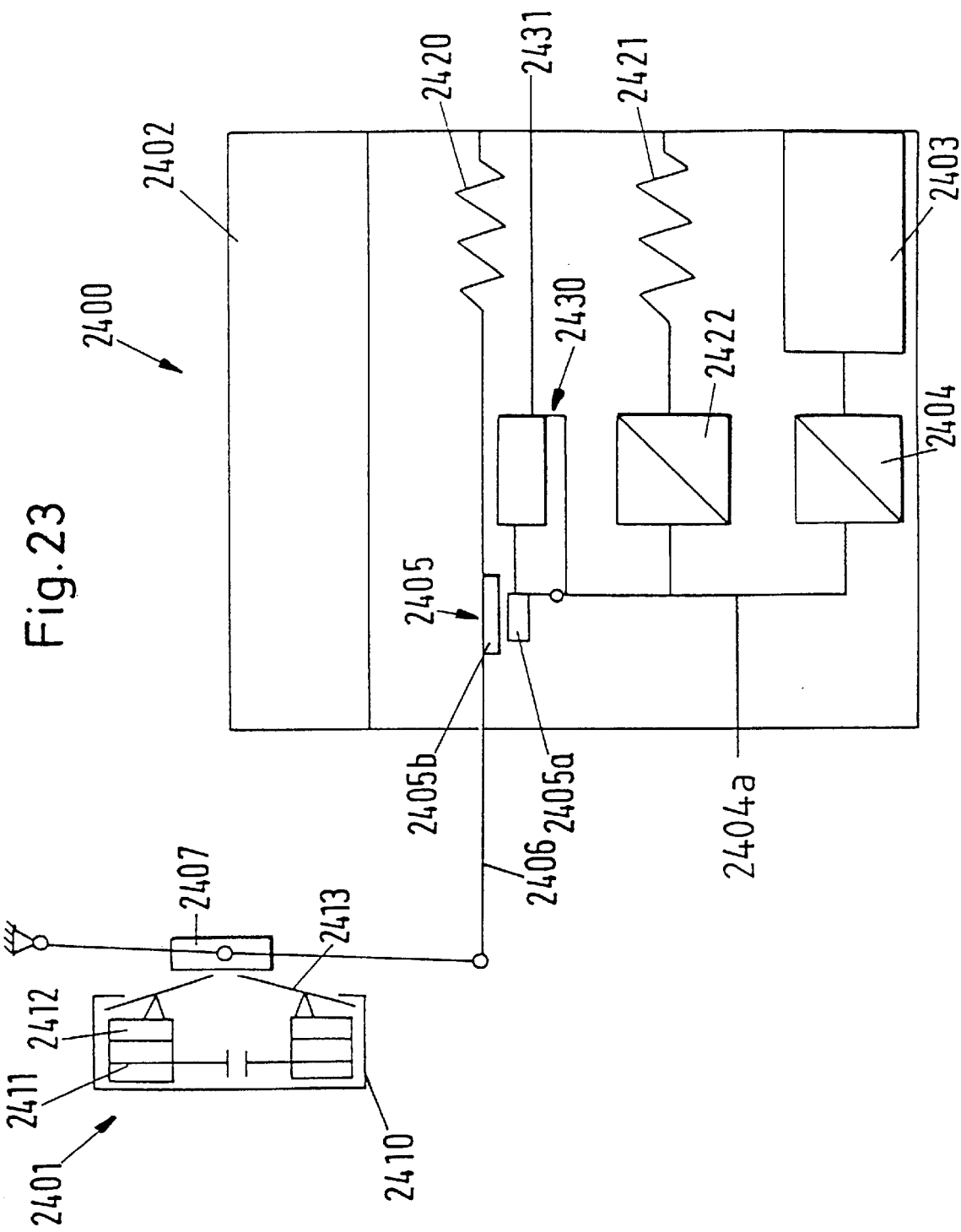
FIG. 23 is a view similar to that of FIG. 2 but showing a different actor.

FIG. 23 shows an actor 2400 having an output element 2406 which transmits motion to a centrally located bearing 2407 or another suitable motion transmitting element or part of a torque transmitting system 2401, e.g., a push-type clutch. The latter comprises a housing (flywheel) 2410 which receives torque from the output member (e.g., a crankshaft or a camshaft) of a driving arrangement such as the combustion engine of a motor vehicle, a clutch disc or clutch plate 2411, a pressure plate 2412 which can be displaced axially to clamp the friction linings of the clutch disc 2411 against the rotating housing 2410, and a system of levers 2413 which operate between the pressure plate 2412 and the bearing 2407.

The housing of the actor 2400 contains some or all of the electronic circuitry 2402 of the control unit for the clutch 2401, and the actor 2400 further comprises a prime mover 2403 (e.g., an electric motor) as well as a single-stage or multi-stage transmission 2404 having an output member 2404a connectable to the output element 2406 of the actor. The means 2405 for selectively connecting or coupling the output member 2404a to the output element 2406 can comprise complementary components 2405a, 2405b which can be placed into frictional or into a more positive engagement with each other, e.g., in response to energization or closing or engagement of an adjusting means 2430 which can include or constitute a switch, a relay or a motor and is operatively connected with the mobile component 2405a of the coupling means 2405.

The actor 2400 further comprises an energy storing element 2420 which can act upon the output element 2406 to move the bearing 2407 to a predetermined position (in which the clutch 2401 transmits a torque of predetermined magnitude) when the coupling means 2405 is inoperative, i.e., when the component 2405b can move relative to the component 2405a. The energy storing element 2420 can constitute a coil spring having a linear or non-linear characteristic curve. A further energy storing element 2421 (having a linear or non-linear characteristic curve) can act upon the output member 2404a of the transmission 2404 by way of a further transmission 2422. The energy storing element 2421 can be said to constitute a compensating spring, and the transmission 2422 which couples this energy storing element with the output member 2404a can have a linear or a non-linear characteristic curve.

The transmission 2404 can constitute a linear or a non-linear step-up or step-down transmission.

The part 2431 of the adjusting means 2430 can be said to constitute an auxiliary actor (e.g., a switch, a relay or a motor) which can engage or disengage the coupling means 2405. When the coupling means 2405 is operative, the position of the output element 2406 can be influenced by the output element 2420, by the output element 2421 (by way of the transmission 2422, and by the output member 2404a of the transmission 2404, i.e., by the motor 2403 of the actor 2400. The auxiliary actor 2431 can also include or constitute an electromagnet; such electromagnet can be designed to shift the component 2405a relative to the component 2405b in the longitudinal direction of the output element 2406 to thus compensate for wear upon the friction linings of the clutch disc 2411 or for the wear upon such friction linings as well as upon one or more other clutch parts which are subject to noticeable wear during the useful life of the clutch 2401. The adjustment of the component 2405a relative to the component 2405b can serve to ensure that the operating point of the clutch 2401 remains at least substantially unchanged during the useful life of the clutch.

The clutch 2401 can comprise a clutch spring (such as a diaphragm spring which includes or is provided in addition to the levers 2413) which is installed in such condition that it automatically engages (or at least partially engages) the clutch when the coupling means 2405 is inactive. The clutch spring can perform such engaging function regardless of whether the clutch 2401 is a pull-type or a push-type clutch. This means that, if the clutch 2401 is to be disengaged, the output element 2406 can move the bearing 2407 against the opposition of the clutch spring. If the initial stressing of the clutch spring is such that it tends to maintain the clutch 2401 in a partially engaged condition, the output element 2406 can serve to move the bearing 2407 in a first direction to completely engage the clutch and in a second direction to disengage the clutch. If the clutch 2401 does not embody a diaphragm spring or another clutch spring, the output element 2406 can serve as a means for selecting each and every condition of the clutch, i.e., the fully disengaged condition, the fully engaged condition and any desired number of different partially engaged conditions.

When the coupling means 2405 is operative, the motor 2403 and the transmission 2404 can cooperate to select the position of the output element 2406 in a manner as explained in connection with the mode of operation of one of the previously described actors, e.g., the actor 2300 of FIG. 22.

FIG. 24a shows an actor 2500 having an output element 2506 (e.g., a linkage, a pusher, a rod, a plunger or the like) connected to the torque selecting means (e.g., a system of levers and/or a diaphragm spring) 2505 of a torque transmitting system 2501 (such as a friction clutch). The actor 2500 further comprises a prime mover 2502 (e.g., an electric motor), a (linear or non-linear) transmission 2503, and an energy storing element 2504 which can act (either directly or indirectly) upon the output element 2506 to influence the condition of the clutch 2501 in cooperation with or against the resistance of resilient means forming part of the clutch. The energy storing element 2504 can have a linear or a non-linear characteristic curve.

The actor 2500 further comprises a force compensating device 2507 which includes a resilient element 2508 cooperating with a transmission 2509 having an output member adapted to cooperate with the output member of the transmission 2503 to influence the output element 2506 by way of a suitable connection or coupling 2510.

FIG. 24b illustrates an actor 2550 which constitutes a modification of the actors 2400 and 2500. The actor 2550 comprises a housing which confines or carries the housing of a prime mover 2552 (e.g., an electric motor) having an output member connected with the input member of a single-stage or multi-stage linear or non-linear transmission 2553 adapted to select the position (such as orientation) of an output element 2555 connected to the torque selecting means 2557 of a torque transmitting system 2551 (e.g., a friction clutch with or without a diaphragm spring or another clutch spring). The actor 2550 further comprises an energy storing element 2554 which is operatively connected with the output element 2555 and can select the position of the torque selecting means 2557 in cooperation with the resilient means (if any) of the clutch 2551 or against the opposition of such resilient means.

The connection between the output element 2555 and the torque selecting means 2557 comprises adjusting means 2556 which is designed to compensate for wear at least upon the friction linings of the clutch disc in the clutch 2551. In addition to or in lieu of the wear compensating function, the adjusting means 2556 can be used to adjust the bias of the energy storing element 2554 upon the torque selecting means 2557 and/or the connection between the output member of the transmission 2553 and the torque receiving means 2557 for reason(s) other than the wear upon the friction linings of the clutch disc in the clutch 2551.

In the actors 2500 and 2550, the energy storing elements 2504 and 2554 are mounted to react against the housings of the respective actors. However, it is equally possible to mount the energy storing element 2504 to react against the housing or casing of the motor 2502 or against a member of the transmission 2503, and/or to mount the energy storing element 2554 in such a way that it reacts against the housing of the motor 2552 or against a member of the transmission 2553. The energy storing element 2554 can include one or more linearly or non-linearly acting compensating springs, the same as the energy storing element 2504 and/or 2508. It is also possible to replace the two discrete energy storing elements 2504, 2508 of the actor 2500 with a single energy storing element, particularly one or more non-linearly acting coil springs or other suitable springs.

The construction, installation and mode of operation of the adjusting means 2556 can be such that this adjusting means permits the energy storing element 2554 to automatically compensate for wear upon one or more parts or groups of parts of the clutch 2551 when the clutch is not called upon to transmit torque as well as to automatically set the clutch for the transmission of a predetermined torque. In other words, the adjusting means can allow for a relaxation of the system including the clutch 2551 before it engages again to ensure that the position of the torque selecting means can be selected by the motor 2552 and transmission 2553, i.e., in response to signals from the electronic circuitry and from the sensor(s) connected to the control unit which includes the actor 2550. Repeated activation and deactivation of the adjusting means 2556 ensures that the ability of the clutch 2551 to transmit a desired torque does not change in response to prolonged use of the clutch, i.e., that the condition of the clutch (as far as its ability to transmit torque in a predictable manner is concerned) remains at least substantially unchanged during the useful life of the clutch. In this respect, the mode of operation of the adjusting means 2556 is analogous to that of the means 2405 in the actor 2400 of FIG. 23.

Figure 25A:
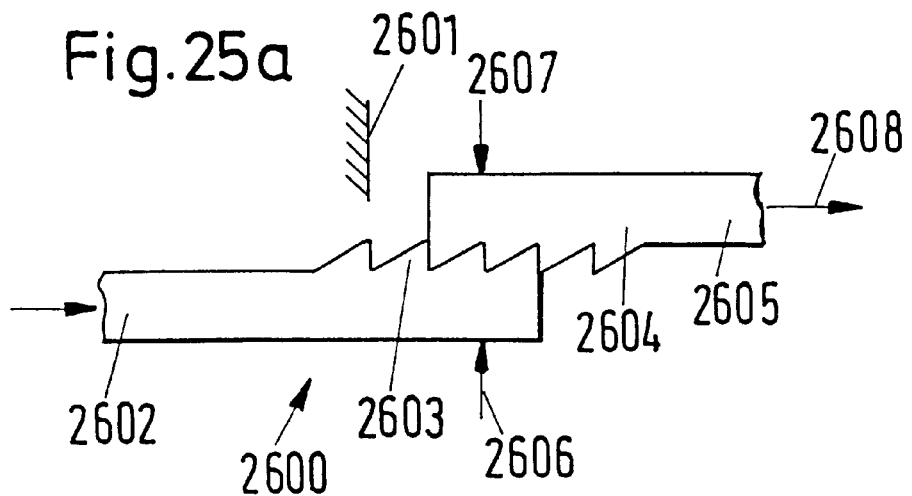
FIG. 25a is a fragmentary schematic elevational view of an adjusting mechanism between an actor and a system which receives motion from the actor.

FIG. 25a shows an adjusting mechanism 2600 which can be utilized to compensate for wear at least upon the friction linings of the clutch disc or clutch plate in a friction clutch or another torque transmitting system. Such adjusting mechanism can be utilized as (or in lieu of) the adjusting means 2556 in the actor 2550 of FIG. 24b. The mechanism 2600 comprises a fixed abutment or stop 2601, a first mobile component 2602 having teeth 2603, and a second mobile component 2605 having teeth 2604 mating with the teeth 2603 when the mechanism 2600 is to transmit motion from one of the components 2602, 2605 to the other of these components. For example, the component 2602 can be (directly or indirectly) connected with a prime mover (not shown) which is designed to move the component 2602 in at least one direction, namely in a direction to the right as viewed in FIG. 25a. The component 2605 is then caused to move in the direction of arrow 2608 provided that the magnitude of the forces (indicated by the arrows 2606 and 2607) which urge the teeth 2603, 2604 into mesh with each other is sufficient to prevent the component 2602 from moving relative to the component 2605. At the very least, the magnitude of the forces denoted by the arrows 2606 and 2607 should suffice to ensure that the teeth 2603 and 2604 are not unintentionally (e.g., accidentally) disengaged from each other.

By way of example, an adjusting operation can be carried by the mechanism 2600 in the following way: The component 2602 can be pulled in a direction to the left, as viewed in FIG. 25a, with a force which is greater than the forces 2606, 2607 so that the teeth 2603 ratchet relative to the teeth 2604 and the position of the component 2605 remains unchanged. If the forces denoted by the arrows 2606, 2607 prevent the teeth 2603 from coming out of mesh with the teeth 2604, the component 2605 is moved counter to the direction which is indicated by the arrow 2608, e.g., by the width of one of the teeth 2603, 2604 and in a direction toward the fixed stop 2601.

If the component 2605 is pulled away from the stop 2601 with a force which overcomes the forces denoted by the arrows 2606, 2607 while the component 2602 is held against movement in a direction to the right, the teeth 2604 ratchet over the teeth 2603 and the component 2605 is moved through a desired distance, e.g., the width of one of the teeth 2603, 2604. This amounts to a one-sided adjustment, i.e., the component 2605 is adjusted relative to the stop 2601 and relative to the component 2602. Otherwise stated, the component 2605 cannot alter the position of the component 2602 unless the forces denoted by the arrows 2606, 2607 compel the component 2602 to move with the component 2605.

An adjustment of the component 2605 relative to the component 2602 in the direction of the arrow 2608 can serve to increase the combined effective length of the components 2602, 2605 in order to compensate for the wear upon the friction linings of the clutch disc and (if necessary) for the wear upon other parts of a friction clutch. Thus, and referring for example to the actor 2400 and clutch 2401 of FIG. 23, if the adjusting mechanism 2600 of FIG. 25a is built into the output element 2406, a lengthening of the element 2406 can cause the pressure plate 2412 to move nearer to the left-hand portion of the flywheel or housing 2410 and to thus ensure that the clutch 2401 can transmit a selected torque in spite of the wear upon the friction linings of the clutch disc 2411.

The adjusting mechanism 2600 can be installed in the output element of an actor or at many other locations, for example, in the output member 2404a of the part 2404 of the actor 2400.

If the fixed abutment 2601 of FIG. 25a is a fully engaged clutch, the compensation for wear can be carried out by moving one of the components 2602, 2605 relative to the other of these components to change the combined length of such components subsequent to changing the condition of the clutch to the fully engaged condition.

Figure 25B:
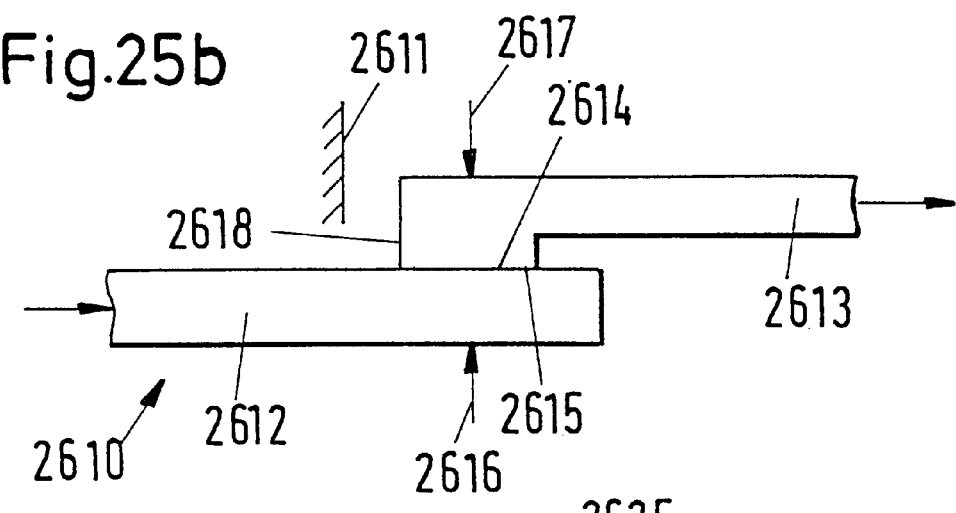
FIG. 25b is a similar view of a different adjusting mechanism.

The adjusting mechanism 2610 of FIG. 25b constitutes a first modification of the mechanism 2600 of FIG. 25a. An important difference is that the components 2612, 2613 of the mechanism 2610 constitute or act not unlike a slip clutch. The component 2612 has a friction surface 2614 which can engage a friction surface 2615 of the component 2613 with a variable force, depending upon the magnitude of the forces which are indicated by the arrows 2616, 2617.

The part 2613 has an end face or edge face or front face 2618 which can be moved toward or into actual abutment with a fixed or an adjustable (movable) stop 2611.

The mechanism 2610 can carry out an adjustment of the components 2612, 2613 as a unit in a direction toward or away from the stop 2611 if the forces denoted by the arrows 2616, 2617 are sufficiently large to prevent any movements of the friction surfaces 2614, 2615 relative to each other. Another adjustment can be carried out by moving the end face 2618 of the component 2613 against the stop 2611 and by thereafter pulling or pushing the component 2612 relative to the component 2613. It is further possible to provide a second (fixed or adjustable) stop for the right-hand end face of the component 2612 in lieu of or in addition to the stop 2611 for the end face 2618 of the component 2613. Still another adjustment can be carried out by reducing the magnitude of the force denoted by the arrow 2616 and/or 2617 to thus ensure that a relatively small force will suffice to move the component 2612 (in either direction) relative to the component 2613 and/or vice versa.

The magnitude of the forces denoted by the arrows 2616, 2617 (and of the forces denoted in FIG. 25a by the arrows 2606, 2607) can be regulated by the control unit which includes the actor embodying or cooperating with the adjusting mechanism 2600 or 2610. For example, the magnitude of the forces denoted by the arrows 2606, 2607 or 2616, 2617 can be controlled in such a way that an adjustment of the components 2602, 2605 or 2612, 2613 relative to each other is possible only when the magnitudes of such forces are reduced to a preselected level.

For example, the component 2612 can receive torque from an actor and the component 2613 can be (directly or indirectly) coupled to a motion receiving element of a friction clutch or the like.

Figure 25C:
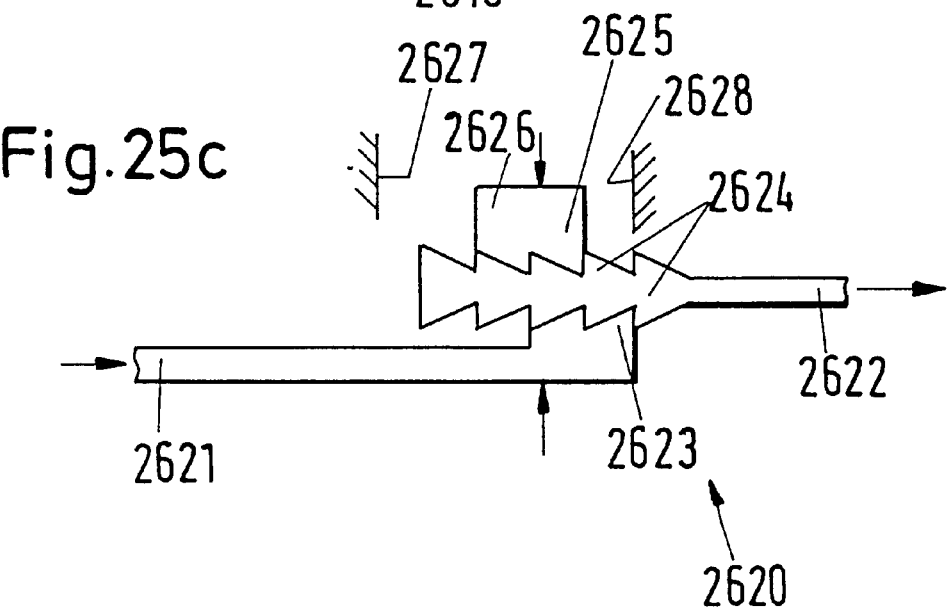
FIG. 25c is a similar view of a further adjusting mechanism.

FIG. 25c illustrates an adjusting mechanism 2620 wherein an adjustable or floating (mobile) abutment or stop 2626 can be moved between two fixed abutments or stops 2627 and 2628. This mechanism comprises a driven component 2621 which can receive motion (in a direction to the right, as viewed in FIG. 25c) from an actor (not shown) and has sawtooth shaped teeth 2623 engaging or adapted to engage with one of two mirror symmetrical sets of sawteeth 2624 on a component 2622 adapted to displace one or more motion receiving elements or parts of a friction clutch or another torque transmitting system (not shown in FIG. 25c). The mobile stop 2626 has sawteeth 2625 engaging the other set of sawteeth 2624 on the component 2622.

An advantage of the adjusting mechanism of FIG. 25c over the adjusting mechanism 2600 of FIG. 25a is that it is not necessary to invariably start an adjusting operation by moving one of the components (such as the component 2605 of FIG. 25a) against a fixed stop (i.e., to a predetermined starting position) prior to start of each adjusting operation. This means that the transmission of the actor which transmits motion to the component 2621 and the component 2621 (this component can constitute the output element of the actor) need not be moved through a normal adjustment distance plus a distance corresponding or proportional to maximum wear upon the friction linings or upon the friction linings and certain other parts of a friction clutch or another torque transmitting system.

When the mobile stop 2626 reaches the fixed stop 2627, it is possible to carry out an adjustment by causing the two sets of teeth 2624 to ride over the adjacent sawteeth 2623 and 2625. It is also possible to move the component 2621 to the left (as viewed in FIG. 25c) relative to the component 2622.

If the component 2622 is moved in a direction to the right so as to move the stop 2626 against the fixed stop 2628, the component 2622 is then ready to move to the right (relative to the arrested stop 2626), e.g., by the width of a sawtooth 2624 to thus increase the combined length of the components 2621, 2622. This means that the positions of the stop 2626 and the component 2622 relative to each other are different when the stop 2626 again engages the fixed stop 2627.

A two-stage adjustment can be carried out in a fully automatic manner if the wear upon certain parts of a clutch increases between successive movements of the stop 2626 against the stop 2627, i.e., if the combined thickness of the two sets of friction linings of the clutch disc decreases between successive movements of the mobile or floating stop 2626 against one of the fixed stops 2627, 2628. Such adjustment ensures that the operation of the clutch does not change in spite of the progressing wear upon the friction linings of its clutch disc. The adjustment of the positions of the stop 2626 and at least one of the components 2621, 2622 relative to each other (namely the component 2622) takes place when the stop 2626 abuts the stop 2628 and the component 2622 continues to move in a direction to the right against the opposition of the forces which tend to maintain the teeth 2625 and 2623 in engagement with the respective sets of teeth 2624. An adjustment of the distance to be covered in order to effect an adjustment of the clutch involves a movement of stop 2626 against the stop 6267 and a subsequent movement of the component 2621 relative to the arrested stop 2626 (in a direction to the left, as viewed in FIG. 25c).

If the adjusting mechanism is to operate in such a way that it is not necessary to effect a movement to an absolute end position whenever the adjusting mechanism is used between an actor and a friction clutch or another torque transmitting system, it is desirable to employ a stop which is engageable with and completely disengageable from a mobile component of the adjusting mechanism. In other words, the arrangement can be such that a stop is movable, in a controlled manner, into and from frictional or a more positive (such as form-locking) engagement with a reciprocable or otherwise movable component of the adjusting mechanism. The means for moving the stop to and from a position of engagement with one of the components can include an auxiliary actor employing, for example, a prime mover in the form of an electric motor or an electromagnet. Such an auxiliary actor is shown in FIG. 25d.

Figure 25D:
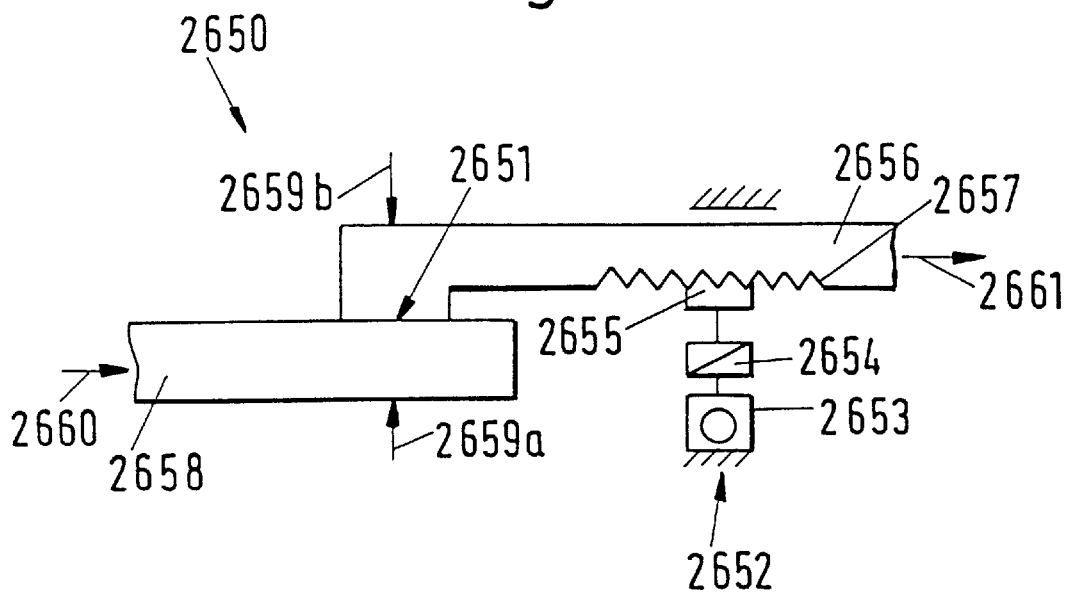
FIG. 25d is a similar view of another adjusting mechanism.

The adjusting mechanism 2650 of FIG. 25d comprises a slip clutch 2651 including a first component 2658 and a second component 2656 in frictional surface-to-surface contact with the component 2658 under the action of forces which are indicated by the arrows 2659a and 2659b. The component or element 2658 of the slip clutch 2651 can receive motion (note the arrow 2660) from the output element of a primary actor (not shown in FIG. 25d), and the component or element 2656 can transmit motion to a torque selecting element or part of a friction clutch in the direction of an arrow 2661.

The component or element 2656 has a row of teeth 2657 which can be engaged by the complementary teeth of a mobile stop 2655 constituting the output element of an auxiliary or secondary actor 2652 having a prime mover (e.g., an electric motor) 2653 and an optional transmission 2654 between the output member of the prime mover 2653 and the output element or stop 2655. The element 2655 can be used as a means for completely blocking all movements of the element or component 2656 in or counter to the direction of the arrow 2661, or as a brake whose teeth can permit the teeth 2657 to ride therealong while the element 2655 offers a selected resistance to such riding of the teeth 2657.

If the teeth of the element 2655 are maintained in a full (positive) engagement with the teeth 2657 of the element or component 2656, the latter cannot move in or counter to the direction which is indicated by the arrow 2661 but the element or component 2658 can move in or counter to the direction which is indicated by the arrow 2660 if the primary actor which controls the part 2658 is set to transmit a force which suffices to overcome the resistance of the forces (arrows 2659a, 2659b) which tend to hold the friction surfaces of the elements or components 2658, 2656 against movement relative to each other. Thus, the output element 2655 can be used to allow for an adjustment of the combined length of the elements or components 2656 and 2658. The primary actor is preferably designed to move the element or component 2658 in and counter to the direction which is indicated by the arrow 2660.

If the torque transmitting system which is operated by the control unit including the primary actor for the element or component 2658 is a push-type clutch, the adjustment can be carried out while the clutch is disengaged. The auxiliary actor 2652 moves the output element 2655 against the teeth 2657 of the element or component 2656 while the clutch is disengaged, and the adjustment is thereupon effected in the aforedescribed manner. If the clutch comprises a prestressed clutch spring and/or one or more resilient segments between the two sets of friction linings of the clutch disc, the adjustment can be effected when the part 2656 is not acted upon by one or more springs, i.e., when the forces applied by the springs of the clutch balance or neutralize each other or when a single spring of the clutch assumes an unstressed condition.

Referring now to FIGS. 25e and 25f, there is shown an actor 2700 which embodies a slip clutch constituting a modification of the slip clutch 2651 in the primary actor including the adjusting mechanism of FIG. 25d. The actor 2700 comprises a prime mover 2701 (e.g., an electric motor) having an output shaft 2701a serving to transmit torque to a first spur gear 2702 of a first stage of a multi-stage transmission of the actor 2700. The gear 2702 meshes with a second spur gear 2703 which is non-rotatably connected to or of one piece with a coaxial feed screw 2704 mating with a nut 2705. The nut 2705 is reciprocable in but cannot rotate relative to a housing 2707 of the actor 2700. It is also possible to connect the nut 2705 to, or to make the nut of one piece with, the gear 2703 and to non-rotatably but axially movably install the feed screw 2704 in the housing 2707.

The nut 2705 has a substantially cylindrical coaxial extension 2705a which extends into a bore or hole 2708a of a sleeve 2708 in such a way that the parts 2705a, 2708 are in indirect frictional engagement with each other, namely by way of a cylindrical insert 2709 between the external surface of the extension 2705a and the internal surface of the sleeve 2708. The friction coefficient and the elastic properties of the insert 2709 are selected with a view to establish a predetermined connection between the parts 2705 and 2708. It can be said that the extension 2705a, the sleeve 2708 and the insert 2709 constitute a slip clutch between the nut 2705 and an elongated output element 2720 here shown as a cylindrical extension of the sleeve 2708. This slip clutch is capable of transmitting motion between the reciprocable nut 2705 and the output element 2720. A suitable antifriction bearing 2715 is interposed between the sleeve 2708 and the housing 2707 to center the sleeve around the extension 2705a. Another bearing 2706 is installed between a smaller-diameter internal portion of the housing 2707 and the nut 2705.

When the electronic components of the control unit including the actor 2700 start the motor 2701, the output shaft 2701a rotates the gear 2702 which drives the gear 2703. The latter rotates the feed screw 2704 which causes the nut 2705, and therefore also the output element 2720, to move in the direction of the common axis of the feed screw 2704, nut 2705 and sleeve 2708. The means for transmitting motion from the nut 2705 to the output element 2720 comprises the aforementioned slip clutch including the extension 2705a, the extension of the sleeve 2708 around the extension 2705a, and the insert 2709. The output element 2720 is shown as being, but need not be, of one piece with the sleeve 2708.

The housing 2707 further contains a lever 2712 which is pivotable back and forth about the axis of the output element 2720 by a drive means 2711, e.g., an electric motor having a rotary output member connected to or of one piece with a feed screw 2711a mating with a nut 2711b which is articulately connected to the lever 2712 by a pin 2721. That end portion of the lever 2712 which surrounds the output element 2720 also surrounds a set of rolling elements 2713 in the form of balls, rollers or the like. The internal surface of the ring-shaped end portion of the lever 2712 is provided with threads or flats or ramps which act upon the rolling elements 2713 in response to pivoting of the lever to thus change the angular position of the output element 2720. Internal threads of the lever can be said to act as wedges and can prevent axial movements of the element 2720 because the lever is held against movement in the axial direction of the extension (output element) 2720 of the sleeve 2708. The rolling elements 2713 are recessed into an adjacent tubular portion of the housing 2707. It will be seen that the internal surface of the ring-shaped end portion of the lever 2712 and the rolling elements 2713 can establish a frictional engagement between the housing 2707 and the sleeve 2708. Such (indirect) frictional engagement can be established or terminated in response to starting of the motor 2711 in order to rotate the feed screw 2711a in a proper direction, i.e., to cause the nut 2711b to pivot the lever 2712 in a clockwise or in a counterclockwise direction.

When the motor 2711 has caused the lever 2712 to urge the rolling elements 2713 against the output element 2720 with a force which suffices to prevent an axial movement of the element 2720, the axial position of the nut 2705 and the output element 2720 relative to each other can be adjusted by starting the motor 2701; the extension 2705a of the nut 2705 then moves axially relative to the arrested sleeve 2708 and element 2720 (and relative to or with the insert 2709) until the combined axial length of the nut 2705 and the sleeve 2708 is increased or reduced to a desired value. The clamping action of the rolling elements 2713 upon the output element 2720 is thereupon relieved by causing the lever 2712 to pivot in the appropriate direction so that the slip clutch including the insert 2709 is again enabled to move the nut 2705 and the output element 2720 as a unit in the axial direction of the sleeve 2708, nut 2705 and feed screw 2704.

Figure 25G:
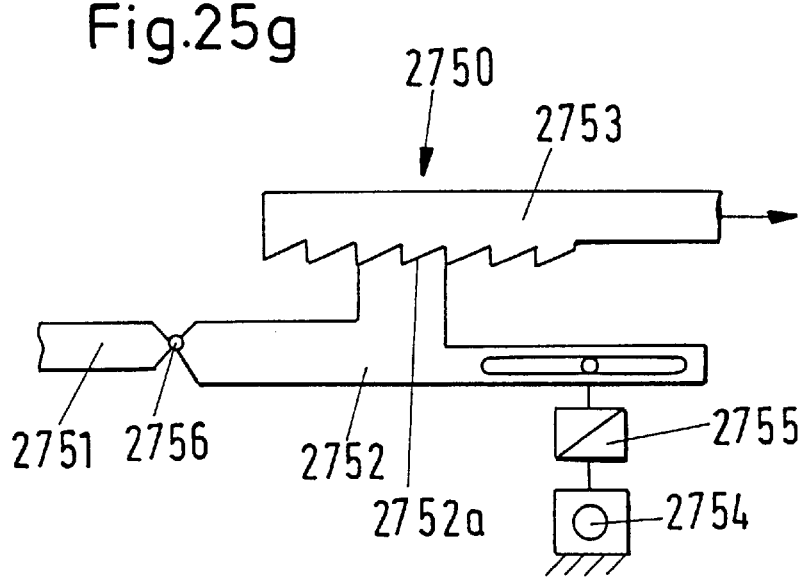
FIG. 25g is a schematic elevational view of an adjusting mechanism constituting a modification of the mechanisms shown in FIGS. 25a to 25d.

FIG. 25g shows a further adjusting mechanism 2750 between a component or element 2751 which is controlled by a primary actor (not shown) and a toothed component or element 2753 which can shift, pivot or otherwise displace a mobile torque selecting element (e.g., a bearing or one or more levers) of a friction clutch (not shown). The component or element 2751 is articulately connected with an intermediate component or element 2752 having a set of teeth 2752a engageable with or disengageable from the teeth of the component or element 2753 by appropriate operation of an auxiliary or secondary actor having a prime mover (e.g., a reversible electric motor) 2754 and an optional transmission 2755 which is coupled with the component 2752 in such a manner that the latter can move with or relative to the toothed component or element 2753. Thus, when the motor 2754 is actuated to maintain the teeth 2752a in engagement with the teeth of the element or component 2753, the parts 2751, 2752 and 2753 can move as a unit in a direction to the left or to the right, as viewed in FIG. 25g. On the other hand, if the motor 2754 is actuated to disengage the teeth 2752a from the teeth of the element or component 2753 (i.e., to pivot the component or element 2752 at 2756 relative to the element or component 2751), the parts 2751, 2752 can move relative to the part 2753 and/or vice versa. The position of the part 2753 relative to the parts 2751, 2752 (or vice versa) is adjustable when the teeth 2752a are disengaged from the adjacent teeth of the element or component 2753.

The illustrated connection between the auxiliary actor 2754, 2755 and the element or component 2752 includes an elongated slot in the part 2752 and a follower which extends into such slot and is mounted on the output member of the transmsision 2755.

FIGS. 25h and 25j illustrate the relevant details of an actor 2800 which constitutes a modification of the actor 2700 of FIGS. 25e and 25f. The actor 2800 comprises a prime mover 2801 (e.g., an electric motor) having an output shaft which drives a first spur gear 2802. The gear 2802 mates with a second gear 2803 which is connected to or of one piece with an elongated feed screw 2804 in mesh with a nut 2805 which is movable axially in but cannot rotate relative to the housing 2807. The nut 2805 is centered in an internal wall of the housing 2807 by a bearing 2806 which allows the nut to move axially in response to rotation of the feed screw 2804 with the spur gear 2803. An energy storing element 2816 is provided to react against an internal shoulder of the housing 2807 and to bias a sleeve 2808 in a direction to the left, as viewed in FIG. 25h. A similar energy storing element is provided in the actor 2700 of FIGS. 25e and 25f.

The second stage of the transmission between the motor 2801 and the output element 2808a (extension of the sleeve 2808) of the actor 2801 can be modified by making the nut 2805 of one piece with (or connecting this nut to) the gear 2803 and by mounting the feed screw 2804 in such a way that it is compelled to move axially in response to rotation of the nut.

The portion 2805a of the nut 2805 is frictionally coupled to the sleeve 2808 in a manner not identical with but analogous to that described with reference to the cooperation between the parts 2705a, 2720 and 2709 in the actor 2700 of FIGS. 25e and 25f. Thus, and as can be best seen in FIG. 25j, the portion 2805a of the nut 2805 is normally engaged by two clamping members 2809 and 2810. The member 2809 is biased by a leaf spring 2814 which is installed in the housing 2807 and causes the member 2809 to urge the portion 2805a against the member 2810 whereby the sleeve 2808 and its output element 2808a are compelled to move with the nut 2805 in the axial direction of the feed screw 2804 when the motor 2801 rotates the gear 2802. The housing 2807 contains a bearing 2815 for the sleeve 2808; such bearing enables the sleeve to move in the axial direction of the feed screw 2804 when the latter is rotated by the motor 2801.

The means for disengaging the portion 2805a of the nut 2805 from the sleeve 2808 and its output element 2808a comprises an auxiliary or secondary actor including a prime mover 2811 (e.g., an electric motor). The output shaft of the motor 2811 includes or carries a feed screw 2811a mating with a nut 2811b at the free end of a one-armed lever 2813 pivotably mounted in the housing 2807. The lever 2813 can displace a roller 2812 which is carried by the clamping member 2809. When the motor 2811 pivots the lever 2813 in a counterclockwise direction, as viewed in FIG. 25j, the roller 2812 moves the clamping member 2809 radially of and away from the portion 2805a of the nut 2805 and from the clamping member 2810 so that the frictional connection between the nut 2805 and the sleeve 2808 is no longer effective. If the motor 2801 is thereupon actuated to rotate the feed screw 2804, the nut 2805 is free to move axially relative to the sleeve 2808 and its output element 2808a. The leaf spring 2814 is caused to store energy (or to store additional energy) when the lever 2813 and the roller 2812 cause the clamping member 2809 to move radially of the nut portion 2805a and away from the clamping member 2810, i.e., such spring can reestablish the frictional engagement between the clamping members 2809, 2810 and the portion 2805a of the nut 2805 as soon as the motor 2811 returns the lever 2813 to a position in which the spring 2814 is free to dissipate at least some of the energy.

A disengagement of the nut 2805 and the sleeve 2808 can take place in any desired angular and/or axial position of either of these parts. When the slip clutch including the members 2809, 2810 and the leaf spring 2814 is ineffective, the axial position of the nut 2805 relative to the seeve 2808 and the output element 2808a can be changed by the motor 2801 and/or by the energy storing element 2816 and/or by moving the output element 2808a axially of the nut 2805.

An adjustment of the axial positions of the sleeve 2808 and the nut 2805 relative to each other can be carried out for a number of purposes, for example, to compensate for wear upon the friction linings in the clutch which is connected with the output element 2808a.

The adjusting mechanism 2900 of FIG. 26a comprises a first element or component or link 2901 which can receive motion from the prime mover of a primary actor (not shown in FIG. 26a), a second element or component or link 2903 one end portion of which is articulately connected with one end portion of the component 2901 (hereinafter called link) by a pivot 2902 or another suitable joint, and a third element or component 2905 which is articulately connected to an intermediate portion of the component 2903 (hereinafter called link) by a pivot 2906 or another suitable joint. The component 2905 (hereinafter called link) can transmit motion to a clutch adjusting part such as a bearing, a system or levers or the like. The other end portion of the link 2903 can receive motion from a prime mover (e.g., an electric motor) 2907 of an auxiliary or secondary actor which can further include a suitable transmission 2908. The output member of the transmission 2908 is articulately connected with the other end portion of the link 2903 by a pivot 2904 or another suitable joint.

The link 2901 can constitute the output element of the primary actor and can receive motion from a single-stage or multi-stage or other suitable (such as cascade-type) transmission of the primary actor. It is also possible to install the link 2901 between the prime mover and the transmission (such as a cascade-type transmission) of the primary actor; the link 2901 then serves as a connector between the output member of the prime mover and the input member of the transmission of the primary actor.

Figure 26A:
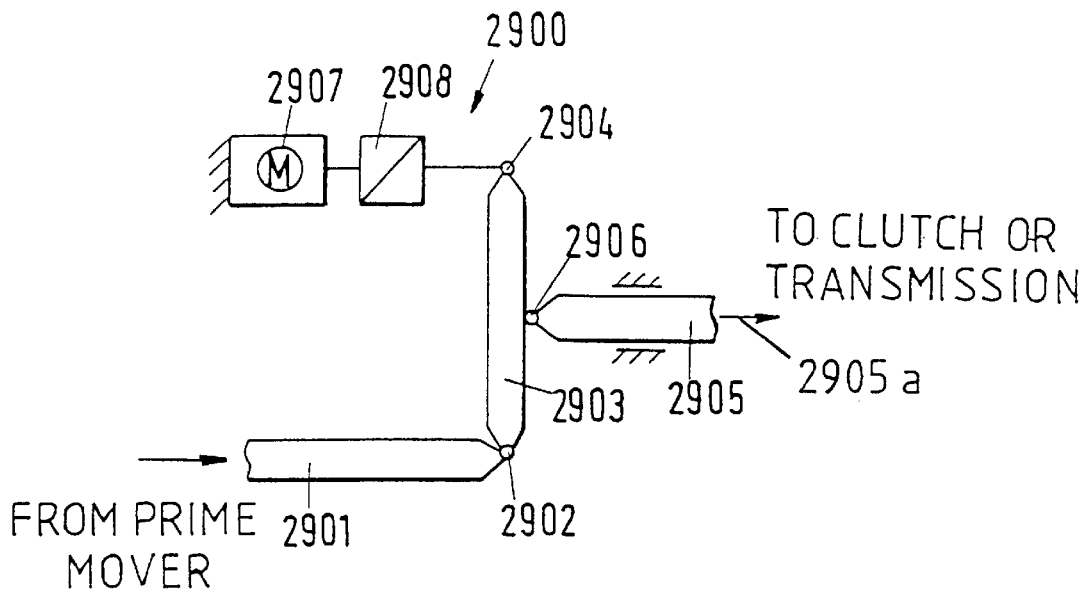
FIG. 26a is a fragmentary schematic elevational view of another adjusting mechanism between an actor and a mobile part of a torque transmitting system and/or transmission system in the power train of a motor vehicle.

When the motor 2907 of the auxiliary actor is started to move the pivot 2904 in a direction to the right or to the left, as viewed in FIG. 26a, this results in a change of the inclination of the link 2903 and (by way of the pivot 2906) in a change of the position of the link 2905 (as seen in or counter to the direction indicated by the arrow 2905a). Such adjustment of the link 2905 can compensate for wear upon one or more parts of the clutch which is actuated by the link 2905 (normally via the links 2901 and 2903.

The motor 2907 of the auxiliary actor can be mounted in or on the housing of the primary actor which transmits motion to the link 2901. The motor 2907 is preferably designed to move the pivot 2904 toward or away from the transmission 2908; this renders it possible to adjust the link 2905 in and counter to the direction which is indicated by the arrow 2905a. However, it is also possible to employ two simple motors one (such as 2907) of which serves to pull (when needed) the pivot 2904 toward and the other of which serves to pull the pivot 2904 away from the transmission 2908 (when the motor 2907 is idle).

Figure 26B:
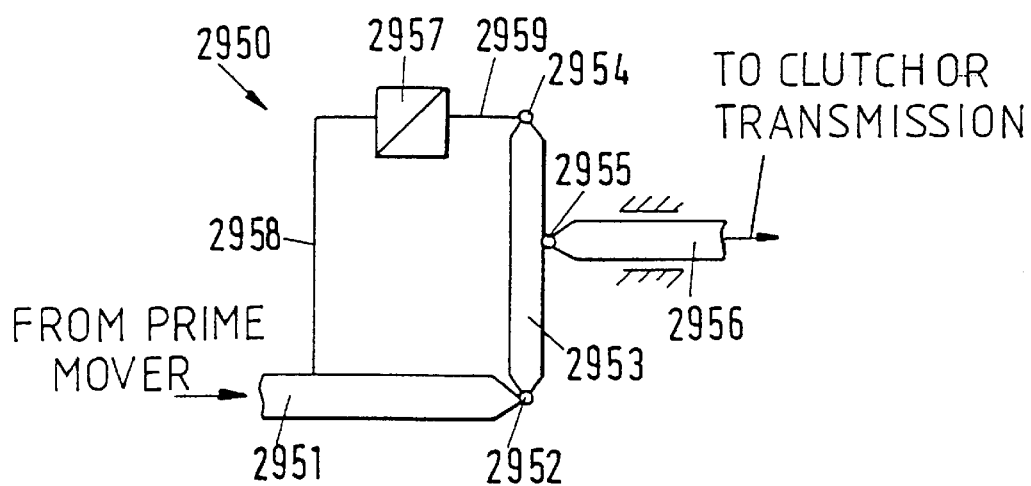

FIG. 26b illustrates an adjusting mechanism 2950 which is a modified version of the mechanism 2900 of FIG. 26a. The link 2951 normally receives motion from the prime mover of a primary actor (not shown) and is coupled to a link 2953 by a pivot 2952. An intermediate portion of the link 2953 is coupled to a link 2956 by a pivot 2955, and the link 2956 serves to adjust the position of a mobile torque selecting part (not shown in FIG. 26b). A pivot 2954 at the other end of the link 2903 couples this link to the output member 2959 of a transmission 2957 forming part of an auxiliary or secondary actor which serves to adjust the position of the link 2956, e.g., in order to compensate for wear upon one or more parts of a friction clutch. The input member 2958 of the transmission 2957 receives motion from the link 2951, i.e., from the motor of the primary actor.

The link 2951 can but need not perform mere reciprocatory movements; for example, the motor or the transmission (if any) of the primary actor can cause the link 2951 to perform a composite (such as partly linear and partly pivotal) movement in order to change the position of the link 2953 and to change (when necessary) the position of the input member 2958 of the transmission 2957 to thus adjust the position of the link 2956.

The transmission 2957 can be a single-stage or a multistage transmission or another suitable (such as a cascade-type) transmission.

It is also possible to use the transmission 2957 of FIG. 26b as a part of the primary actor; the part 2958 then constitutes an output member which transmits motion to the link 2951. The output member 2959 is preferably designed to pivot the link 2953 in a clockwise or in a counterclockwise direction.

The heretofore described adjusting mechanisms can be replaced with suitable electronic adjusting means which controls the movements of one or more members or components in the transmission of the primary actor. For example, if the primary actor is designed to move its output element(s) through distances which are required to effect normal adjustments of a clutch (i.e., to select a desired torque to be transmitted by the clutch) plus the distances which are required to compensate for wear, play, tolerances, thermally induced expansion or contraction and/or others, the position(s) of the torque selecting part(s) of the clutch can be adjusted electronically as a result of an appropriate resetting or repositioning of the aforementioned member(s) or component(s) of the transmission forming part of the primary actor. It is often sufficient to employ a simple transmission whose ratio is constant. The utilization of a relatively simple transmission merely necessitates the provision of a slightly larger housing for the primary actor and the resort to a somewhat longer path for movements of the output element so that the latter can carry out the normal adjustments which are needed to select a given torque to be transmitted by a clutch as well as those movements which are necessary to compensate for wear, for thermally induced dimensonal changes, tolerances and others.

For example, a compensation for wear upon the friction linings forming part of a clutch disc or clutch plate in a friction clutch can be carried out while the clutch is engaged; the pressure plate and/or the clutch spring of such clutch is thereupon shifted and/or otherwise adjusted to compensate for the wear. A clutch which can be adjusted in the above outlined manner exhibits several advantages, such as:

(1) If the extent to which the friction linings undergo wear (i.e., the maximum permissible reduction of the thickness of the friction linings) equals or approximates the distance adapted to be covered by the pressure plate, the distance which is required to be covered by the clutch acuating means can be reduced in half.

(2) The output element of the actor of the control unit for the clutch must cover relatively short distances because it is not absolutely necessary to make additional provisions for movements to compensate for wear. This renders it possible to employ a compact actor.

(3) It is possible (at least in many instances) to install all adjusting elements within the clutch. A possible exception is that element which is utilized to effect an initial adjustment or setting of the clutch.

(4) It is possible to reduce or to eliminate the undesirable influence of centrifugal force and to avoid changes of resetting or restoring forces upon disengagement from the friction linings, particularly when compared with those clutches which are not equipped with adjusting means for the compensation of wear upon the friction linings or upon the friction linings and certain other parts of the clutch.

If the compensation for wear is to take place in a push-type clutch, it is possible to employ a clutch spring having a non-linear characteristic curve in lieu of a clutch spring having a linear characteristic curve and/or in lieu of a compensating spring having a non-linear characteristic curve, and/or in lieu of a transmission having a constant transmission ratio.

As already described above, an auxiliary actor which serves to effect an adjustment of the connection between a primary actor and the torque selecting part(s) of a clutch or another torque transmitting system can be installed in the primary actor or in the power train between the prime mover of the primary actor and the motion receiving part(s) of a clutch. In any event, the auxiliary actor can be installed in or on the housing of the primary actor or in the frame of the motor vehicle, for example, close to the housing of the primary actor.

The information which is needed to operate an auxiliary actor can be furnished by the signals from various sensors and/or by the electronics of the control unit including the primary actor and/or by the electronic circuitry of the engine, of the transmission system and/or the torque transmitting system, and/or by data stored in the memory of the control unit. For example, a sensor can transmit signals denoting the exact engagement point of a clutch, namely that position of the pressure plate in a friction clutch of the type shown, for example, in FIG. 2 in which the clutch disc begins to rotate in response to rotation of the flywheel. Another possible parameter which can be monitored in order to furnish information which is or which might be needed to operate an auxiliary actor is the progress of the characteristic curve of the setting torque, the actuating force based on the current consumption by the motor of the primary actor, the duration of adjustment at a given current and/or voltage, as well as for example the differences between the forward and rearward adjustments at a given progress of voltage and/or amperage.

In order to ensure a disturbance-free and comfortable functioning of an automated clutch or another torque transmitting system whose operation is regulated by a control unit embodying the present invention, it can be of advantage to know the conditions and/or the timing and the extent of engagement and disengagement of the clutch. This is particularly important in the event of a planned modulation of torque which can be transmitted by the clutch. For example, if one employs a distance monitoring sensor which is installed, e.g., in the housing of a primary actor and serves to monitor the exact engagement point of a clutch or another torque transmitting system, it is of advantage to know the exact length of the motion transmitting path between the actor and such system. If the path is established by a fluid-operated arrangement (reference may be had to the arrangement 9–11 in the vehicle of FIG. 1a), a compensation for volumetric changes or for changes of the length of a column of hydraulic fluid (such as in the conduit 9) can be effected by resorting to the aforementioned sniffing opening or orifice or bore or nozzle between the fluid-containing conduit and a tank or another suitable source of pressurized fluid. Such compensation might be advisable or necessary if the volume of the confined fluid changes in response to heating or cooling. The sniffing operation can be carried out at regular intervals or whenever necessary to compensate for certain changes in volume due to leakage and/or in response to changes of temperature.

Still further, it is possible to carry out an adaption of the engagement point, for example, in a manner as disclosed in the commonly owned copending U.S. patent application Ser. No. 08/769,500. Such information, too, can be utilized to obtain data pertaining to the exact length of the path between the primary actor of a control unit and the motion receiving part or parts (e.g., a bearing or a set of levers) in a clutch or another torque transmitting system and/or in a transmission system. For example, an adaption of the engagement point can involve a shift to a condition in which the magnitude of transmitted torque departs from that transmitted at the actual engagement point by one or more Nm.

An adjustment can be said to involve a planned change of the length of the path between the primary actor and the motion receiving part(s) of a clutch. This, in turn, involves the establishment of a predetermined relationship between the extent of movement of the mobile part or parts of a clutch, the position of the primary actor, and the condition of disengagement of the clutch. An adjustment of the just outlined nature reduces the likelihood of the development of undesirable disturbances or malfunctions, especially if the adjustment is repeated at regular or irregular (necessary) intervals. For example, an adjustment will be necessary when the control unit is unable to accurately ascertain the changes of certain parameters solely on the basis of signals from the relevant sensor or sensors and one can assume, or even take for granted, that the relationship between the setting of the output element of the primary actor and that position or those positions of mobile part or parts which denote a particular condition (e.g., disengagement) of the clutch has or have changed beyond an acceptable value, such as beyond a range of acceptable tolerances. An adjustment under such circumstances can be interpreted as a precautionary or preventive undertaking which is to be carried out from time to time, preferably at regular intervals.

Furthermore, an adjustment might be advisable or necessary when the correspondence between an energy storing element, such as a compensating spring or a non-linear torque transmitting function by a transmission in the actor and the condition of disengagement (i.e., the progress of the clutch regulating force) has been altered to an unacceptable extent. Still further, an adjustment might be advisable when the distances which can be covered by the output element of the primary actor are limited so that the available range of distances adapted to be covered by such output element might not suffice to select any desired condition (of engagement, disengagement and partial engagement) of a clutch or another torque transmitting system and/or the ratio of a transmission system.

A further disturbance which is likely to develop is that caused by the changes of the temperature of a distance monitoring sensor. A signal which is transmitted by a sensor whose temperature greatly departs from an anticipated range of normal temperatures might be misinterpreted by the control unit in such a way that an adjustment of the effective length of the path from the actor to the motion receiving part(s) of a torque transmitting system and/or a transmission system will be carried out when such adjustment is unnecessary or plain undesirable, namely because no change of the length of such path has taken place subsequent to the preceding adjustment. Adjustments which are carried out at regular intervals and to an extent which is actually necessary ensure that changes of the temperature of a distance monitoring sensor will not initiate any unwanted or unnecessary adjustments.

Still further, a shortening or lengthening of the path between the primary actor and one or more mobile parts (e.g., in a clutch) is likely to take place in response to temperature changes in the surrounding atmosphere. Such temperature changes are likely to result in changes of the length of the aforementioned path as well as in certain other changes which should be compensated or accounted for. One such other change is the change of stiffness or rigidity of certain parts, e.g., of energy storing and/or other resilient elements.

Still another factor which is likely to warrant adjustments is a change of friction between cooperating (contacting) parts in the path between the primary actor and the mobile part(s) of a clutch or the like. For example, a locus of potential changes of friction is that between a clutch torque selecting lever (e.g., the part 55 in FIG. 2) and the output element (56 in FIG. 2) of the primary actor (57 in FIG. 2). Analogously, there might develop a change of friction between the bearing 54 and the adjacent radially inner end portions of the levers 53 in the clutch 3' of FIG. 2.

Still further, a factor which might warrant an adjustment is a change of the magnitude of centrifugal force and/or a change of the position of one or more parts as a result of changes of the magnitude of the centrifugal force.

In addition to the wear upon the friction linings of a clutch plate or clutch disc as a result of repeated engagement and disengagement of a friction clutch, another factor which might warrant an adjustment is a change of the configuration (the so-called cupping) of the friction surface of the pressure plate. Such changes of the configuration of the friction surface of the pressure plate are normally attributable to temperature changes but can also be caused, at least in part, by repeated engagement with and disengagement from the adjacent set of friction linings which are in the process of undergoing a progressing wear. All such adjustments can be initiated by the control unit in response to the reception of appropriate signals or automatically at selected intervals. The extent of successive adjustments can be the same or it can vary as a function of intensities and/or other characteristics of the relevant signals. Furthermore, each individual adjustment can be carried out in a single step or in a series of two or more shorter steps or stages until the completion of a desired or required overall adjustment. Successive stages of a multi-step adjustment can be carried out at regular or irregular intervals, and successive steps or stages of a composite adjustment can be identical or different.

Still further, and as already fully explained hereinbefore (e.g., with reference to FIG. 26a), the adjustment need not be carried out by the primary actor (i.e., by the actor of the control unit for a torque transmitting system and/or a transmission system) but rather by a secondary or auxiliary actor while the primary actor is idle. The actual adjustment (in the idle condition of the primary actor) can be automatic (e.g., under the bias of one or more energy storing elements), and the normal connection between the primary actor and the motion receiving part(s) of a clutch or the like can be reestablished (particularly automatically, e.g., after the elapse of a given interval of time) when the automatic adjustment is completed.

An idling of the primary actor can enable one or more energy storing elements and/or the resilient element or elements of a clutch to establish or reestablish a state of equilibrium of forces, and such state of equilibrium is thereupon maintained as a result of the reestablishment of the functionality or operability of the primary actor. When the state of equilibrium of forces is destroyed (e.g., as a result of additional wear upon the friction linings or upon the friction linings and other parts), the control unit initiates a further adjustment, and so forth.

Figure 27A:
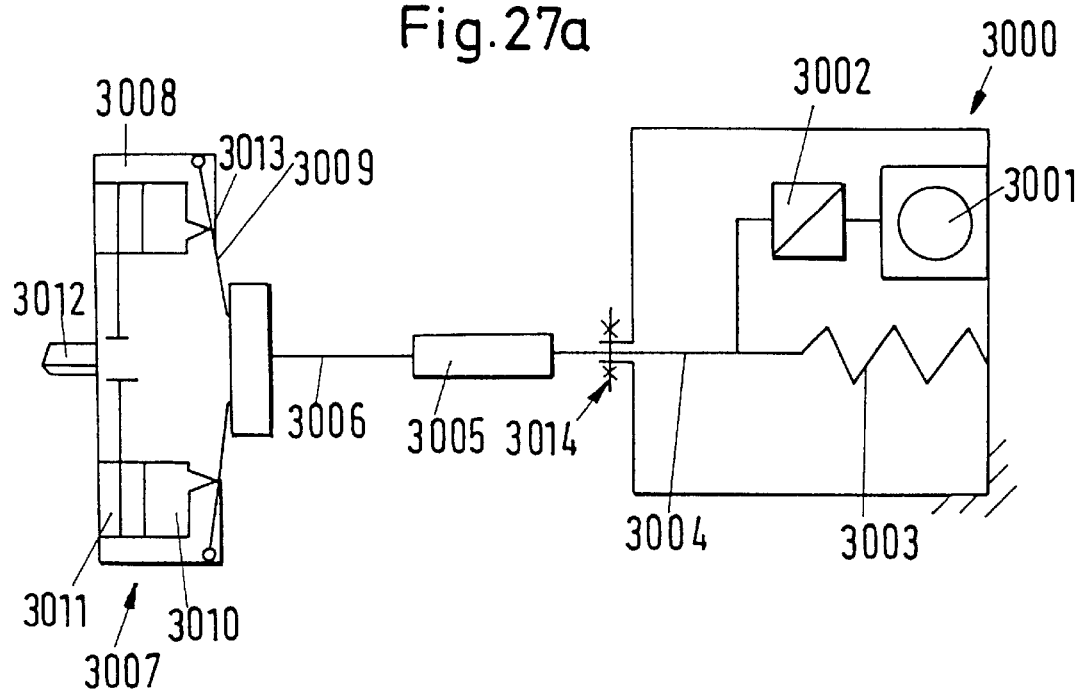
FIG. 27a is a schematic elevational view similar to that of FIG. 24a or 24b but showing a different connection between the actor and a friction clutch.

FIG. 27a illustrates a combination of a primary actor 3000 and a friction clutch 3007. The actor 3000 comprises a prime mover 3001 (such as an electric motor), a transmission 3002, an output element 3004 and an energy storing element 3003 (the latter can comprise one or more coil springs or the like). The output element 3004 can be temporarily fixed to the housing of the actor 3000 by suitable locking or arresting means 3014, e.g., a bolt, a pin, a cotter pin or the like.

The output element 3004 is releasably coupled to the motion receiving member or part 3006 of the clutch 3007 by a suitable connector 3005, and the motion receiving member can act upon a prestressed diaphragm spring 3009 of the clutch by way of a suitable bearing or the like. The diaphragm spring 3009 can be replaced with another suitable clutch spring or with a set of levers which can be pivoted by the member 3006 to effect a partial or full engagement of the clutch 3007. The latter further comprises a housing 3008 which can receive torque from the output member 3012 (e.g., a crankshaft or a camshaft) of a driving arrangement (such as the engine of a motor vehicle), a pressure plate 3010 which can be moved axially by the diaphragm spring 3009, and a clutch disc or clutch plate 3011 with two sets of friction linings one of which can be engaged by the pressure plate 3010 and the other of which can engage the friction surface of a flywheel which rotates with the housing 3008 and output member 3012. A stop 3013 is provided to limit the extent of pivoting of the diaphragm spring 3009 in a direction to permit the pressure plate 3010 to move axially and away from the clutch disc 3011, i.e., to permit a full disengagement of the clutch 3007. The stop 3013 can form part of an adjusting device which is designed to automatically compensate for wear at least upon the friction linings of the clutch disc 3011. Reference may be had to the commonly owned U.S. Pat. No. 5,409,091.

The actor 3000 is or can be fixedly secured to the frame or chassis of the motor vehicle which employs the friction clutch 3007. The clutch 3007 is assumed to be a push-type clutch, i.e., the mobile member 3006 must push the radially inner portions of the radially inwardly extending tongues or prongs of the diaphragm spring 3009 so that the latter can shift the pressure plate 3010 toward the friction linings of the clutch disc 3011. However, the actor 3000 can be utilized with equal or similar advantage in conjunction with a pull-type clutch wherein the radially inner portions of the prongs of the diaphragm spring must be pulled axially of and away from the output shaft 3012 in order to engage the clutch.

When it is rotated by the housing 3008 and the pressure plate 3010 (i.e., when the clutch 3007 is at least partially engaged), the clutch disc 3011 can transmit torque to a transmission system, e.g., the transmission system 4 in the motor vehicle 1 of FIG. 1a. The adjusting means which can be installed at and can include the stop 3013 can be designed to compensate, by itself, for the wear upon all relevant parts (such the friction linings of the clutch disc 3011, the friction surface of the pressure plate 3010, the friction surface of the aforementioned flywheel and the diaphragm spring 3009) of the clutch 3007 or to compensate for some of such wear. As a rule, or at least in many instances, it is preferred to provide adjusting means which can compensate for all of the wear and is designed to be accommodated, in its entirety, within the housing 3008 of the friction clutch.

If the transmission 3002 of the actor 3000 is not self-locking or the actor 3000 is not provided with any internal means for locking the output member of the transmission 3002 in a given position, the structure of FIG. 27a is provided with the aforementioned locking means 3014 which can maintain the output element 3004 (and hence the output member of the transmission 3002) in a preselected position relative to the housing of the actor 3000. The arrangement is preferably such that the output member of the transmission 3002 can be locked relative to the housing of the actor 3000 in a rear end (fully retracted) position.

When the motion receiving member 3006 of the friction clutch 3007 and the output element 3004 of the actor 3000 are to be initially coupled to each other (e.g., in the plant where the clutch and the actor are produced or in an automobile assembly plant), the clutch is caused to assume a fully disengaged condition. In the next step, the coupling or connecting means 3005 is actuated to connect the output element 3004 with the member 3006. At such time, the locking means 3014 is operative, i.e., the output element 3004 is held against movement (e.g., under the bias of the energy storing element 3003) relative to the housing of the actor 3000. The next step involves a deactivation or removal of the locking means 3014 so that the shifting (if any) of the parts in the housing of the actor takes place while the clutch 3007 is (at least initially) maintained in a predetermined condition (such as the fully disengaged condition). However, it is equally possible to disengage or remove the locking means 3014 upon the establishment of a connection (at 3005) between the output element 3004 and the member 3006 while the clutch 3007 is in the fully engaged condition or in a predetermined or preselected intermediate (partially engaged) condition.

Figure 27B:
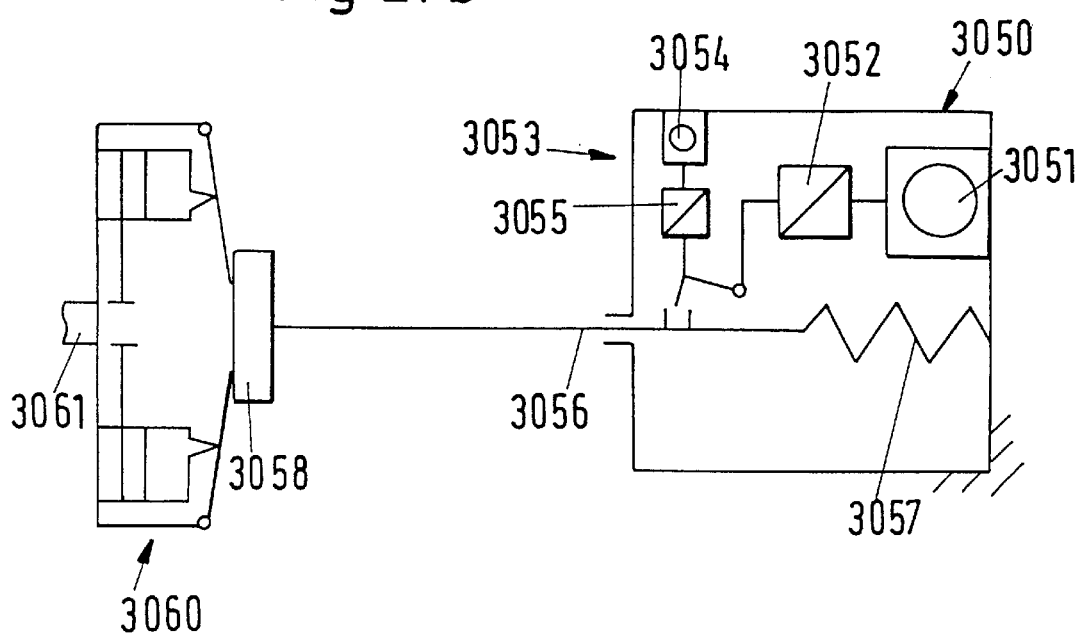
FIG. 27b is a view similar to that of FIG. 27a but showing a different actor wherein the output member of the transmission can be detached from the output element of the actor.

FIG. 27b shows a combination of a primary actor 3050 and a torque transmitting system 3060 (e.g., a friction clutch analogous to or identical with the clutch 3007 of FIG. 27a)

wherein the actor 3050 comprises a prime mover 3051, a transmission 3052, an energy storing element 3057 and an output element 3056. The manually operable locking means 3014 of FIG. 27*a* is replaced with a motorized locking means in the form of an auxiliary actor 3053 (such as a relay having a motor 3054 and a transmission 3055) which can repeatedly connect the output member of the transmission 3052 with and disconnect such output member from the output element 3056 of the primary actor 3050. The output element 3056 is shown as being directly connected with a mobile part (clutch engaging/disengaging bearing) 3058 of the clutch 3060. The flywheel and the housing of this clutch can receive torque from the output member 3061 of a combustion engine in a motor vehicle.

The clutch 3060 can be a push-type or a pull-type friction clutch. When the auxiliary actor 3053 is operative to disengage the output member of the transmission 3052 from the output element 3056, the energy storing element 3057 is caused to assume a state of equilibrium with the resilient means of the clutch 3060. The auxiliary actor 3053 can disengage the transmission 3052 from the output element 3056 while the clutch 3060 is fully engaged, fully disengaged or engaged to a predetermined extent. The just described establishment of an equilibrium between the bias of the energy storing element 3057 and the bias of the resilient means in the clutch 3060 can be carried out during initial assembly of the actor 3050 and the clutch 3060 with each other or during installation of the structure of FIG. 27*b* in a motor vehicle. The output member of the transmission 3052 is or can be maintained in a predetermined position when the auxiliary actor or relay 3053 is actuated in a sense to establish a connection between the output member of the transmission 3052 and the output element 3056.

If desired or necessary, the bias of the energy storing element 3057 can be altered to assume a predetermined value subsequent to the reestablishment (or initial establishment) of a mechanical connection between the output member of the transmission 3052 and the output element 3056. The construction of the means for carrying out such adjustment of the bias of the energy storing element 3057 forms no part of the present invention. This adjustment is preferably carried out while the auxiliary relay 3053 is operative to hold the output element 3056 against longitudinal movement and the prime mover 3051 of the primary actor 3050 is idle.

Figure 27C:
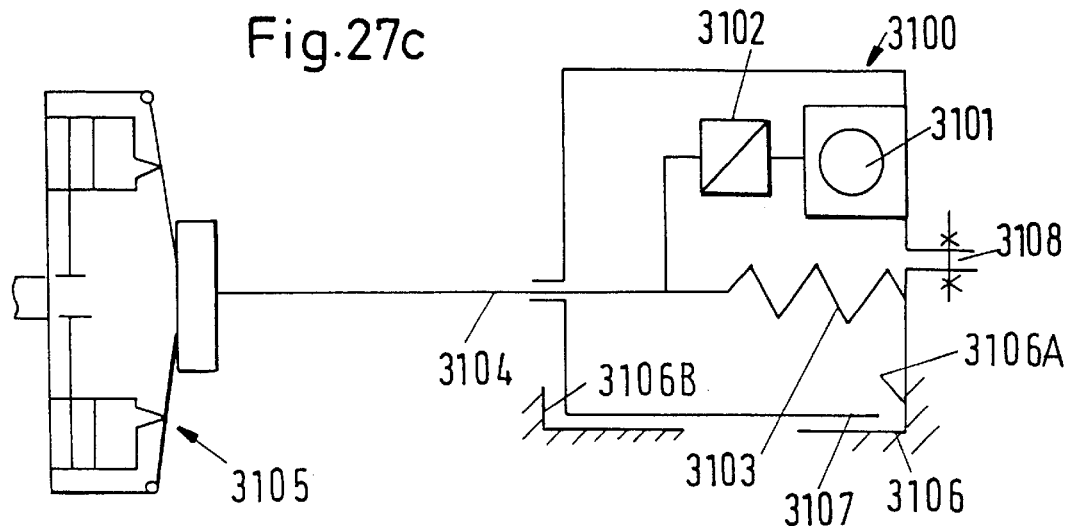
FIG. 27c is a view similar to that of FIG. 27a or 27b and shows an actor which is fixedly secured to the frame of a motor vehicle.

FIG. 27*c* shows a primary actor 3100 which has a housing 3107 containing a prime mover 3101 (e.g., an electric motor), a transmission 3102, an energy storing element 3103 and a portion of a reciprocable output element 3104 connected or connectable with a bearing of a torque transmitting system 3105, e.g., a friction clutch with a diaphragm spring adapted to be pivoted relative to the clutch housing by the aforementioned bearing to effect an engagement or a disengagement of the clutch.

The housing 3107 is adjustable relative to the frame or chassis 3106 of the motor vehicle and can be fixed in a selected position relative to the frame by a locking device 3108. Such adjustability of the housing 3107 can serve to compensate for improper initial mounting of the actor 3100 in the motor vehicle and/or to properly select the bias of the energy storing element 3103. An equilibrium between the bias of the energy storing element 3103 and the bias of the resilient means in the clutch 3105 (in a selected condition of engagement of the clutch) can be established by loosennig the locking device 3108 and shifting the housing 3107 relative to the frame 3106 or by permitting that such shifting takes place under the bias of the energy storing element 3103 and/or the bias of the resilient means in the clutch. The locking device 3108 is thereupon actuated to fix the housing 3107 in the thus selected position relative to the frame 3106 e.g., relative to a plastic wall of such frame. The right-hand portion of the wall forming the frame 3106 has a (left-hand) side 3106A confronting the driving arrangement (such as the engine) in the power train of the vehicle. Alternatively, or in addition to the side 3106A, a wall of the frame 3106 can have a side 3106B which confronts the passenger compartment of the vehicle and which, too, is or can be adjacent the actor 3100.

The clutch 3105 is or can be provided with its own adjusting means which compensates for wear upon the friction linings and, if necessary, for the wear upon certain other parts of the clutch. It is possible to replace the locking device 3108 by (or provide such locking device in addition to) a motorized arrangement (such as an auxiliary actor) which is designed to move the housing 3107 relative to the frame 3106 in order to establish a state of equilibrium between the bias of the energy storing element 3103 and the resilient means (if any) in the clutch 3105.

It is also possible to utilize the movability of the housing 3107 relative to the vehicle frame 3106 for the purpose of establishing a state of equilibrium between the bias of the energy storing element 3103 and that of one or more additional energy storing elements forming part of the primary actor 3100 or operating between the housing 3107 and the frame 3106.

Figure 27D:
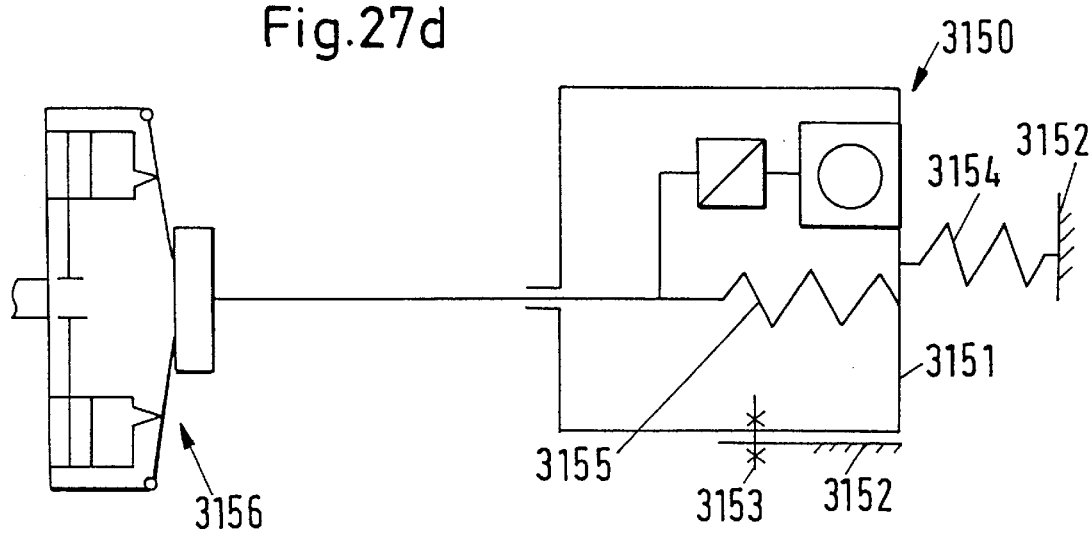
FIG. 27d is a view similar to that of FIG. 27c except that the housing of the actor is adjustably affixed to the frame of the motor vehicle.

The last mentioned modification of the structure of FIG. 27*c* is shown in FIG. 27*d*. Thus, the clutch 3156 of FIG. 27*d* can be operated by a primary actor 3150 having an energy storing element 3155 in an actor housing 3151. The latter is movable relative to the vehicle frame 3152 and can be secured in a selected position relative to such frame by a suitable locking device 3153. A resilient element 3154 reacts against an abutment or stop 3152 in the frame 3152 and bears upon the housing 3151. A state of equilibrium between the bias of the energy storing element 3155 and the bias of the resilient element 3154 can be established by disengaging or removing the locking device 3153. Moreover, it is equally possible to establish a preselected absence of equilibrium and to thereupon reapply the locking device 3153 (or to apply the locking device for the first time) in order to continue to maintain a desirable absence of equilibrium between the bias of the element 3155 and the bias of the element 3154. Of course, the structure of FIG. 27*d* can be utilized with equal advantage to establish a state of equilibrium (or a preselected lack of equilibrium) between the bias of the energy storing element 3155, the bias of the resilient element 3154, and the bias of one or more resilient elements provided in or on the clutch 3156 and opposing the bias of the element 3155.

Figure 27E:
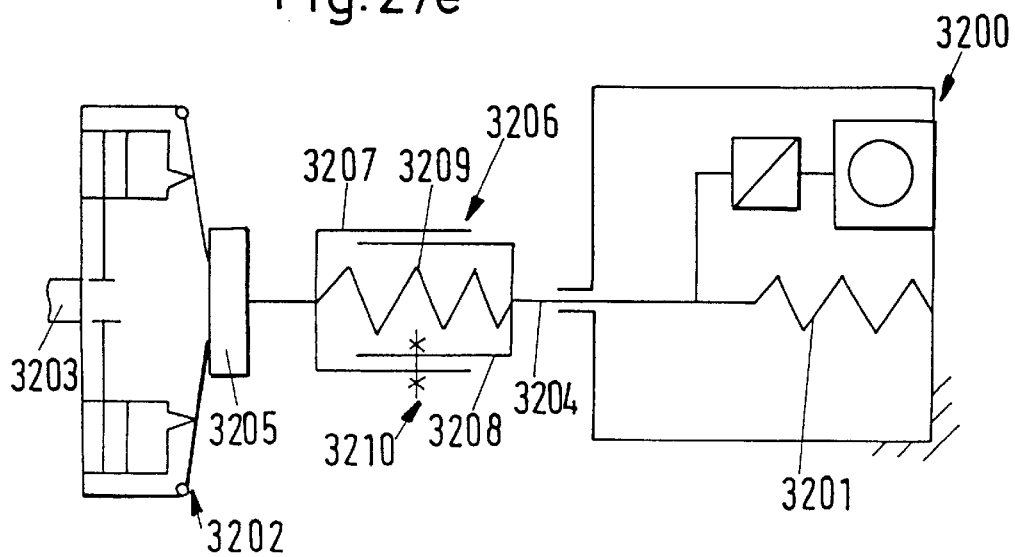
FIG. 27e is a view similar to that of FIG. 27a but showing a different connection between the actor and a friction clutch.

FIG. 27*e* shows a primary actor 3200 which is coupled to an axially fixedly mounted torque transmitting system 3202 (such as a friction clutch) by a further adjusting mechanism 3206 installed between a bearing 3205 of the clutch and the output element 3204 of the actor 3200. The housing, the pressure plate and the flywheel of the clutch 3202 are driven by the output member 3203 (such as a camshaft or a crankshaft) of a driving arrangement, such as a combustion engine of a motor vehicle. The housing of the actor 3200 is fixedly mounted in the frame of the motor vehicle and contains a prime mover (such as an electric motor), a transmission and an energy storing element 3201 acting upon the output element 3204. The adjusting mechanism 3206 comprises two cupped components or members 3207, 3208 which are slidably telescoped into each other and are urged axially and away from each other by a resilient element 3209, e.g., a coil spring. The member 3208 is attached to the output element 3204, and the member 3207 is connected with the bearing 3205, i.e., with a motion receiving part of the clutch 3202.

A locking device 3210 is provided to releasably secure the members 3207, 3208 to each other in properly selected axial positions. In order to effect an initial adjustment of the connection between the actor 3200 and the clutch 3202, the locking device 3210 is deactivated (or is yet to be put to use) so that the members 3207, 3208 are free to move relative to each other under the bias of the energy storing element 3201 and/or the resilient element 3209 and/or one or more resilient elements of the clutch 3202. The locking device 3210 is thereupon applied to fixedly secure the members 3207, 3208 to each other so that the bias of the resilient element 3209 thereupon remains unchanged and cannot influence the axial position of the output element 3204 and/or the selected distance between the element 3204 and the bearing 3205. Thus, once the locking device 3210 is applied, the adjusting mechanism 3206 can be said to form part of the output element 3204.

Referring to FIGS. 28a and 28b, there is shown a further actor 3300 having a housing 3302 which carries or contains a prime mover 3301, e.g., an electric motor having an output shaft which carries a worm 3303 and is or can be rotatable in clockwise and counterclockwise directions. The worm 3303 meshes with a worm wheel 3304, and the output shaft of the motor 3301 further carries two axially spaced apart eccentrics 3305 for a strap or link 3306. The shaft for the worm wheel 3304 carries a worm 3308 which is disposed between the two eccetrics 3305 and meshes with a worm wheel 3309 on a shaft 3310 which is parallel to the output shaft (worm 3303) of the motor 3301 and includes or is connected with a feed screw mating with an nut 3311. The nut 3311 is held against rotation relative to the housing 3302 so that it moves axially in response to rotation of the shaft 3310 and its feed screw.

The nut 3311 and the link or strap 3306 transmit motion to a compounding or summing lever 3312. One end portion of the lever 3312 is articulately connected to the nut 3311, an interrmediate portion of this lever is articulately connected to the strap 3306, and the other end portion of this lever is articulately connected to a reciprocable output element 3313 of the actor 3300.

The strap 3306 is biased by an energy storing element 3307 which is adjacent the housing of the motor 3301 and reacts against an end wall of the actor housing 3302.

Certain of the aforedescribed parts of the actor 3300 constitute a composite transmission which is interposed between the motor 3301 and the output element 3313. The lever 3312 receives two reciprocatory movements, one from the nut 3311 which acts upon one of its end portions and the other from the strap 3306 which acts upon its intermediate portion. The thus obtained composite or compound movement is transmitted to the output element 3313 for the selection of torque to be transmitted by a friction clutch (not shown in FIGS. 28a and 28b), another torque transmitting system and/or a transmission system.

The efficiency of the transmission in the housing 3302 of the actor 3301 can be enhanced by appropriate selection of the ratio of the second stage (worm 3308 and worm wheel 3309), the lead of the external thread on the feed screw of the shaft 3310 and/or the effective lengths of the two arms of the lever 3312.

Figure 29:
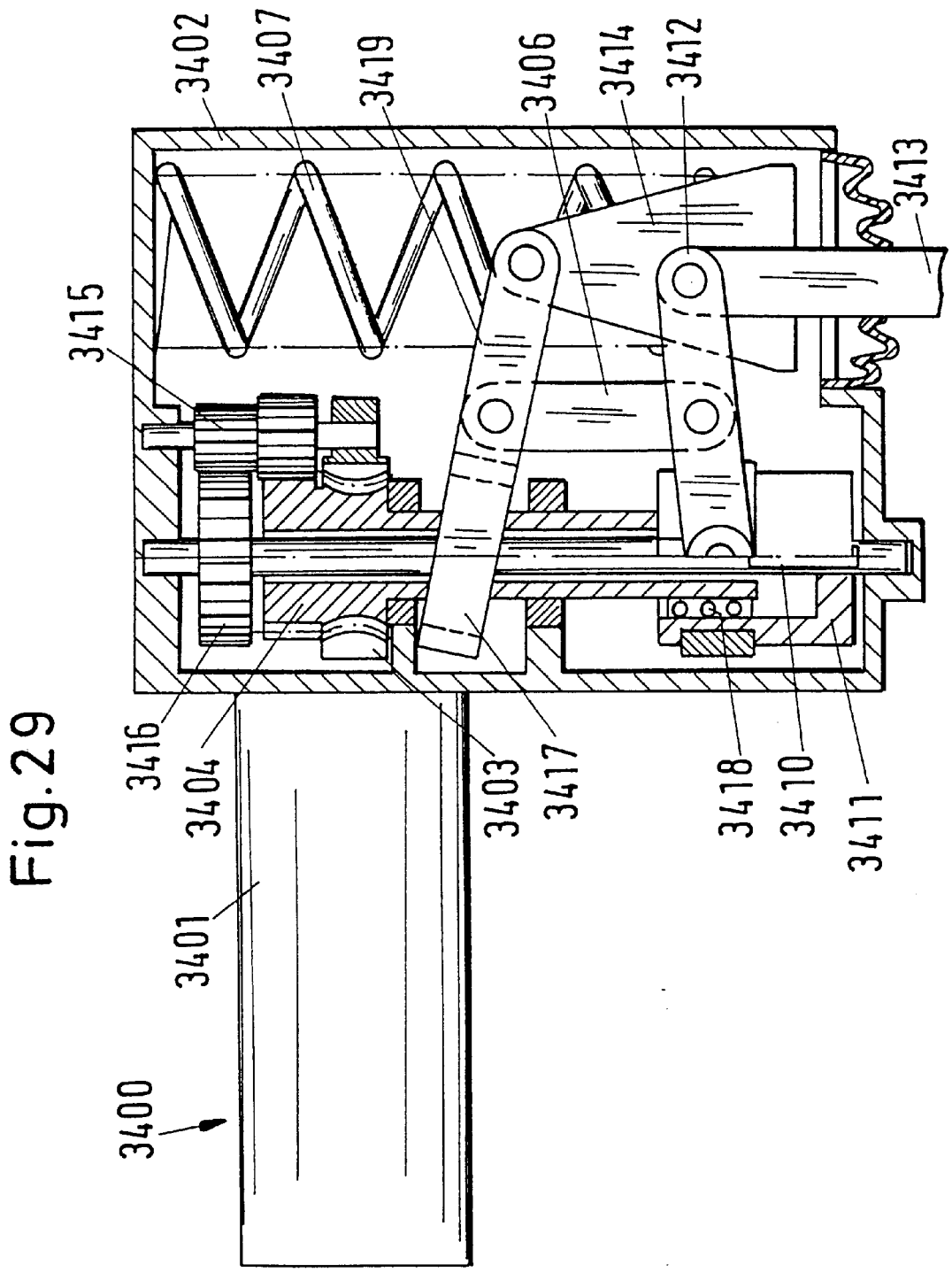
FIG. 29 is a partly elevational and partly sectional view of still another actor.

Referring now to FIG. 29, there is shown a further actor 3400 which comprises a prime mover 3401 (e.g., an electric motor having a housing or casing affixed to or of one piece with the main actor housing 3402). The output shaft of the motor 3401 carries a worm 3403 which meshes with a hollow worm wheel 3404. A tubular extension of the worm wheel 3404 carries a wobble plate 3417 which transmits motion to one arm of a two-armed lever 3419.

A portion of the hollow worm wheel 3404 constitutes a spur gear which meshes with a pinion on an intermediate shaft 3415, and the pinion mates with a spur gear 3416 on an elongated shaft extending through and beyond the hollow worm wheel 3404 and provided with a feed screw 3410 mating with a nut 3411. The latter is non-rotatably mounted in the housing 3402 so that it moves axially of the feed screw 3410 toward or away from the worm wheel 3404, depending on the direction of rotation of the output shaft of the motor 3401.

An intermediate portion of the lever 3419 is pivotably mounted on a link 3406 carried by the intermediate portion of a summing or compounding lever 3412. One end portion of the lever 3412 receives motion from the reciprocable nut 3411, and the other end portion of this lever is articulately connected to a reciprocable output element 3413 of the actor 3400.

An energy storing element 3407 reacts against the housing 3402 and indirectly bears upon the output element 3413 by way of a link-shaped retainer or abutment 3414 mounted on a pivot carried by the right-hand end portion of the lever 3419 and on a pivot which couples the summing or compounding lever 3412 with the output element 3413. The energy storing element 3407 also acts upon the lever 3419 since the latter is articulately connected to the retainer 3414.

The reference character 3418 denotes a guide or bearing or centering means for the nut 3411 relative to the elongated tubular extension of the hollow worm wheel 3404.

Figure 30:
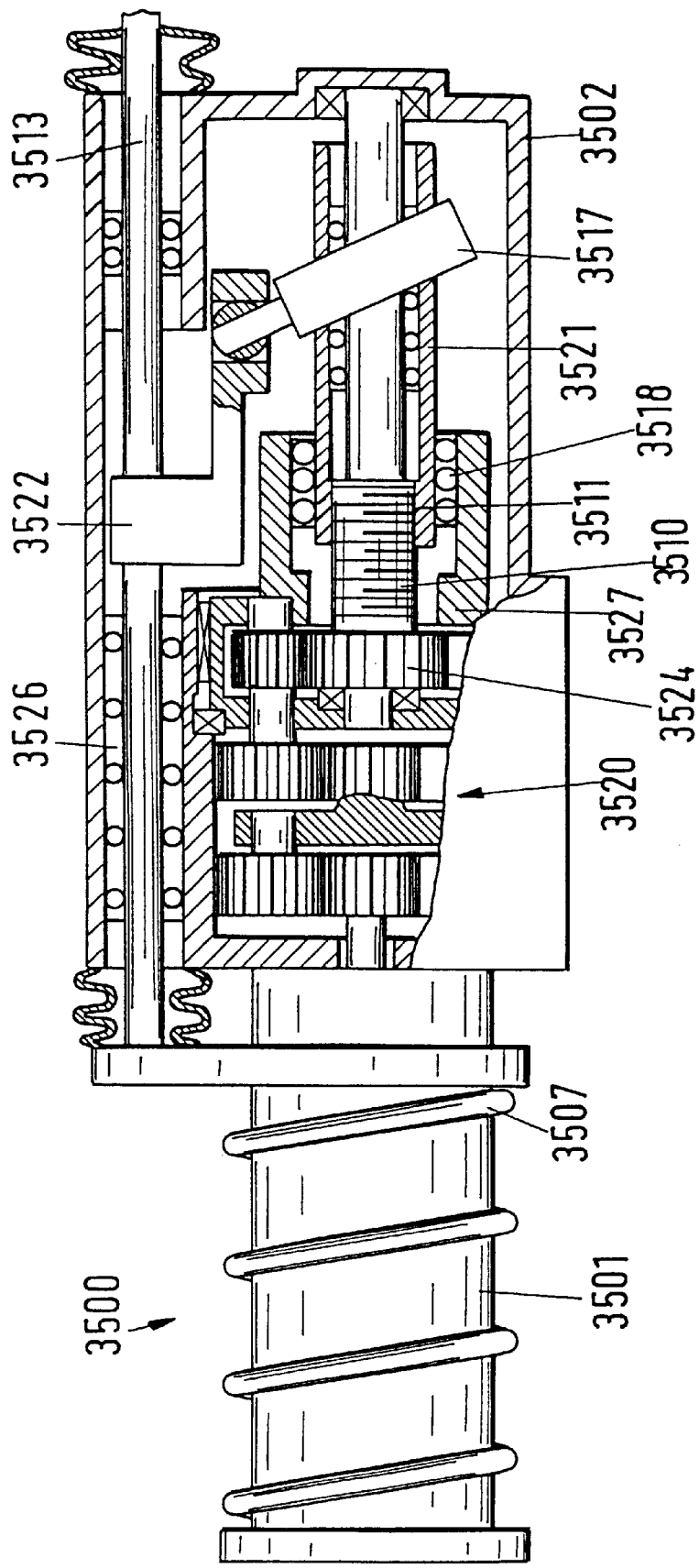
FIG. 30 is a partly elevational and partly longitudinal sectional view of an actor constituting a modification of the actor which is shown in FIG. 29.

FIG. 30 shows an actor 3500 having a prime mover 3501 (e.g., an electric motor) which is carried by the actor housing 3502. The output shaft of the motor 3501 drives the first stage of a multi-stage planetary 3520 the last stage of which includes a spur gear 3524 of one piece with or connected to a feed screw 3510 mating with a nut 3511 which is reciprocable relative to the housing 3502 in a guide 3518. The nut 3511 carries a wobble plate 3517 which is articulately connected to a pusher 3522 attached to a reciprocable output element 3513 of the actor 3500. The output element 3513 is reciprocable in a guide 3526 and is biased by an energy storing element 3507 which reacts against the housing of the motor 3501 and bears against a flange on the output element. The character 3527 denotes a carrier for the shaft of the pinion mating with the spur gear 3524 of the planetary 3520. The wobble plate 3517 is rockably mounted on a tubular extension 3521 of the nut 3511. The pusher 3522 can cause the output element 3513 to perform a composite movement which is attributable to axial movement of the nut 3511 and to the movement of the wobble plate 3517.

An advantage of the actor 3500 is that the output element 3513 can perform a movement which is initiated in part by the planetary 3520 and in part by the transmission including the feed screw 3510, the nut 3511 and the wobble plate 3517. This renders it possible to effect appropriate movements of the mobile part or parts of a system which is regulated by the output element 3513.

Figure 31:
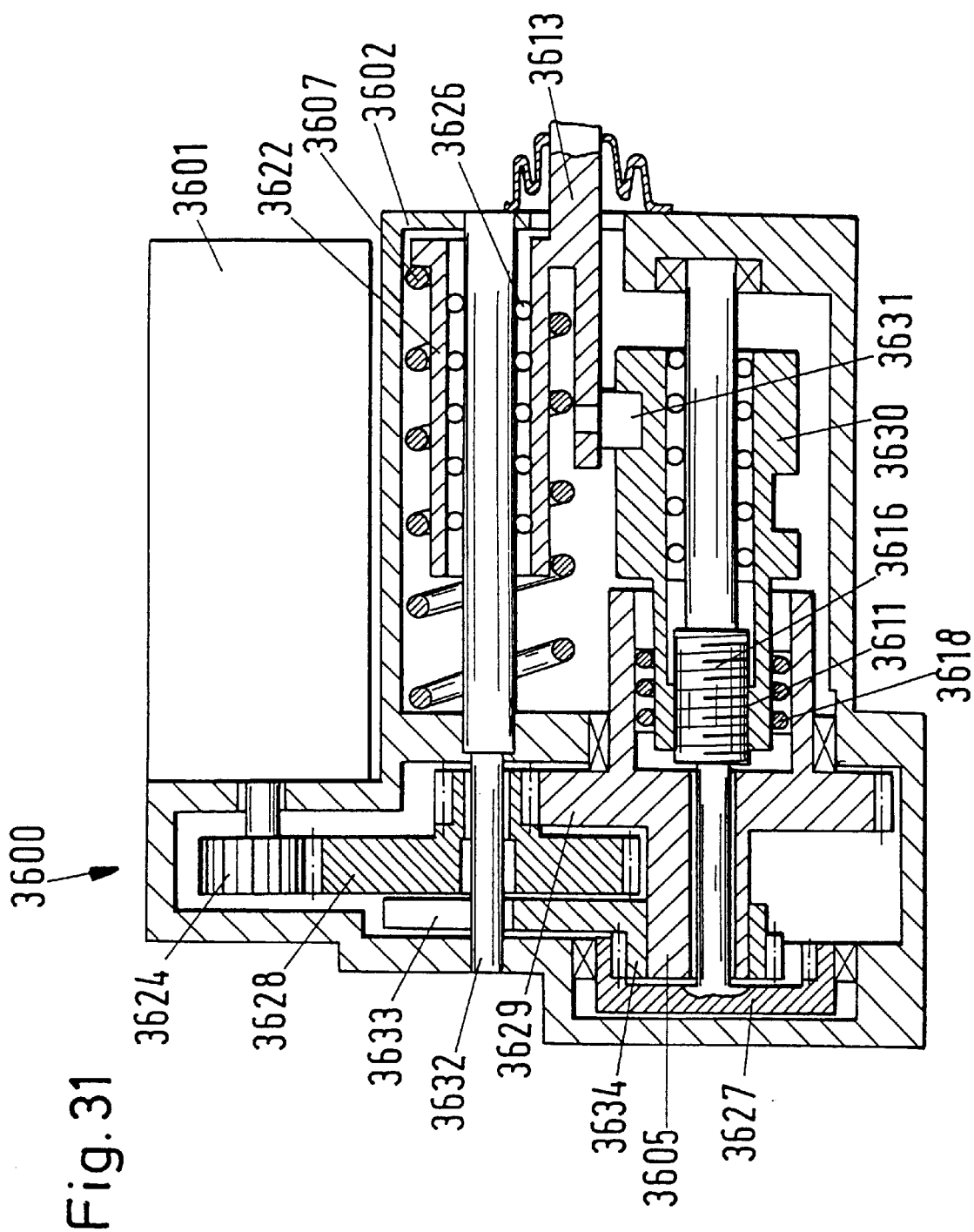
FIG. 31 is a partly elevational and partly sectional view of an actor constituting another modification of the actor of FIG. 29.

The actor 3600 of FIG. 31 comprises a prime mover 3601 (e.g., an electric motor) which is carried by the housing 3602 and drives a spur gear 3624 in mesh with a spur gear 3628 surrounding a shaft 3632. A smaller-diameter pinion which is driven by the gear 3628 meshes with a gear 3629 which is or one piece with an eccentric 3605 surrounded by an oval gear 3634 which mates with an internal gear 3627. The shaft of the internal gear 3627 carries a feed screw 3616 in mesh with an axially reciprocable nut 3611.

A yoke 3633 holds the oval gear 3634 against rotation in the housing 3602; to this end, the prongs of the yoke 3633 straddle the shaft 3632. A torque transmitter 3618 operates between an extension of the gear 3629 and the shank of a cylinder cam 3630 having a peripheral cam groove for a roller follower 3631 on the output element 3613 of the actor 3600.

The gear 3627 transmits an intermittent movement to the feed screw 3616. The difference between the angular movements of the feed screw 3616 and the cam 3630 entails an axial displacement of the cam and hence, via roller follower 3631, of the output element 3613. The movement of the roller follower 3631 is a complex or composite movement attributable in part to the transmission including the nut 3611 and the mating feed screw 3616, and in part to the transmission including the cylinder cam 3630.

A pusher 3622 serves to transmit forces between an energy storing element 3607 and the output element 3613; this pusher surrounds the shaft 3632 and is guided therealong by a bearing 3626.

As already described hereinbefore, the improved actor can be constructed and assembled in such a way that the rotary output member (such as a shaft) of the actor motor transmits motion to a transmission which includes a set of spur gears (such as 3624, 3628), a worm and worm wheel (3403, 3404), a planetary (3520), a set of hypoid gears, a set of cooperating oval gears, or the like. A conversion of rotary movement of parts in one stage of a multi-stage transmission into a translatory movement of parts in another stage of such transmission can be effected by resorting to one or more wobble plates (such as 3417), a so-called slider crank mechanism, a crank drive, a so-called crank loop transmission and/or a so-called wheel coupler transmission.

A change of RPM, for example, for the purposes of adjustment, can be effected by resorting to a set of mating spur gears, to a set of hypoid gears, to a worm and worm wheel drive, to a planetary, to a twin feed screw transmission and/or to the aforementioned wheel coupler transmission. It can be of advantage to convert a rotary motion into a translatory movement (for example, for the purposes of an adjustment to compensate for wear and/or to compensate for one or more other reasons, all as already described hereinbefore) by resorting to a feed screw transmission, to a slider crank mechanism, to a crank drive, to a differential feed screw and/or to a wheel coupler transmission. A compound or composite movement can be arrived at by resorting to a compensating or summing member (such as the lever 3412) or to a rack-and-pinion drive. A shifting of the actor relative to the vehicle frame and/or a shifting of an abutment for an energy storing element can be achieved, for example, by resorting to an axially and/or tangentially shiftable force transmission.

As also described hereinbefore, in addition to a primary or main movement, the output element of the actor can also receive and transmit a secondary movement for the purposes of effecting one or more adjustments, e.g., to compensate for wear. To this end, the movements which are initiated by an adjusting mechanism are superimposed upon primary movements which latter serve to select a desired condition of full or partial engagement or disengagement of a clutch and/or a desired ratio of a transmission system. The movements for the purposes of adjustment can be intermittent or uninterrupted, and they can be effected at regular or other intervals (e.g., when necessary).

The means for effecting secondary (such as adjusting) movements of the output element can be permanently or temporarily coupled with the output element and/or with the means for effecting the primary movements of the output element. The prime mover of the adjusting means (such as one of the aforedescribed auxiliary or secondary actors) can be an electric motor, i.e., the same as the prime mover of the primary actor. Moreover, and as described for example with reference to FIG. 26b, the direction and/or the extent of adjusting movement can be determined by the primary actor. The latter can carry out the adjustments at regular or other intervals and while the output shaft of its prime mover rotates in a clockwise or in a counterclockwise direction. Since the adjustment normally necessitates the exertion of a relatively small force, the energy requirements for the carrying out of periodic adjustments constitute only a small portion or percentage of the overall energy requirements of the primary actor.

An advantage of the integration of the auxiliary actor into the primary actor (reference may be had, for example, to FIG. 27b) is a pronounced compactness of the control unit and greater ease of installation of the combined primary and auxiliary actors in a motor vehicle. Furthermore, it is often sufficient to employ a common prime mover for the primary and secondary actors.

At least in certain instances, the prime mover of the primary actor, of the auxiliary or secondary actor, or of each such actor, is a reversible electric motor or an equivalent prime mover. Such prime mover and the associated transmission can be designed to cause the output element to perform identical movements regardless of the direction of rotation of the output member of the prime mover. This is of particular advantage when the primary actor is utilized in a control unit for a torque transmitting system. The arrangement can be such that a rotation of the output member of the prime mover in one direction serves to effect the desired selection of the magnitude of transmitted torque whereas a rotation of the output member in the opposite direction serves to effect adjustments which are necessary to compensate for wear, etc.

Figure 32B:
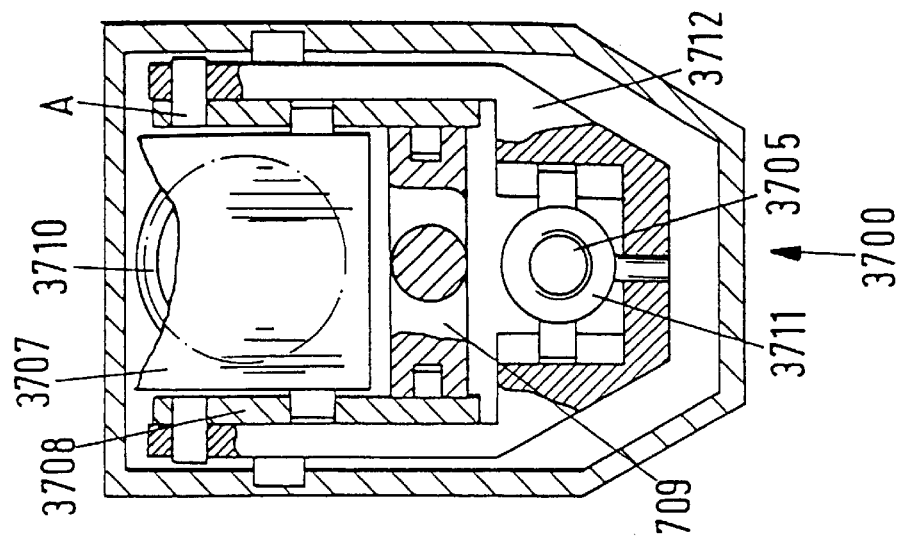
Figure 32A:
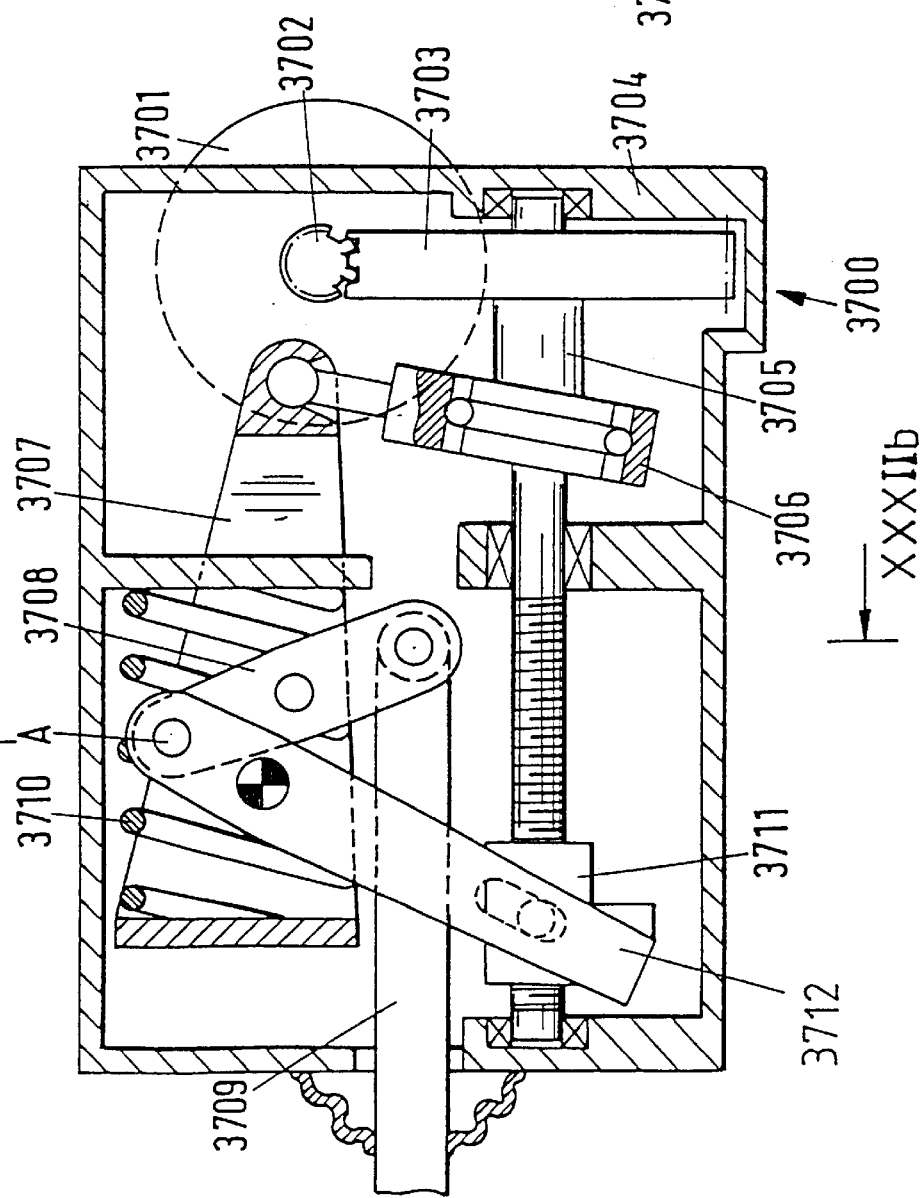
FIG. 32a is a longitudinal sectional view of an actor constituting a modification of the actor of FIG. 30.

FIGS. 32a and 32b illustrate certain details of an actor 3700 which comprises an electric motor 3701 or another suitable prime mover. The output shaft of the motor 3701 rotates a worm 3702 in mesh with a worm wheel 3703 on a shaft 3705 which is journalled in the actor housing 3704. The shaft 3705 carries a wobble plate 3706 which can transmit motion to a reciprocable output element 3709 by way of an elongated link 3707 which is articulately connected to the wobble plate and a two-armed lever 3708 which is pivotably mounted on the link 3707. The shaft 3705 includes a feed screw meshing with a nut 3711 which is held against rotation in the housing 3704 and serves to transmit motion to a link 3712. The latter is coupled to one arm of the lever 3708, and the other arm of this lever is coupled to the output element 3709.

An energy storing element 3710 reacts against an internal wall of the housing 3704 and bears against an abutment of the link 3707 to urge the pivot for the lever 3708 in a direction to the left, as viewed in FIG. 32a (it is assumed here that the energy storing element 3710 is installed in a precompressed condition).

As can be seen in FIG. 32b, the link 3712 acts as an elongated lever and has two prongs turnable about radially outwardly extending pins of the nut 3711. A third radial pin of the nut 3711 serves to hold the latter against rotation in the housing 3704. The reference character A denotes a pivot between the link 3712 and the lever 3708; such pivot is shifted in response to pivoting of the link or lever 3712. Thus, the movement of the output element 3709 is a composite movement attributable in part to movement of the wobble plate 3706 and in part to movements of the link 3712.

The pitch of the feed screw of the shaft 3705 as well as the dimensions and the mounting of the lever or link 3712 determine the relationship between the speed of adjustment of the position of the output element 3709 and the movement which is needed to select the torque to be transmitted by a clutch which is coupled to the output element 3709.

The motor 3701 is a reversible electric motor which can rotate the shaft 3705 in a clockwise direction as well as in a counterclockwise direction. Thus, a change in the position of the output element 3709 can take place in response to rotation of the shaft 3705 in either direction; however, the direction of movement of the output element 3709 can be selected (for the purposes of compensation for wear or the like as well as for the purposes of selecting a particular torque transmission) by changing the direction of rotation of the shaft 3705.

Figure 33:
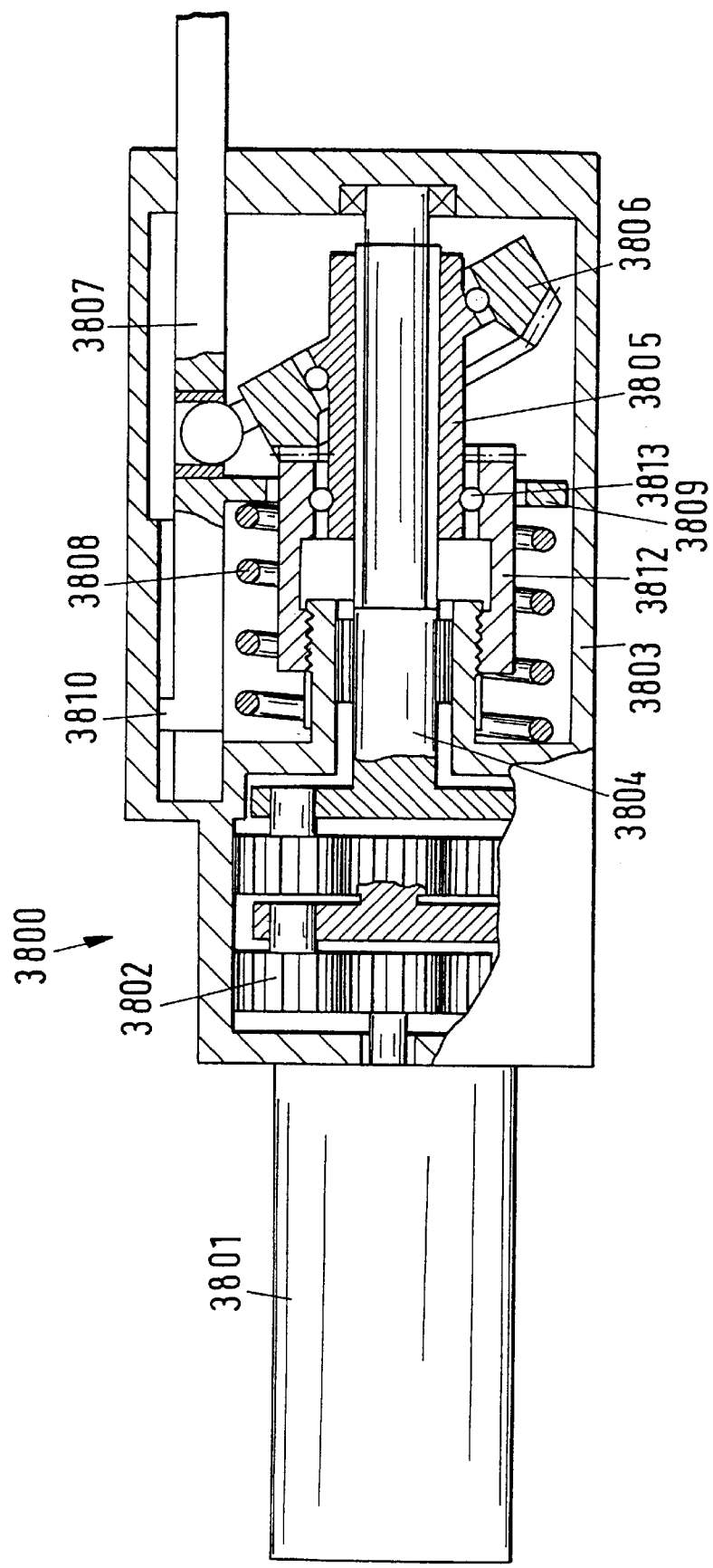
FIG. 33 is a partly elevational and partly longitudinal sectional view of another actor.

FIG. 33 illustrates an actor 3800 having a prime mover (e.g., an electric motor) 3801. The rotary output member of the motor 3801 drives the first rotary component of a step-down transmission stage 3802 (here shown as a planetary), and the latter drives a shaft 3804 which is journalled in the housing 3803 of the actor 3800. The shaft 3804 includes a feed screw which meshes with and can transmit axial movements to a nut or sleeve 3805 mounting a toothed wobble plate 3806 articulately connected to the reciprocable output element 3807 of the actor 3800 and having teeth meshing with the teeth at one axial end of an adjusting sleeve 3812 surrounding a bearing 3813 which, in turn, surrounds the nut 3805. The output element 3807 is reciprocably guided (at 3810) in the housing 3803 and includes a wall 3809 serving as an abutment for an energy storing element 3808 which surrounds the sleeve 3812 and reacts against an internal wall of the housing 3803.

The guide 3810 serves to prevent rotation of the output element 3807 in the housing 3803. When the wobble plate 3806 receives motion from the nut 3805, its teeth cause the sleeve 3812 to turn about the axis of the shaft 3804; such angular movement is relatively slow and can be determined by appropriate selection of the inclination of the wobble plate 3806, the diameter of the toothed portion of the wobble plate and the diameter of the sleeve 3812, i.e., by selecting such parameters, one can determine the rotational speed of the sleeve 3812. The left-hand end portion of the sleeve 3812 has an internal thread which mates with an external thread on the adjacent internal tubular portion of the housing 3803, i.e., the sleeve 3812 acts as a nut and the housing 3803 acts as a feed screw which compels the nut to move axially in response to rotation of the sleeve 3812 by the wobble plate 3806. The bearing 3813 causes the nut 3805 to share the axial movements of the sleeve 3812 relative to the housing 3803, and the wobble plate 3806 shares such axial movements of the nut 3805. This causes the wobble plate to effect an adjustment of the axial position of the output element 3807.

The output shaft of the motor 3801 is preferably rotatable in a clockwise as well as in a counterclockwise direction. This enables the wobble plate 3806 to initiate movements of the output element 3807 in a direction to the left or to the right, as viewed in FIG. 33.

It is often desirable to monitor the extent of movement of (i.e., the distance covered by) a component part of the actor, or the extent of movement of another mobile component or the extent of movement of a member or part in the connection between the actor and a mobile part of a torque transmitting system and/or a transmission system. It is normally (or often) sufficient and hence desirable to monitor (at least at times) the movements of a component which is designed and installed to perform linear movements or linear and other movements; however, it is also possible (and often advisable) to monitor the angular movements of a pivotable, rockable or rotary component, e.g., the angular movements of the rotary output shaft of an electric motor constituting or forming part of the prime mover in the actor of the improved control unit.

A change of the direction of movement in the transmission of the actor forming part of the improved control system can be ascertained by monitoring at least one of (a) the RPM, (b) the relationship between rotary and translatory movements, (c) the speed, (d) the direction, and (e) the axial position of a longitudinally displaceable part.

For example, the transmission of an actor can be constructed in such a way that the rotary output shaft of an electric motor constituting the prime mover of the actor is of one piece with or is non-rotatably connected to a feed screw having a rather pronounced lead. This enhances the efficiency of the transmission stage including such feed screw. The stage including the feed screw is followed by a step-down stage of the transmission, and such step-down stage can employ (for example) a suitable lever. A presently preferred embodiment of a transmission in the actor forming part of the improved control unit comprises a first stage including a feed screw or spindle which is directly driven by the prime mover of the actor, and a step-down second stage such as a planetary or another gearing.

If the actor of the improved control unit is to operate a friction clutch or another torque transmitting system, it is preferably designed to carry out the following operations:

It should generate a mechanical force/torque, and it should oppose the reaction force/torque.

If an electronic management for a push-type clutch is to be combined with the improved control unit, it is further desirable to equip the actor with at least one energy storing element, such as one or more coil springs.

It has been found that, if the actor is to employ an electric motor having a certain size and a certain output, and if such motor is to be installed in an actor having at least one output element which is to perform a certain realizable range of movements and/or to transmit forces within a predetermined range of forces, and which output element is to be designed to occupy a predetermined maximum amount of space (particularly in a motor vehicle), it is advisable or desirable to employ an actor having a multi-stage (for example, two-stage) transmission.

If the above outlined prerequisites are satisfied, the actor can be designed to carry out at least some (e.g., at least two) of the following changes, conversions and/or other modifications: It should be capable of changing the RPM and/or the direction of rotation and/or the axial position. Also, it should be capable of converting one of rotary and translatory movements into the other of these movements. Still further, it should be capable of changing the direction of push and/or pull, the orientation and/or the direction of translatory movement. Still further, it should be capable of increasing or reducing the speed of a translatory and/or rotary movement.

For example, a transmission in the housing of an actor can be designed in such a way that it satisfies at least some of the following prerequisites: The housing should include or contain adequate means for holding a rotary feed screw against axial (or undesirable axial) movements. The housing should allow (such as provide room) for extensive movements of an axially movable nut which mates with a rotary feed screw or spindle (it has been found that, in many instances, it is preferable to employ a transmission or a transmission stage having a rotary feed screw meshing with an axially movable nut rather than a rotary nut meshing with an axially movable feed screw). Furthermore, it should be possible to utilize a nut which is a wedge-like element in rolling engagement with an output wedge, or there should be provided a guide for rolling movements with axial clamping or wedging force support in the housing, there should be no radial wedging or clamping action upon a feed screw, the transverse force of the output wedge should match or correspond to the axial force to be transmitted by the feed screw (i.e., there should be adequate mounting of the feed screw in the housing), and the feed screw should be adequately held against undesired (angular and/or other) movements relative to the housing.

In order to ensure adequate (predictable, accurate and reliable) transmission of motion by a transmission stage during a shift from the exertion (upon the output element) of a pull to the exertion of a push (or vice versa), one can resort for example to an embodiment which utilizes a form-locking or a force-locking joint. The pairing of mating parts can be such that a follower can track a cam groove or a cam ridge. In order to reduce friction, it is often advisable or desirable to employ twin (composite) roller followers.

Since an output member or output element is likely to exhibit less than ideal proportions for a sliding movement (e.g., due to long movements to be performed by a feed screw and a short movement to be carried out by the output member or output element), it is often desirable to employ a linkage or simply a single lever or link. The pivot axis of such lever or link is located at a finite distance from the axis of a rotary feed screw, and such axes can be parallel or normal or otherwise inclined relative to each other.

If the system which is operated by the actor of the improved control unit includes a push-type clutch, it is advisable to employ at least one spring for the actuation of the clutch. The flow of power from the spring can (and often should) be directly to the output element. For example, one can employ (with advantage) a torsion spring, and such spring can extend the full length of the actor housing because this frequently ensures a highly satisfactory transmission of spring force. It is also possible to employ a so-called wrap spring or wrap-around spring which surrounds the prime mover of the actor. Other types of energy storing elements, mountings of energy storing elements, and operative connections between an energy storing element and the output element of an actor can also be resorted to, depending upon the mounting and configuration of the output element or elements.

Based on numerous experiments with various types of novel actors, it has been ascertained that at least the following two embodiments exhibit a number of important advantages:

The first embodiment employs a transmission wherein the axis of a feed screw coincides with the axis of a sleeve-like output element, a wrap-around energy storing element, a large rocking angle, and a closed compact actor housing.

The second embodiment employs a lever having a pivot axis which is normal to the direction of movement of the output element. Such second embodiment further employs an energy storing element acting substantially transversely of the lever and including or constituting a compression coil spring, and the progress of the output force during actuation of a clutch or the like is not linear.

Figure 34:
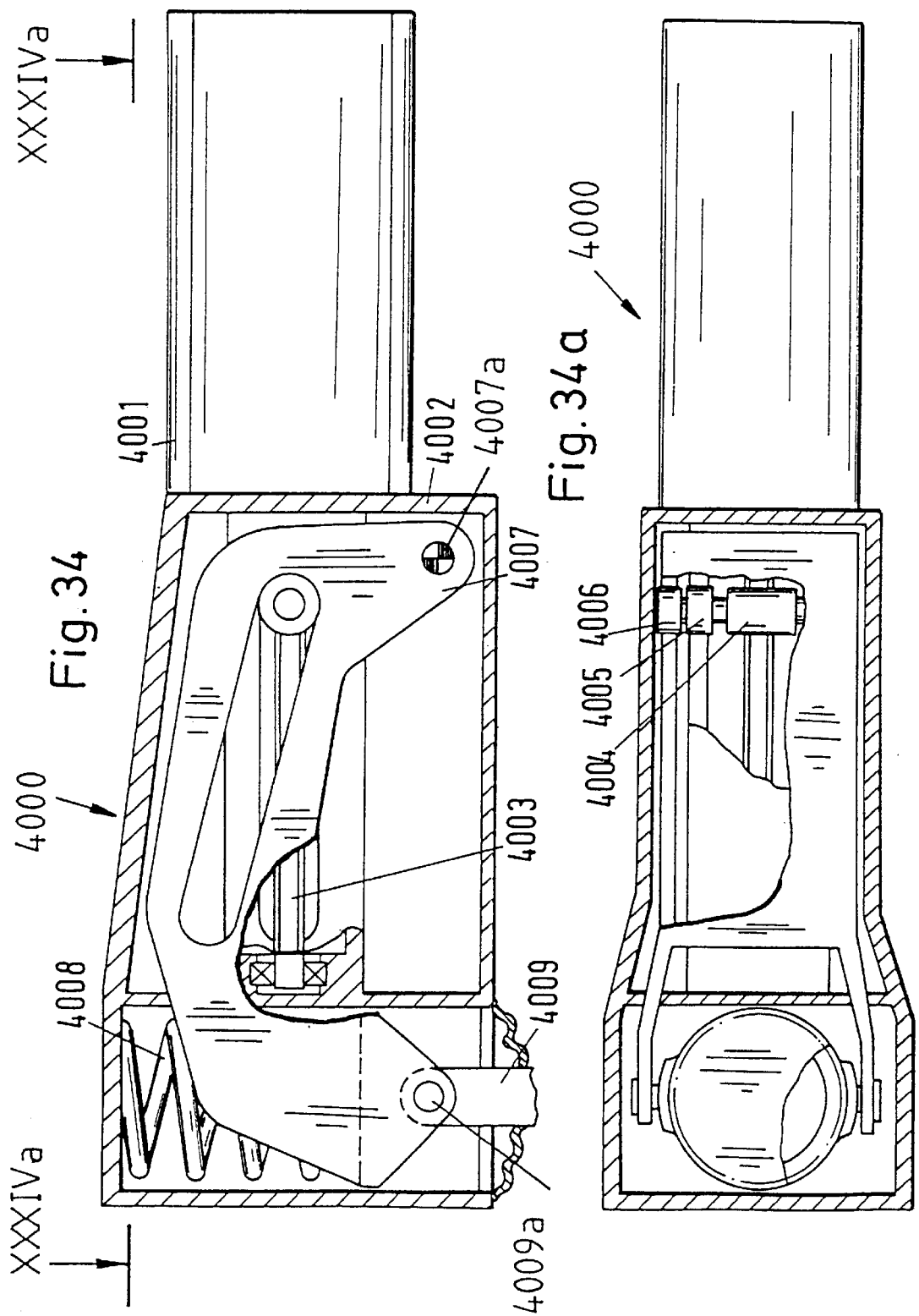
FIG. 34 is a partly elevational and partly longitudinal sectional view of an additional actor.

FIGS. 34 and 34a illustrate an actor 4000 having a housing or casing 4002 which carries the housing or casing of a prime mover 4001, e.g., an electric motor. The rotary output shaft of the motor 4001 is of one piece with or is connected to a coaxial feed screw or spindle 4003, and the free end of this shaft is rotatably journalled in the housing 4002. The feed screw 4003 meshes with a nut 4004 having two radially outwardly extending pins which are disposed diametricaly opposite each other; each of these pins carries a first roller 4005 and a second roller 4006. The rollers 4005 are guided in the housing 4002 and prevent angular movements of the nut 4004 in response to rotation of the feed screw 4003; to this end, the rollers 4005 are free to roll in and to move longitudinally of two elongated guide slots in the housing 4002. The rollers 4006 extend into elongated slots which are provided in the two spaced-apart skirts of a lever-shaped output element 4007 which can transmit motion to a mobile part of a friction clutch or another torque transmitting system and/or to a transmission system under the hood of a motor vehicle by way of a linkage (one link or the single link of such linkage is shown at 4009). Those portions of the skirts of the lever-shaped output element 4007 which are remote from the link 4009 are mounted in the housing 4002 for pivotal movement about a common axis which is parallel to the common axis of the rollers 4005 and 4006.

The force with which the output element 4007 and the link 4009 oppose the movements of the nut 4004 along the feed screw 4003 are taken up by the housing 4002 by way of the rollers 4005. This ensures that such forces are not transmitted to the transmission stage including the feed screw 4003 and the nut 4004.

A coil spring 4008 is provided to serve as an energy storing element of the actor 4000; this coil spring reacts against a portion of the housing 4002 and bears upon the output element 4007, either directly or by way of the link 4009.

Figure 35:
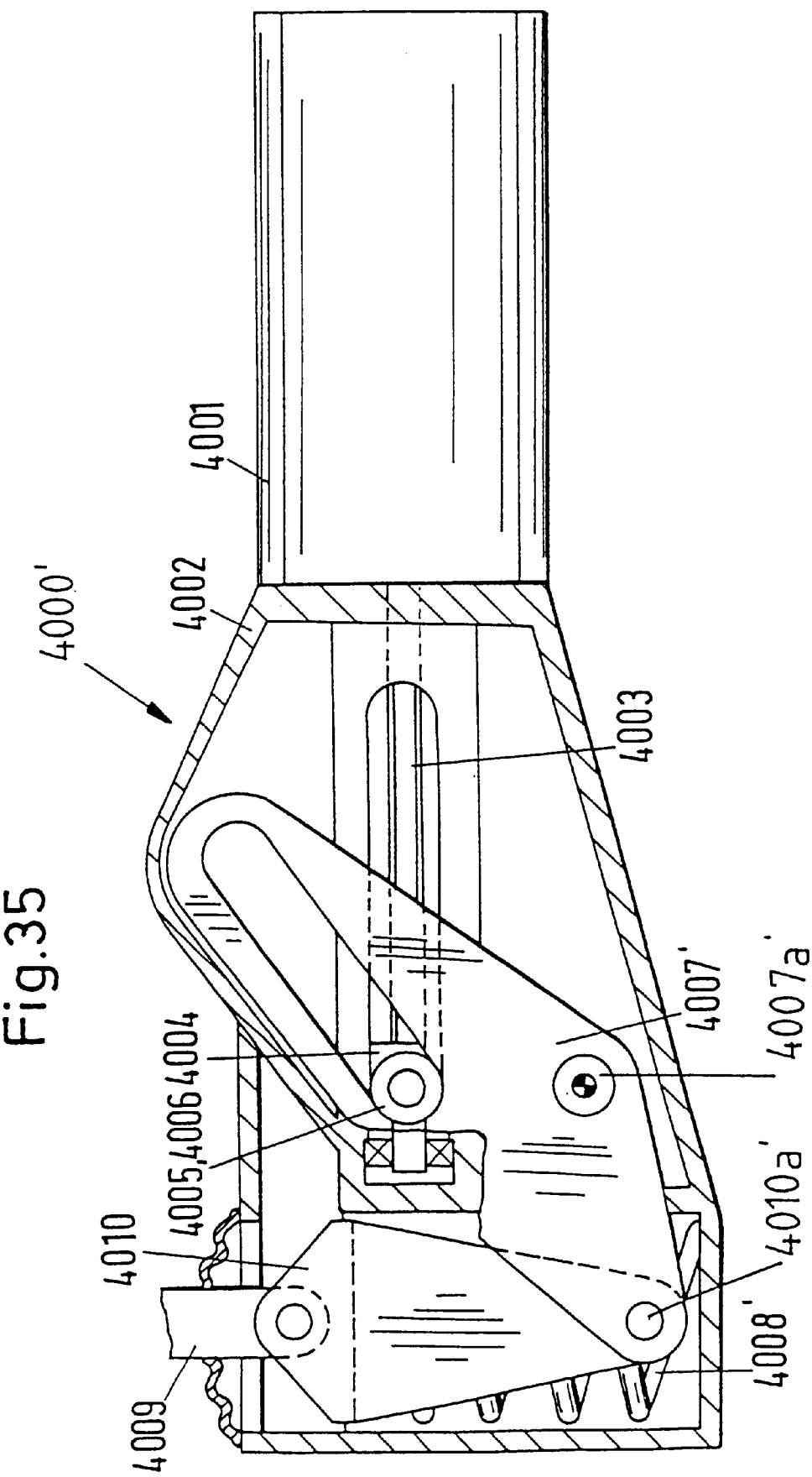
FIG. 35 is a view similar to that of FIG. 34 but showing a modified actor.

The actor 4000' of FIG. 35 constitutes a first modification of the actor 4000. The main difference is that the actor 4000' employs a differently configured and differently mounted output element 4007', that the link 4009 is articulately connected to the modified output element 4007' by a further link 4010, and that the energy storing element 4008' acts upon the output element 4007' by way of the additional link 4010.

It will be noted that, in contrast to the mounting of the output element 4007 in the housing 4002 of the actor 4000, the pivot 4007a' for the output element 4007' in the housing 4002 of the actor 4000' is rather close to the links 4009, 4010, i.e., to those portions of a composite output element which transmit motion between the element 4007' and a mobile part of a clutch (not shown) or the like. Otherwise stated: whereas the pivot 4009a between the element 4007 and the link 4009 of FIG. 34 is arranged to move along an arcuate path having a large radius of curvature and its center on the axis of the pivot 4007a for the output element 4007, the pivot 4010a' between the output element 4007' and the link 4010 of FIG. 35 travels along an arcuate path having a much smaller radius of curvature and a center on the axis of the pivot 4007a' for the output element 4007'. This reduces the need for extensive pivotal movements of the link 4010 relative to the link 4009 when the output element 4007' is pivoted to pull the link 4009 into or to move the link 4009 out of the housing 4002 of the actor 4000'. As can be seen in FIG. 35, the housing 4002 of the actor 4000' provides a guide for substantially linear movements of the link 4010, namely in the general direction of the axis of the energy storing element 4008'. In addition to or in lieu of such guide means for the link 4010, it is possible to provide a guide (not shown) which confines the link 4009 of FIG. 35 to substantially reciprocatory movements in response to pivoting of the output element 4007' (at 4007a') in a clockwise or in a counterclockwise diection.

A membrane (e.g., a bellows) seals the housing 4002 of the actor 4000' in the region where the link 4009 extends from the housing.

The actor 4000" of FIG. 36 constitutes a modification of the actor 4000' and a further modification of the actor 4000. The housing 4002 of the actor 4000" accommodates a lever-shaped output element 4007" carrying a pivot 4011 for a link 4012 which couples the output element 4007" with the link 4009. The member 4010" is articulately connected to the output element 4007" and includes an abutment for one end convolution of an energy storing element 4008" the other end convolution of which bears against a portion of the housing 4002. The axis of the energy storing element 4008" is at least substantially parallel to the axis of the feed screw or spindle 4003 which mates with a nut 4004 for the rollers 4005, 4006 in the same way as described with reference to FIGS. 34 and 34*a*.

The housing or casing for the prime mover 4001 of the actor 4000" can be transferred to the left-hand side of the housing 4002. Furthermore, the energy storing element 4008" can be mounted in the housing 4002 in such a way that its bias can serve to pivot the output element 4007" in a clockwise or in a counterclockwise direction. Still further, the orientation of the links 4012, 4009 relative to the output element 4007" can be changed in a number of ways, depending upon the position of a torque transmitting system and/or a transmission system relative to the actor 4000".

That opening of the housing 4002 of FIG. 36 through which the link 4012 extends can be sealed by a bellows or the like (not shown).

It will be seen that the distribution of various parts in the housing of the actor can be selected almost at will, depending on the availability of space in the direction of the axis of the rotary output member of the prime mover of the actor, in a direction at right angles to such axis and/or in any other direction. This renders it possible to conform the configuration of the actor housing to the dimensions of the space which is available in a motor vehicle for installation of the novel control unit and its actor or actors.

The same holds true for the dimensions, configuration and/or orientation of the output element or elements of the actor. Such output element or output elements can receive motion directly from the output member of the transmission in the actor housing or by way of a coupling, a fork, a rod, a piston or the like.

For example, a relatively long and slender actor (such as the actor 3500 or 3800) will be utilized when the space for the actor is relatively long and relatively narrow. On the other hand, an actor having a width which equals or approximates its length (see the actor 3600) will be used in certain other types of vehicles providing a differently configurated and/or dimensioned space for a novel control unit and its actor or actors.

It is often preferred to employ an actor having a relatively simple, compact and hence inexpensive transmission which is less prone to malfunction than a complex multi-stage transmission.

The output element of the actor can be directly coupled to or even made of one piece with the motion receiving part of a torque transmitting system and/or a transmission system which is operated by the improved control unit. This is readily achievable when the actor of the control unit is not fixedly secured to the chassis or frame of a motor vehicle. As a rule, a discrete coupling or connection between the output element of the actor and a friction clutch and/or a transmission system will be necessary (or the use of such coupling or connection is advisable) if the actor housing is fixedly secured to the vehicle frame. However, even if such connection or coupling is provided, certain of its parts can be made of one piece with or can be rigidly secured to the output element of the actor; for example, a cylinder (such as a master cylinder) of a fluid-operated connection can be made of one piece with or it can be rigidly secured to the housing of any one of several of the aforedescribed actors.

If the transmission of the actor comprises several stages, it is desirable to select the various stages in such a way that the efficiency of the composite transmission is increased.

One of the important functions of the energy storing means forming part of or being associated with the actor of the improved control unit is that, if the output element of the actor is connected to a mobile part of a friction clutch or another torque transmitting system, the energy storing means can ensure that the clutch assumes a predetermined condition (e.g., that of full engagement, that of complete disengagement, or that of partial engagement) when the actor is idle.

The just discussed function can be performed by the energy storing means alone or in conjunction with other energy storing means, particularly with one or more resilient elements forming part of the system which is operated by the improved control unit. Typical examples of such resilient elements are the diaphragm spring of a friction clutch (or another clutch spring), the resilient segment or segments between the two sets of friction linings forming part of a clutch disc or clutch plate in a friction clutch, and/or one or more springs in means for compensating for wear upon certain parts of a friction clutch.

Of course, it is also possible to utilize the prime mover of the actor as a means for ensuring that a clutch which receives motion from the output element of the actor remains or becomes fully engaged, fully disengaged or engaged to a desired extent when the actor is not in use; if the prime mover of the actor is an electric motor, it is merely necessary to ensure that the motor remains continuously connected to the battery of a motor vehicle or to another source of electrical energy. Analogous results can be obtained by employing one or more auxiliary or secondary actors, by automatically engaging at least one vehicle brake when the primary actor is idle, and/or by employing one or more springs (such as a wrap-around spring) which become effective when the primary actor is not in actual use or is not ready for use.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of operating selected constituents of power trains in motor vehicles and, therefore, such adaptations should and are intended to be comprehended within the meaning and range of equivalence of the appended claims.

What is claimed is:

1. Apparatus for operating at least one constituent of a power train in a multiple-constituent motor vehicle wherein the constituents include a driving arrangement, a transmission system and a torque transmitting system, comprising a control unit; and a plurality of signal transmitting sensors connected with said control unit, said control unit including means for actuating said at least one constituent and said actuating means comprising a prime mover, a transmission in torque-receiving relation with said prime mover, at least one output element between said transmission and said at least one constituent, and energy storing means arranged to react against a portion of said transmission and to transmit force by bearing upon said at least one output element so that said at least one output element can actuate said at least one constituent in response to the application of force supplied by at least one of said prime mover and said energy storing means.

2. The apparatus of claim 1, further comprising at least one electronic unit arranged to transmit signals to said control unit.

3. The apparatus of claim 1, wherein said prime mover comprises a motor.

4. The apparatus of claim 1, wherein said at least one constituent is said torque transmitting system and said torque transmitting system is operable by said actuating means to transmit to another of said constituents a torque of a variable magnitude.

5. The apparatus of claim 4, wherein said torque transmitting system includes a friction clutch.

6. The apparatus of claim 4, wherein said torque transmitting system includes a disc clutch.

7. The apparatus of claim 4, wherein said torque transmitting system includes a lockup clutch of a torque converter.

8. The apparatus of claim 1, wherein said at least one constituent of said power train is said transmission system.

9. The apparatus of claim 8, wherein said transmission system includes a change gear.

10. The apparatus of claim 8, wherein said transmission system includes an infinitely variable speed drive.

11. The apparatus of claim 1, wherein said transmission is a single-stage transmission.

12. The apparatus of claim 1, wherein said transmission is a multi-stage transmission.

13. The apparatus of claim 1, wherein said transmission includes at least one of (a) a feed screw transmission, (b) a spur gearing, (c) a bevel gear transmission, (d) a planetary, (e) a Bowden cable, (f) a worm gear transmission, (g) a hypoid gear transmission, (h) a crank drive, (i) a rack-and-pinion drive, and (j) a cam drive.

14. The apparatus of claim 1, wherein said transmission is a multi-stage transmission including a first stage having a first step-down ratio and a second stage having a second step-down ratio different from said first ratio.

15. The apparatus of claim 14, wherein said second ratio is smaller than said first ratio.

16. The apparatus of claim 14, wherein said second ratio is larger than said first ratio.

17. The apparatus of claim 1, wherein said transmission is a multi-stage transmission having a first stage including a spur gearing and a second stage including a feed screw.

18. The apparatus of claim 1, wherein said transmission comprises a crank.

19. The apparatus of claim 1, wherein said energy storing means is arranged to bear directly upon said at least one output element.

20. The apparatus of claim 1, wherein said transmission includes a cam drive, said energy storing means reacting against said cam drive and bearing upon said at least one output element.

21. The apparatus of claim 1, wherein said transmission includes a crank drive, said energy storing means reacting against said crank drive and bearing against said at least one output element.

22. The apparatus of claim 1, wherein said energy storing means includes at least one spring.

23. The apparatus of claim 22, wherein said at least one spring is one of (a) a compression spring, (b) a coil spring, (c) a spiral spring, and (d) a wrap spring.

24. The apparatus of claim 1, wherein said energy storing means comprises at least one spring of an elastomeric material.

25. The apparatus of claim 24, wherein said elastomeric material is selected from the group consisting of caoutchouc and synthetic plastic substances.

26. The apparatus of claim 1, wherein said prime mover has a rotary output member and said energy storing means includes at least one spring which is coaxial with said rotary output member.

27. The apparatus of claim 1, wherein said prime mover has an output member rotatable about a predetermined axis, said energy storing means comprising a spring which is parallel to said axis.

28. The apparatus of claim 1, wherein said prime mover has a housing and an output member rotatable about a predetermined axis, said energy storing means including at least one spring having a second axis and including a portion extending in the direction of said second axis and being located outwardly of said housing as seen radially of said predetermined axis.

29. The apparatus of claim 1, wherein said prime mover has a housing and an output member rotatable about a predetermined axis, said energy storing means including at least one spring located outwardly of said housing as seen radially of said axis.

30. The apparatus of claim 29, wherein said at least one spring is coaxial with said output member.

31. The apparatus of claim 1, wherein said transmission includes at least one feed screw and said energy storing means comprises at least one spring coaxial with said at least one feed screw.

32. The apparatus of claim 1, wherein said transmission includes at least one feed screw and said energy storing means cmprises at least one spring having an axis at least substantially parallel with an axis of said at least one feed screw.

33. The apparatus of claim 1, wherein said transmission includes at least one feed screw and said energy storing means comprises at least one spring located radially outwardly of said at least one feed screw.

34. The apparatus of claim 1, wherein said transmission includes at least one feed screw which is at least substantially parallel to a rotary output member of said prime mover.

35. The apparatus of claim 1, wherein said prime mover comprises an output member rotatable about a predetermined axis and said energy storing means comprises at least one spring disposed substantially radially of said axis with respect to said prime mover.

36. The apparatus of claim 1, further comprising a housing for said transmission, said energy storing means including at least one spring bearing against said at least one output element.

37. The apparatus of claim 1, wherein said prime mover comprises a wall and said energy storing means comprises at least one spring bearing against one of said wall and said at least one output element and reacting against the other of said wall and said at least one output element.

38. The apparatus of claim 1, wherein said at least one output element comprises a pusher.

39. The apparatus of claim 1, wherein said at least one output element includes a toothed rack.

40. The apparatus of claim 1, wherein said at least one output element includes a linkage and means for articulately connecting said linkage to a component of said actuating means.

41. The apparatus of claim 40, wherein said component includes a portion of said transmission.

42. The apparatus of claim 40, wherein said means for articulately connecting includes one of (a) a universal joint, (b) a ball joint, (c) a cardan joint, and (d) a swivel joint.

43. The apparatus of claim 1, wherein said at least one output element includes a portion which is conectable with a Bowden cable.

44. The apparatus of claim 1, wherein said at least one output element includes a portion connectable with a member of a fluid-operated motion transmitting device.

45. The apparatus of claim 44, wherein said member includes a piston.

46. The apparatus of claim 44, wherein said member forms part of a cylinder.

47. The apparatus of claim 44, wherein said device includes a first cylinder, a second cylinder, and a fluid-containing connection between said cylinders.

48. The apparatus of claim 44, wherein said fluid is one of a hydraulic fluid and a gaseous fluid.

49. The apparatus of claim 44, wherein said at least one constituent is said torque transmitting system and said device includes a piston constituting a central disengaging member of said torque transmitting system.

50. The apparatus of claim 44, wherein said device includes a cylinder having a mobile output member and further comprising a mechanical linkage between said output member and said at least one constituent.

51. The apparatus of claim 1, wherein said transmission comprises a gear segment.

52. The apparatus of claim 1, wherein said transmission includes a metallic piston.

53. The apparatus of claim 1, wherein said transmission includes an elastomeric portion.

54. The apparatus of claim 1, wherein said transmission comprises a rotary member and a bearing for said rotary member.

55. The apparatus of claim 54, wherein said bearing includes at least one of (a) a radial bearing and (b) an axial bearing.

56. The apparatus of claim 1, wherein said at least one constituent includes said torque transmitting system and said torque transmitting system includes an engageable and disengageable clutch, said energy storing means comprising at least one prestressed spring arranged to maintain said clutch in an at least partially engaged condition by way of said at least one output element in an idle condition of said actuating means.

57. The apparatus of claim 56, wherein said clutch is a friction clutch.

58. The apparatus of claim 56, wherein said clutch is a push-type clutch.

59. The apparatus of claim 56, wherein said clutch is a pull-type clutch.

60. The apparatus of claim 56, wherein said clutch is arranged to transmit a predetermined torque in said at least partially engaged condition thereof.

61. The apparatus of claim 1, wherein said torque transmitting system includes an engageable and disengageable clutch having resilient means arranged to maintain the clutch in an at least partially engaged condition in an idle condition of said actuating means.

62. The apparatus of claim 61, wherein said resilient means is prestressed and includes at least one of (a) a diaphragm spring, (b) a compression spring, and (c) a spiral spring.

63. The apparatus of claim 1, wherein said torque transmitting system includes parts which are subject to wear, and further comprising means for automatically compensating for wear upon said parts.

64. The apparatus of claim 1, wherein said at least one constituent includes said torque transmitting system, said torque transmitting system including an engageable and disengagable friction clutch which is disengaged in an idle condition of said actuating means.

65. The apparatus of claim 1, wherein said driving arrangement is arranged to transmit a nominal torque and said at least one constituent is said torque transmitting system, said torque transmitting system including an engageable and disengageable clutch arranged to transmit, in an idle condition of said actuating means, a torque which is less than said nominal torque.

66. The apparatus of claim 65, wherein said clutch is at least partially engaged in said idle condition of said actuating means.

67. The apparatus of claim 65, wherein the torque which said clutch transmits in said idle condition of said actuating means is between 90% and 10% of said nominal torque.

68. The apparatus of claim 65, wherein the torque which said clutch is capable of transmitting in said idle condition of said actuating means us between 35% and 75% of sad nominal torque.

69. The apparatus of claim 1, wherein said at least one constituent is said torque transmitting system and said torqe transmitting system comprises an engageable and disengageable friction clutch including a clutch disc having friction linings, said prime mover including an output member and said transmission, said energy storing means and said at least one output element forming part of an operative connection between said output member and said clutch disc, said operative connection comprising at last one energy storing element arranged to maintain said clutch in an at least partially engaged condition in an idle condition of said actuating means.

70. The apparatus of claim 69, wherein said clutch is arranged to transmit a predetermined torque in said at least partially engaged condition thereof.

71. The apparatus of claim 69, wherein said clutch disc comprises two sets of friction linings and at least one spring which is disposed between said sets of friction linings and stores energy at least in the at least partially engaged condition of the clutch.

72. The apparatus of claim 69, wherein said energy storing means is operative between said clutch disc and said at least one output element.

73. The apparatus of claim 69, wherein said clutch further comprises at least one resilient element arranged to store energy at least in the engaged and disengaged conditions of the clutch.

74. The apparatus of claim 1, wherein said transmission is a non self-locking transmission.

75. The apparatus of claim 1, wherein said transmission is a self-locking transmission.

76. The apparatus of claim 1, wherein said prime mover comprises an output member rotatable about a first axis and said transmission comprises a gear having a second axis which is at least substantially parallel with said first axis.

77. The apparatus of claim 1, wherein said prime mover comprises a rotary output member and said transmission comprises a gear coaxial with said output member.

78. The apparatus of claim 1 for use in a vehicle having a frame, wherein said actuating means is arranged to be secured to the frame.

79. The apparatus of claim 1 for use in a vehicle including a frame having a plastic wall, wherein said actuating means is arranged to be carried by the wall.

80. The apparatus of claim 1 for use in a vehicle including a frame having a wall with a side confronting said driving arrangement, said actuating means being arranged to be disposed at said side of the wall.

81. The apparatus of claim 1 for use in a vehicle including a frame having a wall with a side confronting a passenger compartment of the vehicle, said actuating means being arranged to be disposed at said side of the wall.

82. The apparatus of claim 1, wherein said actuating means is provided on one of (a) said driving arrangement and (b) said transmission system.

83. The apparatus of claim 1, wherein said at least one constituent includes said torque transmitting system and said torque transmitting system comprises an engageable and disengageble clutch, said actuating means being operative to select for said clutch an at least partially engaged condition in an idle condition of said control unit.

84. The apparatus of claim 1, wherein said transmission comprises a disc cam.

85. Apparatus for operating a transmission system of a power train in a multiple-constituent motor vehicle wherein the constituents include a driving arrangement, said transmission system and a torque transmitting system, comprising a control unit; and a plurality of signal transmitting sensors connected with said control unit, said control unit including means for actuating said transmission system and said actuating means comprising a prime mover, a transmission in torque-receiving relation with said prime mover, at least one output element between said transmission and said transmission system, and energy storing means arranged to react against a portion of said transmission and to transmit force to said at least one output element so that said at least one output element can actuate said transmission system in response to the application of force supplied by at least one of said prime mover and said energy storing means.

86. The apparatus of claim 85, wherein said energy storing means bears upon said at least one output element.

87. The apparatus of claim 85, wherein said transmission system includes a change gear.

88. Apparatus for operating at least one constituent of a power train in a multiple-constituent motor vehicle wherein the constituents include a driving arrangement, a transmission system and a torque transmitting system, comprising a control unit; and a plurality of signal transmitting sensors connected with said control unit, said control unit including means for actuating said at least one constituent and said actuating means comprising a prime mover having an input member rotatable about a predetermined axis, a transmission in torque-receiving relation with said prime mover, at least one output element between said transmission and said at least one constituent, and energy storing means arranged to react against a portion of said transmission and to transmit force to said at least one output element so that said at least one output element can actuate said at least one constituent in response to the application of force supplied by at least one of said prime mover and said energy storing means, said energy storing means comprising a spring which is parallel to said axis.

89. Apparatus for operating at least one constituent of a power train in a multiple-constituent motor vehicle wherein the constituents include a driving arrangement, a transmission system and a torque transmitting system, comprising a control unit; and a plurality of signal transmitting sensors connected with said control unit, said control unit including means for actuating said at least one constituent and said actuating means comprising a prime mover, a transmission in torque-receiving relation with said prime mover and comprising a disc cam, at least one output element between said transmission and said at least one constituent, and energy storing means arranged to react against a portion of said transmission and to transmit force to said at least one output element so that said at least one output element can actuate said at least one constituent in response to the application of force supplied by at least one of said prime mover and said energy storing means.

* * * * *